(12) United States Patent
Kuroyanagi et al.

(10) Patent No.: US 7,245,650 B2
(45) Date of Patent: Jul. 17, 2007

(54) CDMA COMMUNICATIONS SYSTEM USING MULTIPLE SPREADING SEQUENCES

(75) Inventors: Noriyoshi Kuroyanagi, Higashiyamato (JP); Naoki Suehiro, 18-14, Azuma 3-chome, Tsukuba-shi, Ibaraki (JP) 305-0031; Satoru Ozawa, Hino (JP); Mitsuhiro Tomita, Machida (JP); Kohei Otake, Suginami-ku (JP); Masakazu Takahashi, Kouza-gun (JP)

(73) Assignees: Naoki Suehiro, Ibaraki (JP); Tama-Tlo Ltd., Tokyo (JP)

( * ) Notice: Subject to any disclaimer, the term of this patent is extended or adjusted under 35 U.S.C. 154(b) by 720 days.

(21) Appl. No.: 10/471,671

(22) PCT Filed: Mar. 7, 2002

(86) PCT No.: PCT/JP02/02134

§ 371 (c)(1),
(2), (4) Date: Sep. 11, 2003

(87) PCT Pub. No.: WO02/073853

PCT Pub. Date: Sep. 19, 2002

(65) Prior Publication Data
US 2004/0131030 A1    Jul. 8, 2004

(30) Foreign Application Priority Data
Mar. 12, 2001  (JP) .............................. 2001-117506
Oct. 26, 2001  (JP) .............................. 2001-367937

(51) Int. Cl.
*H04B 1/00* (2006.01)

(52) U.S. Cl. ................................. 375/141

(58) Field of Classification Search ................ 375/130, 375/140, 141, 142, 143, 144, 145, 149, 150, 375/152, 347, 349; 455/101, 131, 132; 708/250, 708/251, 253, 445, 490; 712/245, 300; 714/212
See application file for complete search history.

(56) References Cited

U.S. PATENT DOCUMENTS

| | | | |
|---|---|---|---|
| 6,201,802 B1 * | 3/2001 | Dean | 370/350 |
| 6,563,856 B1 * | 5/2003 | O'Shea et al. | 375/130 |
| 6,721,349 B1 * | 4/2004 | Willenegger et al. | 375/130 |

FOREIGN PATENT DOCUMENTS

JP    7-143110    6/1995

(Continued)

OTHER PUBLICATIONS

Harada et al. Performance Analysis of an OFDM Based Wireless ATM Communication System, IEEE 1997, p. 1095-1099.*

(Continued)

*Primary Examiner*—Khanh Tran
*Assistant Examiner*—Sam K. Ahn
(74) *Attorney, Agent, or Firm*—Koda & Androlia

(57) ABSTRACT

This invention provides techniques for a CDMA system having high spectrum efficiency with low transmit power. Each transmitter comprises means of selecting some core-sequences out of multiple sequences to make them convey plural data, means of producing an enveloped selected sequence with such a method as to arrange as guard sequences to a repeated sequence made by repeating each of the selected core-sequences, means of modulating a user specific orthogonal carrier frequency by the enveloped selected sequence to produce a transmit-symbol, and means of transmitting the transmit-symbols. And a receiver comprises means of demodulating a receive-symbol with one of the user specific carrier frequencies to produce a base-band receive-symbol, means of separating respective components corresponding to the sequences selected by the user, by analyzing the base-band receive-symbol with a matrix composed of a channel response vector from the user to the receiver to detect plural data on the components.

23 Claims, 16 Drawing Sheets

(a)  (b)

FOREIGN PATENT DOCUMENTS

| | | |
|---|---|---|
| JP | 9-116462 | 5/1997 |
| JP | 2000-354021 | 12/2000 |
| JP | 2001-94466 | 4/2001 |

OTHER PUBLICATIONS

Shibatani et al. An anti-multipath CDMA System using Complementary Code Sequences with Dummy chips, IEEE 1999, p. 1139-1143.*

Mitsuhiro Tomita et al., "An interference analyzing system for CDMA signals utilizing lone pilot responses and an additional dummy pilot response", The Institute of Electronics, Information and Communication Engineers, Oct. 12, 2000, vol. 100, No. 361, pp. 11-16.

Hitoshi Yoshizawa et al., "A lone pilot assisted frequency multiple parallel combinatory SS communication system", The Institute of Electronics, Information and Communication Engineers, Dec. 7, 2001, vol. 101, No. 491, pp. 13-20.

* cited by examiner (a)

(b)

(a)

(b)

(c)

PRIOR ART

CDMA COMMUNICATIONS SYSTEM USING MULTIPLE SPREADING SEQUENCES

FIELD OF THE INVENTION

The present invention relates to a code division multiple access communications system (CDMA) using spread spectrum modulation which is able to separate and remove intra-cell and inter-cell-interference-noise having an especially detrimental effect among noise admixed in the transmission process, to enhance the frequency-utilization-efficiency, and to decrease the power-bandwidth-product. Here, a mobile communications system where the spread spectrum modulation is applied to BPSK signals is taken as an example, to describe such technology as to avoid intra-cell and inter-cell interference and to describe multi-ary modulation technology, etc.

BACKGROUND OF THE INVENTION

A Spread spectrum communications system is of using spread spectrum modulation technology where spreading sequences are modulated by transmission data. Due to this spread spectrum modulation, a data spectrum with a relatively narrow band width is spread to a wide frequency band and then the spectrum spread signals are transmitted. And in a region (cell or sector) where a base station (BS) provides communications services, there are plural user stations. Such a communications system is excellent in that a low transmission power per unit frequency is consumed, disturbance to other communications can be kept at a relatively low level, and the system has inherently strong capability resistant to ambient noise (external noise like CW noise) admixed in the transmissions process, and to inter-station-interference-noise incoming from interfering mobile stations other than a desired station. Generally this interference-noise includes delayed waves incoming via multipaths from the interfering-stations. However, because communications being performed by numerous stations share the same band, there is a problem such that increasing the number of users to be accommodated becomes difficult, due to the disturbance made by the inter-station-interference-noise. That is to say, it means that so many users can not be accommodated that a frequency-bandwidth to be occupied increases due to spread spectrum modulation, and it results in a decrease in frequency-utilization-efficiency or an increase in power-bandwidth required for 1 bit transmission.

FIG. 14 is a block diagram illustrating the general construction of a mobile communications system which performs direct-sequence spread spectrum communications (DS-SS) via a radio communications channel. Here, a transmitter EX modulates a spreading sequence generated by a sequence generator 1, by multiplying the sequence by a binary transmission data b, thus producing a baseband transmission output s(t). Transmitter TX further modulates this baseband transmission output s(t) with a carrier-wave having a frequency $f_0$ which has been generated by an oscillator 2, thus the spectrum of the signal conveying the data b may spread. Transmitter TX then transmits the resultant output to a radio communications channel. Furthermore, pseudo-noise (PN) sequences each of which is different from one for another user are used as such signatures that the spreading sequences may have a role of discriminating respective users' addresses. As PN sequences, maximum-length code (M) sequences or Gold sequences are generally used.

A receiver RX sends a spread-spectrum-modulated signal to an amplifier 3 via an antenna (not shown in the figures), amplifies the signal up to a required power level, and then frequency-mixes the amplified signal with a local signal $f_L(=f_0)$ which a local oscillator 4 has provided. Receiver RX then produces a low frequency component of the resultantly mixed output-signal as a baseband received demodulated signal r(t), by passing it through a low pass filter 5. In this case, coherent demodulation is generally performed.

Baseband demodulated signal r(t) is inputted to a multiplier 7 with the same spreading sequence generated by a sequence generator 6 as the sequence used by above-described transmitter TX. The resultant multiplied output is then integrated by an integrator 8 over the period of the spreading sequence length (1 symbol-frame), to obtain a matched filter output. A received binary data $\hat{b}$ is detected by making this output on the hard decision. This function compares it with a threshold level by a detector 9 at the end of the above-described frame period (correlative demodulation). A control signal made based upon this detected data is inputted into the control terminal of sequence generator 6 via a synchronization detector 10, and the generating timing of the spreading sequence is controlled so that the sequence phase may be synchronized with that of the received signal. Furthermore, in receiver RX shown in FIG. 14, the arrangement of the multiplying functions provided by local oscillator 4 and sequence generator 6 is often exchanged each other; however, the overall demodulation function remains the same.

FIG. 15 schematically shows spectra of a received signal on a demodulation process. In FIG. 15(a), reference numerals 11 and 12 denote a spectrum of a spread spectrum modulated signal which is an input signal to a receiver, and a spectrum of admixed environmental noise, respectively. When the receiver demodulates (dispreads) this signal with the spreading sequence, spread spectrum modulated signal 11 which has been spread over a wide frequency-bandwidth as shown in FIG. 15(b), is converted into a narrow-band-signal 13, and environmental noise 12 is converted into a signal 14 whose spectrum is distributes over a wide frequency-band. Accordingly, this communications system can suppress the disturbance due to environmental noise.

FIG. 16 is a diagram showing the waveform of a baseband transmitting symbol-frame (hereafter the description of symbol is omitted) in a conventional direct-sequence spread spectrum communications system (DS-SS). In the figure, n, T, $T_c$, $b_n$, g(i), s(i) and s(t) denote the frame number which shows a time sequence order of symbol-frames, a transmitting symbol-frame period for a data, the chip-period, the n-th binary transmit-information, the spreading (impulse) sequence, the transmit-frame in discrete representation, and the transmit-frame in continuous time representation, respectively. Here is shown a sequence with length L=7 (chips) as an example of g(i). The n-th binary data $b_n$ takes 1 and −1 corresponding to the data 1 and 0, respectively. Transmit-frame s(t) is a transmission-baseband-waveform obtained by replacing the respective impulses in $s(i)=b_n g(i)$ with square waves. Thus, discrete sequence g(i) and its continuous time-waveform g(t) are given by:

$$g(i) = \sum_{i=0}^{L-1} c_i \delta(t - iT_c) = (c_0, c_1, c_2, \ldots c_{L-1}) \; c_i \in \pm 1 \quad (1)$$

$$g(t) = \sum_{i=0}^{L-1} c_i q_1(t - iT_c) \; 0 \leq t \leq T \quad (2)$$

$$\begin{aligned} q(t) &= 1 \quad |t| \leq \frac{T_c}{2} \\ &= 0 \quad |t| \leq \frac{T_c}{2} \end{aligned} \quad (3)$$

where $c_i$(i=0,1,2, ... L−1), δ, and q(t) are the i-th chip amplitude of a spreading sequence, the delta function, a square-wave-function, respectively. An actual radio-band transmit-wave $s_a(t)$ is generally produced by modulating a carrier-wave by baseband transmitting waveform s(t)[g(t) or −g(t)] having a bandwidth which is limited less than $T_e = T_e^{-1}$.

Furthermore, when a square waveform is used as q(t), inter-symbol-interference takes place. To avoid this phenomenon, for Eq. (3) such a waveform is used that the auto-correlation function may take zero at the adjacent sampling points (called an f-type-sampling-function whose DFT conversion has cosine roll-off characteristics). In this case, if a receiver prepares the same waveform q(t) as that of the transmitting side, and performs correlative demodulation by multiplying a received symbol-frame by q(t) and a local carrier-wave. As a consequence, the desired wave components of the received signal will be obtained as an impulse sequence indicated in Eq. (1), where it is not subjected to the interference due to preceding or succeeding chips. That this impulse sequence is dispread with spreading sequence g(i) and then integrated. The n-th transmitted information $b_n$ can be detected, by making the integrated output on the hard decision. If an f-type-sampling-function with a roll-off factor of α (generally taking a value between 0.1 and 1) is used, the radio bandwidth $B_S$ of the above-described spreading signal and the radio bandwidth $B_D$ of the transmit-data is given by:

$$B_S = (1+\alpha)/T_C$$

$$B_D = (1+\alpha)/(LT_C) = B_S/L. \quad (4)$$

However, L>>1 is required in a practical system, and in spite of using a bandwidth L times larger than that of one user, for the maximum number K of simultaneous calls (the number of above-described user-station), K<<L is required. Therefore the simultaneous transmission capacity/Hz is (K/L) times as large as that of a time-division-multiple-access radio system (TDMA). Consequently, there is such disadvantage that existing CDMA systems have frequency utilization-efficiency not higher than that of time-division-multiple-access system.

Thus, the reason why the number K of user stations compared to the sequence length cannot be set to a large value is that the cross-correlation-coefficient between sequence $g_0(t)$ assigned to a desired station and a different sequence $g_k(t)$(k≠0) assigned to the other mobile station cannot be sufficiently small. Furthermore, considering delayed waves due to multipath, the cross-correlation-coefficient between many delayed sequence groups coming from respective user stations and sequence $g_0(i)$ increases. That is, that the code-error-rate considerably deteriorates, because many interference waves with high cross-correlation come in, and therefore it is impossible to increase the number of user stations K and to raise the frequency-utilization-efficiency.

To reduce the disturbance due to the above-described interference-noise, many methods have been studied so far, the sufficient noise suppression effect has not been obtained. Here let's explain 4 kinds of preceding techniques having close relationship with this invention.

(A) Selective transmission system with parallel combinatorial sequences [Reference: S. Sasaki, H. Kikuchi, J. Zhu, and G. Marubayashi, "Error Rate Analysis of Coherent and Differential Multiphase Parallel Combinatorial Spread Spectrum System," IEICE Trans. Fundamentals, Vol.E80-A, No.7, pp.1196–1203, 1997-07.]

(B) Isolated pilot assisted analytical demodulation system [Reference: Mitsuhiro Tomita, Noriyoshi Kuroyanagi, Naoki Suehiro, Shinya Matsufuji, "A Pilot Frame Assisted CDMA System using Gold Sequences", Proceedings of WPMC'99, 9.4, pp.346–353, Amsterdam, 1999-09]

(C) Rake reception system [Publication: Ramjee Prasad "CDMA for wireless personal communications", Artech House 1996, Sections 11.5 and 11.6 (p348, pp365–366)]

(D) Space-time coding system [Reference: Ben Lu and Xiaodong Wang, "Iterative Receivers for Multiuser Space-Time Coding Systems", IEEE JSAC, VOL.18. No.11, November 2000]

In system (A), a transmitter prepares a sequence-set consisting of M kinds of basic spreading sequences, selects γ sequences in it, multiplies them by a set of binary information, and adds up all the resultant sequences to transmit. In this case, because a binary information-set of I bits to be transmitted corresponds to combinations which are determined by M and γ, the information quantity per symbol-frame is given by:

$$I = \gamma + \log_2({}_MC_\gamma) \quad (5)$$

Consequently, this system is an example of Multi-ary systems and the improvement in frequency-utilization-efficiency has been expected.

When a transmit-symbol-frame arrives at a receiver, generally it turns out to be (J+1) waves consisting of the main wave and J delayed waves that are caused by multipaths. If the number of users is assumed to be K, the receiver receives (γ−1) waves (sequences) from the desired station as a self-interference-component, and γ(K−1)(J+1) waves from the other interfering stations as an inter-station-interference-component. Therefore the disturbance due to these interferences is considerably large in general. And this system requires many (MK kinds) spreading sequences, and the average value of cross-correlation-functions between an arbitrary pair of sequences in the sequences increases, as the family size MK increases. That is to say that the interference power increases in proportion to M, K, and J. Consequently, it is impossible to increase M and K to a large extent, in order to obtain desirable error-rate-characteristics by using system (A), as a result, it is impossible to raise the frequency-utilization-efficiency.

In system (B), a transmitter of each user transmits isolated pilot-frames so as not to suffer the disturbance of interference waves due to the other users. A receiver receives these isolated pilot-frames and always prepares highly accurate pilot-response from all the users. Each user transmitter produces a transmit-data-frame using both a sequence which is allocated to the user and a carrier wave which is common for all the users, and the produced frame is transmitted.

That is to say that system (B) is such a system that a base-station BS accurately acquires the transmission-path-characteristics (channel) from each user to BS by means of that each user transmits isolated pilot-signals to BS. Consequently, BS can obtain the pilot-response (channel-response) $\{p_{sk}\}$ (s: the number showing the shift position of the correlation-function for s=0,1,2, . . . L−1), corresponding to the transmission-path from the k(=0,1,2, . . . K−1)-th user. If a transmit-information of the k-th user is $b_k$, the correlation response $\{\Phi_s\}$ of a received-frame r(t) is given by $$\{\Phi_s\} = b_k\{p_{sk}\} + \Delta b_k\{p_{sk}\}. \qquad (6)$$

The second term on the right-hand in the above equation is an error component corresponding to a white noise included in r(t). By solving Eq. (6), a detected output $\hat{b}_k = b_k + \Delta b_k$ of the transmitted information can be obtained. This system can remove the effect of interference waves almost completely. Because $\{p_{sk}\}$ includes an interference component due to the white noise, perfect separation of interference waves can not be achieved, however, for CDMA systems to which interference waves give stronger disturbance than that white noise does, the advantage which almost all the interference wave components can be removed is valuable.

However, since system (B) uses the correlation responses, $\{p_{sk}\}$ makes a matrix with a size of L×L, as a result, for the parameter k(=0,1,2, . . . K−1), a relation given by K≦L is required. That is to say that the number of users who can be accommodated is limited by the spreading sequence length, and it raises a problem that the frequency-utilization-efficiency can not be sufficiently increased.

System (C) is a demodulating detection method used for a multipath environment where many of delayed waves generated by a desired user's transmitted frame are contained in a received frame. This system has a function such that not only a main wave but also the delayed waves are demodulated by multiple fingers (demodulation circuits operating synchronously with delayed waves) and their outputs are summed up. It is reported that the error increases considerably due to the inter-station-interference-disturbance as the number of users increases, because the above stated finger output includes inter-station-interference-components consisting of main waves and the delayed waves both coming from interfering stations.

System (D) is a CDMA communication system using multiple transmit- and receive-antennae. In this system, respective user transmitters produce plural frame-sequences by applying convolutional coding to a transmit-data-frame-sequence, and then transmit these coded frame-sequences via plural antennae. A base-station receiver obtains demodulated outputs for respective users with a multi-user demodulator, using a signal group received via plural ($N_d$) antennae, and then produces the first detected value $b_n$ on the n-th frame. The time sequence of the first detected value $b_n$ has a high error-rate. Based on these plural ($N_d$) sets of similar time sequences, a convolutional decoder performs decoding to produce the second detected values. By feeding back the detected values to the above-stated multi-user-demodulator and the convolutional decoder, the above-stated demodulation and decoding are performed to obtain the third detected values. This is such a system that the final detected values are decided by repeating the above stated processing multiple times.

System (D) requires a considerably complicated processing and a long delay time. It is the problem of this system that nevertheless it fails to increase the frequency-utilization-efficiency. In contrast, an actual sequence increasing technique of the present invention to be stated later is a system capable of obtaining the above stated first detected value $b_n$ with a low error-rate, to acquire an excellent performance by using a simple processing, and it is a quite different technique from system (D).

The present invention has been done to overcome the performance limit in terms of the frequency-utilization-efficiency or power-bandwidth-product, as CDMA system evaluation measure, which the preceding systems have indicated, by providing multiary system design techniques with spreading sequence sets.

DISCLOSURE OF THE INVENTION

In order to solve the above-described problems, the invention of the present invention is characterized by the fact that, in a direct-sequence spread-spectrum CDMA communications system, a transmitter of the k-th user $u_k$(k=0,1, . . . K−1) comprises such a function as to transmit information of I bits per symbol-frame by providing; means of that a sequence-set consisting of M kinds of basic spreading sequences $g_0, g_1, \ldots g_m, \ldots g_{M-1}$, each sequence having code length L, is prepared, an information-set consisting of γ components, $\{\beta^S\} = (\beta_0, \beta_1, \ldots \beta_{\gamma-1})$ not including the value 0 is made of a modulated sequence-set which are made by multiplying the said M respective basic spreading sequences by an original information-set consisting of M components $\{\beta\} = (\beta_0, \beta_1, \ldots \beta_{M-1})$ including (M−γ) pieces of the value 0, resulting in production of a selected sequence-set consisting of γ selected spreading sequences, means of that a modulated synthesized sequence $s_D$ is produced by adding up all of the said selected spreading sequences, that a repeated core spreading sequence $s_{DN}$ with a sequence length of NL chips is produced by repeating the said respective selected sequences an integer (N) times, that an enveloped sequence $e_D$ is produced as an baseband transmitting data-frame by arranging the rear and the front parts of the said repeated core spreading sequence as the guard sequences at the front and the rear outsides of the said repeated core spreading sequence, and that said data-frame modulates a carrier-wave having the k-th orthogonal frequency $f_k$ which is orthogonal each other on k and the resultant output is transmitted, and means of that a similar enveloped sequence $e_p$ is produced based on a sequence $pg_p$ which is made by multiplying a basic spreading sequence $g_p$ for pilot by a pilot-information p as a baseband transmit-pilot-frame, and that the said pilot-frame is transmitted so as not to interfere with similar data-frames and pilot-frames of other users, and a receiver comprises such a function as to detect the above-described transmitted information of I bits per symbol-frame by providing; means of that a received signal is demodulated into a baseband signal using a local carrier-wave $\hat{f}_0$ of the 0-th orthogonal frequency $f_0$ which the transmitter of a desired user $u_0$ has used, that a synchronously received frame period with a length of NL chips is set at the position which is synchronized with the principal wave of signal components coming from the desired user included in this demodulated output, that the baseband signal component on this period is extracted as a repeated synchronously received data-frame $r^*_{DN}$, and a repeated synchronously received pilot-frame $r^*_{pN}$ is also obtained in the same way, and that by applying an averaging operation to the said respective repeated frames, a synchronously received data-frame $r^*_D$ and a synchronously received pilot-frame $r^*_p$ both with reduced length L chips are produced, means of that the said synchronously received data-frame $r^*_D$ is analyzed using a channel response $\{\mu\}$ which is the demodulated output of the said synchronously received pilot-frame, resulting in production of an estimate-set $\{\beta'\}=(\beta'_0, \beta'_1, \ldots \beta'_{M-1})$ corresponding to the said original information-set which has been transmitted by the desired station, and means of that a detected output-set $\{\hat{\beta}^S\}=\{\hat{\beta}_0^S, \hat{\beta}_1^S, \ldots \hat{\beta}_{\gamma-1}^S\}$ consisting of the information which the desired station has transmitted obtained by judging the said estimate-set.

The invention of a CDMA communications system using multiple spreading sequences is characterized in that, in a direct-sequence spread-spectrum CDMA communications system, a transmitter of the k-th user $u_k(k=0,1, \ldots K-1)$ comprises such a function as to transmit information of I bits per symbol-frame by providing; means of that a sequence-set consisting of M kinds of basic spreading sequences $g_0, g_1, \ldots g_m, \ldots g_{M-1}$, each sequence having code length L, is prepared, an information-set consisting of $\gamma$ components, $\{\beta^S\}=(\beta_0, \beta_1, \ldots \beta_{\gamma-1})$ not including the value 0 is made of a modulated sequence-set which are made by multiplying the said M respective basic spreading sequences by an original information-set consisting of M components $\{\beta\}=(\beta_0, \beta_1, \beta_{M-1})$ including $(M-\gamma)$ pieces of the value 0, resulting in production of a selected sequence-set consisting of $\gamma$ selected spreading sequences, means of that a modulated synthesized sequence $s_D$ is produced by adding up all of the said selected spreading sequences, that a repeated core spreading sequence $s_{DN}$ with a sequence length of NL chips is produced by repeating the said respective selected sequences an integer (N) times, that an enveloped sequence $e_D$ is produced as an baseband transmitting data-frame by arranging the rear and the front parts of the said repeated core spreading sequence as the guard sequences at the front and the rear outsides of the said repeated core spreading sequence, and that said data-frame modulates a carrier-wave having the k-th orthogonal frequency $f_k$ which is orthogonal each other on k and the resultant output is transmitted, and means of that a similar enveloped sequence $e_p$ is produced based on a sequence $pg_p$ which is made by multiplying a basic spreading sequence $g_p$ for pilot by a pilot-information p as a baseband transmit-pilot-frame, and that the said pilot-frame is transmitted so as not to interfere with similar data-frames and pilot-frames of other users, and a receiver comprises such a function as to detect the above-described transmitted information of I bits per symbol-frame by providing; means of that a received signal is demodulated into a baseband signal using a local carrier-wave $\hat{f}_0$ of the 0-th orthogonal frequency $f_0$ which the transmitter of a desired user $u_0$ has used, that a synchronously received frame period with a length of NL chips is set at the position which is synchronized with the principal wave of signal components coming from the desired user included in this demodulated output, that the baseband signal component on this period is extracted as a repeated synchronously received data-frame $r^*_{DN}$, and a repeated synchronously received pilot-frame $r^*_{PN}$ is also obtained in the same way, and that by applying an averaging operation to the said respective repeated frames, a synchronously received data-frame $r^*_D$ and a synchronously received pilot-frame $r^*_P$ both with reduced length L chips are produced, means of that M kinds of fabricated pilot-frames $r^*_{pm}(m=0,1,2, \ldots M'-1)$ each having a length of L chips are produced by using both the channel response $(\mu)$ which is the demodulated output of the said synchronously received pilot-frame and the above-described sequence-set consisting of M kinds of basic spreading sequences, resulting in production of a pilot matrix $\rho$ with a size of L×M, and means of that a system of M linear equations in M unknowns is made of the said pilot-matrix $\rho$, a received data-matrix $d'=(d'_0, d'_1, \ldots d'_{L-1})^T$ consisting of the chip-elements of the above-described synchronously received data-frame $r^*_D$, and an unknown matrix $\beta'=(\beta'_0 \beta'_1 \ldots \beta'_{M-1})^T$, that an estimate-set $\{\beta'\}=(\beta'_0, \beta'_1 \ldots \beta'_{M-1})$ corresponding to the original information-set is produced by solving the said system, and that a detected output-set $\{\hat{\beta}^S\}=(\hat{\beta}_0^S, \hat{\beta}_1^S, \ldots \hat{\beta}_{\gamma-1}^S)$ consisting of the information-set which the desired user has transmitted is obtained by judging the said estimate-set.

The invention of a CDMA communications system using multiple spreading sequences is characterized in that, in a direct-sequence spread-spectrum CDMA communications system, a transmitter of the k-th user $u_k(k=0,1, \ldots K-1)$ comprises such a function as to transmit information of I bits per symbol-frame by providing; means of that a sequence-set consisting of M' kinds of basic spreading sequences $(g_0^k, g_1^k \ldots g_m^k \ldots g_{M'-1}^k)$, each having a sequence length of L chips, is prepared, an information-set consisting of $\gamma$ components, $\{\beta^{kS}\}=(\beta_0^{kS}, \beta_1^{kS}, \ldots \beta_{\gamma-1}^{kS})$ not including the value 0, is made of a modulated sequence-set which is made by multiplying the said M' respective basic spreading sequences by an original information-set consisting of M' components $\{\beta^k\}=(\beta_0^k, \beta_1^k, \ldots \beta_{M'-1}^k)$ including $(M'-\gamma)$ pieces of the value 0, resulting in production of a selected sequence-set consisting of $\gamma$ selected spreading sequences $\{\beta^{kS}g^{kS}\}=(\beta_0^{kS}g_0^{kS}, \beta_1^{kS}, g_1^{kS} \ldots \beta_{\gamma-1}^{kS}g_{\gamma-1}^{kS})$, means of that a modulated synthesized sequence $s_D^k$ is produced by adding up all of the said selected spreading sequences, that a repeated core spreading sequence $s_{DN}^k$ with a sequence length of NL chips is produced by repeating the said synthesized sequences an integer (N) times, that an enveloped sequence $e_D^k$ is produced as an baseband transmitting data-frame by arranging the rear and the front parts of the said repeated core spreading sequence as the guard sequences at the front and the rear outsides of the (respective sequences) sequence, and that the said data-frame $e_D^k$ modulates a carrier-wave having a frequency $f_D$ which is a common carrier for data, and the resultant output is transmitted, means of that a similar enveloped sequence $e_p^k$ is produced using a sequence $pg_p$ which is made by multiplying a basic spreading sequence $g_p$ for pilot by a pilot-information p as a baseband transmit-pilot-frame, and the said pilot-frame modulates a carrier-wave having an orthogonal frequency $f_k$, and the resultant output is transmitted, and means of that all of the frequencies $f_D$ and $f_k$ are set so as to be different each other by integer times of a frequency $f_G$ corresponding to the reciprocal of the synchronously received frame-period with length NL chips, and a receiver comprises such a function as to detect the above-described transmitted information of I bits per symbol-frame by providing; means of that a received signal is demodulated into baseband signals using local carrier-waves $\hat{f}_k$ and $\hat{f}_D$ respectively having orthogonal frequencies $f_k$ and $f_D$ which the transmitter has used, that a synchronously received frame-period with a length of NL chips is set so as to satisfy a quasi-synchronous condition, that a repeated synchronously received data-frame $r^*_{DN}$ and a repeated synchronously received pilot-frame $r_{pN}^{k*}$ are produced by extracting the baseband signal components on this period, and that a synchronously received data-frame $r^*_D$ and a synchronously received pilot-frame $r_p^{k*}$ both having a reduced length of L chips are produced by applying an averaging operation to the said respective repeated frames, means of that M' kinds of fabricated pilot-frames $r_{pm}^{k*}(m=0,1,2, \ldots M'-1)$ each having a length of L chips are produced by using both the channel response $(\mu)$ which is the demodulated output of the said synchronously received pilot-frame and the above-described sequence-set consisting of M' kinds of basic spreading sequences, resulting in production of a pilot-matrix ρ' with a size of L×M using M=KM' pieces of the fabricated pilot-frames, and means of that a system of M linear equations in M unknowns is made of the said pilot-matrix ρ', a received data-matrix d'=(d'$_0$, d'$_1$, ... d'$_{L-1}$)$^T$ consisting of the chip-elements of the above-described synchronously received data-frame r*$_D$, and an unknown matrix β$^{k'}$=(β$_0$$^{0'}$β$_1$$^{0'}$ ... β$_{M'-1}$$^{0'}$, β$_0$$^{1'}$β$_1$$^{1'}$ ... β$_{M'-1}$$^{1'}$, β$_0$$^{K-1'}$β$_1$$^{K-1'}$ ... β$_{M'-1}$$^{K-1'}$)$^T$, that an estimate-set {β̂$^{k'}$}= (β̂$_0$$^{k'}$β̂$_1$$^{k'}$ ... β̂$_{M'-1}$$^{k'}$) corresponding to the original information-set which the k-th user has transmitted is produced by solving the said system, and that a detected output-set { β̂$^{kS}$}=(β̂$_0$$^{kS}$, β̂$_1$$^{kS}$, ... β̂$_{γ-1}$$^{kS}$) consisting of the above-described transmitted information for the k-th user is obtained by judging the said estimate-set.

The invention of a CDMA communications system using multiple spreading sequences is characterized in that, a transmitter of the k-th user u$_k$(k=0,1, ... K−1) comprises; means of that a transmitting pilot-frame e$_p$ which is an enveloped sequence produced based on a basic spreading sequence g$_p$ for pilot described above is transmitted over a carrier-wave with an orthogonal frequency f'$_k$, that the said orthogonal frequencies f'$_k$ and f$_k$(k=0,1,2, ... K−1) used for transmitting the above-described pilot-frames and data-frames respectively are set so as to be different on k each other by integer times of a frequency f$_G$ which is the reciprocal of the repeated synchronously received frame period T$_G$, resulting in providing of the frequency-division-pilot-frame-transmission-function by setting the sequence length of the above-described guard sequences so that any boundaries of the respective received flock-flames r$_{pf}$$^k$ and r$^{Dfk}$ coming from all the users may not be included in the synchronously received frame period, and a receiver comprises; means of that the said synchronously received pilot-frame is demodulated using a local frequency f'$_0$ corresponding to the orthogonal frequency f'$_0$ which the transmitter of desired station u$_0$ has used, and means of that an isolated-pilot-response for a desired station without being subjected to interference due to both the above-described data-frame received from a desired station and all the interference-waves received from interfering stations is produced.

The invention of a CDMA communications system using multiple spreading sequences is characterized in that, a transmitter of the k-th user u$_k$ comprises; means of that a synthesized frame-sequence is produced by providing empty slots in the above-described baseband transmit-data-frame sequence, and inserting pilot-frames in said data-frame sequence in time-division manner, and means of that the said synthesized frame-sequence is transmitted over the above-described k-th orthogonal carrier wave having frequency f$_k$, and a receiver comprises; means of that the parts corresponding to the pilot-frames in a frame-sequence made of the above-described synchronously received frames are extracted in a time-division manner and then the extracted parts is demodulated, and an isolated-pilot-response without being subjected to interference due to the above-described interference-waves is produced.

The invention of a CDMA communications system using multiple spreading sequences is characterized in that, a transmitter of the k-th user u$_k$(k=0,1 ... K−1) comprises; means of that a transmit-pilot-frame for u$_k$ which is produced by modulating a common carrier-wave for pilot having an orthogonal frequency f$_p$ by the k-th baseband transmitting pilot-frame described above e$_p$$^k$ is transmitted over such a transmission timing as to receive in time-division-manner with a similarly received pilot-frame which the k'-th user u$_{k'}$(k'≠k) has transmitted, and a receiver comprises; means of that a baseband pilot-frame for u$_k$ is extracted in time-division-manner from a pilot-frame-sequence demodulated by a carrier-wave having the said orthogonal frequency f$_p$, and the above-described channel-response is produced using the resultant demodulated output.

The invention of a CDMA communications system using multiple spreading sequences is characterized in that, a receiver detects the transmitted information of I bits per symbol-frame by comprising; means of that the 0-shift-correlations p'$_{nm}$ between the m-th fabricated pilot-frame r*$_{nm}$ and M data analyzing sequences y$_n$(n=0,1,2, ... M−1) each of which differs each other are produced, and that a pilot-response-matrix P' with a size of M×M constituted of the said correlations is produced, means of that a data-response-matrix Φ'=(Φ'$_0$, Φ'$_1$, Φ'$_2$, ... Φ'$_{M-1}$)$^T$ is produced by such a method as to obtain the 0-shift correlation Φ'$_n$ between the above-described synchronously received data-frame r*$_n$ and the n-th data analyzing sequence y$_n$, and means of that a system of M linear equations in M unknowns are made of the pilot-response-matrix P', the data-response-matrix Φ' and an unknown matrix β'=(β'$_0$, β'$_1$, β'$_1$, ... β'$_{M-1}$)$^T$, that an estimated set β'=(β'$_0$, β'$_1$, β'$_1$, ... β'$_{M-1}$) corresponding to the said original information-set is obtained by solving the said system, and that a detected output-set {β̂$^S$}={β̂$_0$$^S$, β̂$_1$$^S$, ... β̂$_{γ-1}$$^S$} consisting of the above-described transmitted information is obtained by judging the said estimate-set.

The invention of a CDMA communications system using multiple spreading sequences is characterized in that, a receiver detects the transmitted information of I bits per symbol-frame which is transmitted by each user by comprising; means of that M' fabricated pilot-frames r$_{pm}$$^{k*}$ and M' data analyzing sequences y$_n$$^k$(n=0,1,2, ... M'−1) corresponding to the k-th user u$_k$(k=0,1,2, ... K−1) are produced, means of that a pilot-response-matrix P' with a size of (M×M) constituted of the 0-shift-correlations p$_{nm}$$^{k*}$ between the said respective fabricated pilot-frames r$_{pm}$$^{k*}$ and the said respective data analyzing sequences y$_n$$^k$ is produced, and means of that a data-response-matrix Φ'=(Φ$_0$$^{0'}$, Φ$_1$$^{0'}$, ... Φ$_{M'-1}$$^{0'}$, Φ$_0$$^1$, Φ$_1$$^1$, ... Φ$_{M'-1}$$^1$, ... Φ$_0$$^{K-1}$, Φ$_1$$^{K-1}$, ... Φ$_{M'-1}$$^{K-1}$)$^T$ is produced using such a method as to obtain the 0-shift-correlation Φ$_n$$^{k'}$ between the above-described synchronously received data-frame r*$_D$ and the said data analyzing sequence y$_n$$^k$, that a system of M linear equations in M unknowns is made of the said pilot-response-matrix P', the said data-response-matrix Φ' and an unknown matrix β'=(β$_0$$^{0'}$, β$_1$$^{0'}$, ... β$_{M'-1}$$^{0'}$, β$_0$$^{1'}$, β$_1$$^{1'}$, ... β$_{M'-1}$$^{1'}$, β$_0$$^{K-1}$, β$_1$$^{K-1}$, ... β$_{M'-1}$$^{K-1}$)$^T$, that a estimate-set {β̂$^{k'}$}=(β̂$_0$$^{k'}$, β̂$_1$$^{k'}$, ... β̂$_{M'-1}$$^{k'}$ corresponding to the transmitted information-set consisting of M' components for each user is obtained by solving said system, and that a detected output-set {β̂$^{kS}$}={β̂$_0$$^{kS}$, β̂$_1$$^{kS}$, ... β̂$_{γ-1}$$^{kS}$} corresponding to the transmitted information of each user is obtained by judging the estimate-set.

The invention of a CDMA communications system using multiple spreading sequences is characterized in that, a transmitter of the k-th user u$_k$ comprises; means of that a sequence-set consisting of M kinds of basic spreading sequences having L chips is prepared, being transmitted, and a receiver detects the transmitted information of I bits per symbol-frame which is transmitted by each user by comprising; means of that double length fabricated pilot-frames r*$_{pmE}$ and a double length synchronously received data-frame r*$_{DE}$ both having 2L chips are produced using the real part and the imaginary part of the respective chip-elements of both the fabricated pilot-frames $r^*_{Pm}$(m=0,1,2, ... M−1) and the synchronously received data-frame $r^*_D$, that a system of M linear equations in M unknowns is made of a double length received pilot-matrix ρ' with a size of 2L×M made of the double length fabricated pilot-frames $r^*_{PmE}$, a received data-matrix d' which consists of the chip-elements of the double length synchronously received data-frame $r^*_{DE}$, and an unknown matrix β', that an estimate-set {β'} corresponding to the original information-set is produced by solving the said system, and that a detected output-set {$\hat{\beta}^S$} consisting of the information which the desired station has transmitted is obtained by judging the said estimate-set.

The invention of a CDMA communications system using multiple spreading sequences is characterized in that, a transmitter of the k-th user $u_k$ comprises; means of that a sequence-set consisting of M' kinds of basic spreading sequences having L chips is prepared, being transmitted, and a receiver detects the transmitted information of I bits per symbol-frame which is transmitted by each user by comprising; means of that double length fabricated pilot-frames $r_{pmE}^{k*}$ and a double length synchronously received data-frame $r^*_{DE}$ both having 2L chips are produced using the real part and the imaginary part of the respective chip-elements of the fabricated pilot-frames $r_{pm}^{k*}$(m=0,1,2, ... M−1, k=0,1,2, ... K−1) and the synchronously received data-frame $r^*_D$, that a system of M linear equations in M unknowns is made of a double length received pilot-matrix ρ' with a size of 2L×M made of the double length fabricated pilot-frame $r_{pmE}^{k*}$, a received data matrix d' which consists of the chip-elements of the double length synchronously received data-frame, and an unknown matrix $\beta^{k}$, that an estimate-set {$\beta^{k}$} corresponding to the original information-set is produced by solving the said system, and that a detected output-set {$\hat{\beta}^{kS}$} consisting of the information which the desired station has transmitted is obtained by judging the said estimate-set.

The invention of a CDMA communications system using multiple spreading sequences is characterized in that, a transmitter comprises; means of that transmit-signals are transmitted via one or plural transmit-diversity-antennae $A_{Tv}$(v=0,1,2, ... ), and a receiver comprises; means of that received signals $r_d$ are received via plural receive-diversity-antennae $A_{RD}$(d=0,1,2, ... ), that baseband demodulated outputs are produced at pilot and data demodulating parts $D_{pd}$ and $D_{Dd}$ for the d-th received signal $r_d$ by using a local carrier-wave corresponding to a carrier-wave which the transmitter of a desired station has used, and thereby the d-th synchronously received pilot- and data-frames $r^*_{pd}$ and $r^*_{Dd}$ are produced, that the d-th channel response {μ}$_d$ is obtained with the d-th pilot-frame $r^*_{pd}$, that a fabricated pilot-frame $r^*_{pmd}$ or $r^*_{pmd}$ corresponding to the d-th received signal is obtained using the said channel response {μ}$_d$ and the m-th basic spreading sequence which the desired station has used, that extended fabricated pilot-frames $r^*_{pmE}$ or $r_{pmE}^{k*}$ are produced by using such a method as to increase the frame length by arranging chip-elements of the said fabricated pilot-frames which belong to respective antenna numbers d on a time axis, that an extended synchronously received data-frame $r^*_{DE}$ is produced by arranging the said d-th synchronously received data-frame $r^*_{Dd}$ on a time axis in the same way, that an estimate-set {β'}=(β'$_0$, β'$_1$, ... β'$_{M-1}$) corresponding to the original information-set is produced by analyzing the said extended synchronously received data-frame $r^*_{DE}$ with the said extended fabricated pilot-frames $r^*_{PmE}$ or $r_{PmE}^{k*}$, and that a detected output-set {$\hat{\beta}^S$}={$\hat{\beta}_0^S$, $\hat{\beta}_1^S$, ... $\hat{\beta}_{\gamma-1}^S$}consisting of the information which the desired station has transmitted is obtained by judging the said estimate-set.

The invention of a CDMA communications system using multiple spreading sequences is characterized in that, a transmitter comprises; means of that a sequence-set consisting of $N_v$ basic spreading sequences {$g_m$}=($g_{m0}$, $g_{m1}$, ... $g_{mv}$, ... $g_{m,Nv-1}$) per one transmit-information $β_m$ is prepared, that the v-th basic spreading sequence $g_{mv}$ is modulated by the same information $β_m$ to produce a core-sequence for data and then an enveloped sequence for data based on this modulated output, that an enveloped sequence for pilot is produced in the same way, that both the said enveloped sequences are lead to the v-th transmit-diversity-antenna $A_{Tv}$ to transmit, and a receiver comprises; means of that the components which the v-th transmit-diversity-antenna $A_{Tv}$ has transmitted are demodulated using an input received via the d-th received-diversity-antenna $A_{Rd}$, resulting in production of both the d-th synchronously received data-frames $r^*_{Dvd}$ and the d-th synchronously received pilot-frames $r^*_{pvd}$, that a channel response {μ}$_{vd}$ from the v-th transmit-antenna to the d-th received-antenna is produced using the said synchronously received pilot-frame, that the d-th fabricated pilot-frames $r^*_{pmvd}$ or $r_{pmvd}^{k*}$ are produced using the channel response, that an extended fabricated pilot-frame $r^*_{pmE}$ or $r_{pmE}^{k*}$ is produced by such a method as to increase the frame length by arranging chip-elements of fabricated pilot-frames which belong to the respective pairs of transmit- and receive-antenna numbers v and d (mutually different)* on a time axis, that an extended received frame $r^*_{DE}$ is produced by arranging the said synchronously received frame $r^*_{Dvd}$ in the same way, and that the said extended synchronously received frame $r^*_{DE}$ is analyzed with the said extended fabricated pilot-frames $r^*_{pmE}$ or $r_{pmE}^{k*}$.

The invention of a CDMA communications system using multiple spreading sequences is characterized in that, such a function is added that, when the chip-elements of the above-described fabricated pilot-frames and synchronously received data-frames which belong to respective transmit- and receive-antenna original numbers are arranged on a time axis, and thereby extended fabricated pilot-frames and extended synchronously received data-frames are produced, a real amplitude component and an imaginary amplitude component of a chip-element are arranged so as to take individual time positions to constitute each frame.

The invention of a CDMA communications system using multiple spreading sequences is characterized in that, a receiver comprises such a function as to detect the transmitted information of I bits per symbol-frame which is transmitted by each user by providing; means of that instead of solving a system of M linear equations in M unknowns, an optional number $M_R$ which is smaller than M, and equal to γ or larger than γ is chosen to produce a reduced size system of $M_R$ linear equations in $M_R$ unknowns, and $N_R$ sets of the reduced size systems are produced, that $N_R$ estimate-sets of the spreading sequence-set {β'}=(β'$_0$, β'$_1$, ... β'$_{MR-1}$) or {$β^{k'}$}=($β_0^{k'}$, $β_1^{k'}$, ... $β_{MR-1}^{k'}$) are obtained as solutions of the said respective equations, and that an evaluation function Δβ which shows deviations between the said respective estimate-sets and the original information-set {β} or {$β^k$} is obtained, and means of that an estimate-set {β'} or {$β^{k'}$} corresponding to the original information-set based on a set with which Δβ takes the minimum is obtained, and that a detected information-set {$\hat{\beta}^S$} or {$\hat{\beta}^{kS}$} consisting of the above-described transmitted information is obtained by judging the said estimate-set.

The invention of a CDMA communications system using multiple spreading sequences is characterized in that, a receiver comprises such a function as to detect the transmitted information of I bits per symbol-frame which is transmitted by each user by providing; means of that instead of solving a system of M linear equations in M unknowns, combination-sets $U_s(s=0,1, \ldots N_\gamma-1)$ which consists of $\gamma$ frames taken out of the fabricated pilot-frames $r_{pm}(m-0,1,2, \ldots M-1)$ is made, that a sum of the frames which is made by multiplying the elements of plural virtual sequences $C_h(c_0, c_1, \ldots c_{\gamma-1})$ by the respective frames of a said combination-set $U_s$ is produced as a fabricated transmitted frame $F_{sh}$, and that correlations between respective fabricated transmitted frames and the above-described synchronously received data-frame $r^*_D$ are obtained, and means of that the maximum likelihood fabricated transmitted frame is obtained based on the said correlations, and that a detected information-set $\{\hat{\beta}^S\}$ consisting of the above-described transmitted information is obtained by judging the said estimate-set $\{\beta'\}$ using the constituent elements $U_s$ and $C_h$ of the maximum likelihood fabricated transmitted frame.

The invention of a CDMA communications system using multiple spreading sequences is characterized in that, a receiver comprises such a function as to detect the transmitted information of I bits per symbol-frame which is transmitted by the k-th user $u_k$ by providing; means of that instead of solving a system of M linear equations in M unknowns, combination-sets $U_s^k(s=0,1,2, \ldots N_\gamma-1)$ which consists of $K\gamma$ frames taken out of the fabricated pilot-frames $r_{Pm}^{k*}(m=0,1,2, \ldots M'-1)$ for the k-th user $u_k(k=0, 1,2, \ldots K)$ is made, that a sum of the frames which is made by multiplying the elements of plural virtual sequences $C_h(c_0, c_1, \ldots c_{K\gamma-1})$ by the respective frames of a said set $U_s^k$ is produced as a fabricated transmitted frame $F_{sh}^k$, and that correlations between respective fabricated transmitted frames $F_{sh}^k$ and the above-described synchronously received data-frame $r^*_D$ is obtained, and means of that the maximum likelihood fabricated transmitted frame is obtained based on the said correlations, and that a detected information-set consisting of the above-described transmitted information is obtained by judging an estimate-set corresponding to the original information-set using the constituent elements $U_s^k$ and $C_h$ of the maximum likelihood fabricated transmitted frame.

The invention of a CDMA communications system using multiple spreading sequences is characterized in that, a receiver comprises such a function as to detect the above-described transmitted information of I bits per symbol-frame by providing; means of that the above-described fabricated pilot-frames $r^*_{pm}$ or $r_{pm}^{k*}(m=0,1,2, \ldots M-1, k=0,1,2, \ldots K-1)$ are generated, and such analyzing sequences $w_m$ that the 0-shift-correlations with fabricated pilot-frames $r^*_{pm}$ and $r^*_{pm}(m'\neq m)$ may take 1 and 0, respectively, are produced, means of that plural estimate-sets set $\{\beta'\}=(\beta'_0, \beta'_1, \ldots \beta'_{M-1})$ corresponding to the original information-set are produced based on the 0-shift correlations between the above-described synchronously received data-frame $r^*_D$ and analyzing sequences $w_m$, that by judging the maximum likelihood set taken out of these estimate-sets a detected information-set $\{\hat{\beta}^S\}=\{\hat{\beta}_0^S, \hat{\beta}_1^S, \ldots \hat{\beta}_{\gamma-1}^S\}$ consisting of the above-described transmitted information is obtained, or means of that plural analyzing sequences $w_m^k$ such that 0-shift-correlations with fabricated pilot-frames $r_{pm}^{k*}$ and $r_{pm'}^{k'*}(m'\neq m, k'\neq k; m'=m, k'\neq k; m'\neq m, k'=k)$ may take 1 and 0, respectively, are produced, means of that plural estimate-sets $\{\beta^{k'}\}=(\beta_0^{k'}, \beta_1^{k'}, \ldots \beta_{M-1}^{k'})$ corresponding to the original information-set are produced based on the 0-shift-correlations between the above-described synchronously received data-frame $r^*_D$ and the analyzing sequences $w_m^k$, and means of that by judging the maximum likelihood set taken out of these sets a detected information-set $\{\hat{\beta}^{kS}\}$ consisting of the above-described transmitted information is obtained.

The invention of a CDMA communications system using multiple spreading sequences is characterized in that, a transmitter comprises; means of that a binary to multi-level conversion is carried out by using such a method as to correspond a transmit-information of I bits to a case-number obtained by synthesizing the first selection where an optional number $\gamma$ is selected out of the numbers of spreading sequences, ranging from one to $\gamma_m$, and the second selection where $\gamma$ spreading sequences are selected out of an above-described sequence-set consisting of M or M' kinds of basic spreading sequences as the sequence kinds, means of that a selected sequence-set consisting of $\gamma$ selected spreading sequences is produced from the above-described original information-set $\{\beta\}$ or $\{\beta^k\}$ to produce a transmitting frame, and a receiver comprises such a function as to detect the above-described transmitted information of I bits per symbol-frame by providing; means of that fabricated pilot-frames are obtained based on the above-described channel response $\{\mu\}$, and an estimate-set $\{\beta'\}$ or $\{\beta^{k'}\}$ corresponding to the original information-set is obtained by analyzing the above-described synchronously received data-frame $r^*_D$ with them, means of that while a detected value $\hat{\gamma}$ for the transmitted spreading sequence number is obtained using the said estimate-set, and means of that a detected information-set $\{\hat{\beta}^S\}$ or $\{\hat{\beta}^{kS}\}$ consisting of $\hat{\gamma}$ selected information components is obtained per user.

The invention of a CDMA communications system using multiple spreading sequences is characterized in that, a receiver comprises; means of that in solving an above-described system of M linear equations in M unknowns, it is assumed that frames produced by multiplying dummy-information-components $\{\beta^D\}=(\beta_M^D, \beta_{M+1}^D, \ldots \beta_{M+h-1}^D)$ by $h(\geq 1)$ dummy spreading sequences which are not included in the basic spreading sequence-set provided in a transmitter may be included in the above-described synchronously received data-frame, means of that M pieces of the said fabricated pilot-frames $r^*_{pm}(m=0,1,2, \ldots M-1)$ and the (M+h) pieces of the said data analyzing sequences $y_n(n=0, 1,2, \ldots M-h-1)$ are produced and an extended pilot-response-matrix $P'_+$ is produced by adding h additional row vectors A to M row vectors each having (M+h) elements which are produced from the 0-shift-correlations between the above-described fabricated pilot-frames $r^*_{pm}$ and the said data analyzing sequences $y_n$, means of that a corrected data-response-matrix $\Phi''_+=(\Phi''_0, \Phi''_1, \ldots \Phi''_{M+h-1})^T$ is produced using a method of adding correcting terms to the 0-shift-correlations between the above-described synchronously received data-frame $r^*_D$ and the data analyzing sequences $y_n$, means of that a system of (M+h) linear equations in (M+h) unknowns which is made of the said enlarged pilot-response matrix $P'_+$, the corrected data-response-matrix $\Phi''_+$ and an extended unknown matrix $\beta'_+= (\beta', \beta^D)^T=(\beta'_0, \beta'_1, \ldots \beta'_{M-1}, \beta_M^D, \beta_{M+1}^D, \ldots \beta_{M+h-1}^D)^T$ is produced, and means of that after the said additional row vector A is selected so as to increase the determinant or normalized singular value of the said enlarged pilot-response-matrix $P'_+$ to enhance the regularity, an estimated set $\{\beta'\}$ or $\{\beta^{k'}\}$ corresponding to the original information-set is obtained by solving the said system of (M+h) linear equations in (M+h) unknowns.

The invention of a CDMA communications system using multiple spreading sequences is characterized in that, a receiver comprises; means of that in solving an above-described system of M linear equations in M unknowns, an above-described enlarged pilot-matrix $P'_+$ is produced so as to enhance the regularity of the said enlarged matrix using the above-described fabricated pilot-frames $r^*_{pm}$, h additional row vectors A, and h additional column vectors C which are random sequences, means of that an extended unknown matrix $\beta'_+$ is made by adding h additional dummy-information $\{\beta^D\}$ to an unknown set $\{\beta'\}$ consisting of M unknowns, means of that a corrected synchronously received data-frame $r^*_{D+}$ is made by adding correcting terms to the above-described synchronously received data-frame $r^*_D$, means of that a solution set $\{\beta'_+\}$ is obtained by solving a system of (M+h) linear equations in (M+h) unknowns which is composed of the said enlarged pilot-matrix $\rho'_+$, the extended unknown matrix $\beta'_+$, and the corrected received data-matrix $d'_+$ consisting of the chip-elements of the corrected synchronously received data-frame $r^*_{D+}$, and plural solution sets $\{\beta^*_+\}$ are resultantly obtained corresponding to the said additional column vectors C by solving the said systems, and means of that the maximum likelihood solution taken out of the solution sets is set to an estimate-set $\{\beta'\}$ corresponding to the original information-set.

The invention of a CDMA communications system using multiple spreading sequences is characterized in that, an identical sequence-set consisting of M kinds of basic spreading sequence allocated to some cells, and a scrambling sequence inherent to each cell is allocated to a cell, and a transmitter of the cell comprises; means of that a scrambled sequence-set is produced by multiplying respective sequences of the spreading sequence-set by the scrambling sequence inherent to the cell to produce a transmit-frame, and a receiver comprises; means of that pilot and data analyzing sequences are produced based on the above-described scrambled sequence-set to analyze the above-described synchronously received data-frame.

The invention of a CDMA communications system using multiple spreading sequences is characterized in that, a transmitter of the k-th user $u_k$ comprises; means of that a sequence-set consisting of M=M'=N kinds of basic spreading sequences $(g_0, g_1, g_2, \ldots g_{M-1})$ is produced by multiplying code words $(h_0, h_1, \ldots h_{N-1})$ consisting of rows of an hadmarl matrix with a size of N×N by a random sequence-set consisting of M' kinds of spreading sequences $(g_0^0, g_1^0, \ldots g_{M'-1}^0)$.

The invention of a CDMA communications system using multiple spreading sequences is characterized in that, a transmitter comprises; means of that a sequence-set consisting of M=M'L kinds of cyclically shifted sequences is prepared as a basic spreading sequence-set by producing the s=(0,1,2, ... L−1)-shift-sequences of respective spreading sequences which constitutes a sequence-set consisting of M' kinds of spreading sequences $(g_0, g_1, \ldots g_{M'})$ with L chips in sequence length, means of that transmit-information of I bits is converted into an information-set consisting of γ components $\{\beta^S\}$ selected out of the basic spreading sequence-set, and means of that a transmit-frame is produced and transmitted by using a selected sequence-set $\{\beta^S g^S\}$ corresponding to the said information of I bits, and a receiver detects the transmitted information of I bits per symbol-frame by producing a detected output-set $\{\hat{\beta}^S\}=\{\hat{\beta}_0^S, \hat{\beta}_1^S, \ldots \hat{\beta}_{\gamma-1}^S\}$ consisting of the information which the desired station has transmitted.

PREFERRED EMBODIMENT OF THE PRESENT INVENTION

This invention is related to a system, which can overcome the above-described problem inherent to CDMA communication systems, that is, a characteristic vulnerable to the disturbance caused by interference-waves incoming from the other users, and also can enhance the frequency-utilization-efficiency. Let us explain embodiment-examples applied to technically difficult up-link transmission systems. In the invention, the transmitter $u_k$ of the k-th (=0, 1, ... K−1) user transmits an isolated pilot-frame, and the base-station receiver BS has a function eliminating the disturbance component caused by interference-waves in data-frames, similarly to the above-described method (B) by utilizing this pilot-frame or its correlation-response as well as by utilizing the self-interference-waves. Moreover, the transmitter converts the binary data-information-set {b} to be transmitted to multi-value-information-set {β} in advance. In other words, by multiplying this multi-value-information {β} to a multiple sequence-set, a binary data-set may be related to a multi-value. Namely, TX selects γ(≦M) spreading sequences from M kinds of sequences by multiplying M kinds of codes (sequence population) by an information-set {β}=(β₀, β₁, ... β_{M−1}) including M−γ pieces of the value 0. Then, γ components composing a binary information-set, not including the value 0, $\{β^s\}=\{β_0^s, β_1^s, ... β_{γ−1}^s\}$ labeled by both new ordinal numbers and a superscript S are multiplied by these selected spreading sequences for transmission. The receiver detects the kind and the polarity (±1) of the respective selected sequences. From this detected output, the above-described binary information-set {b} is restored. This is a sort of multi-ary systems which can transmit the information of multiple bits I per symbol frame, and can enhance the frequency-utilization-efficiency.

Figure 1:
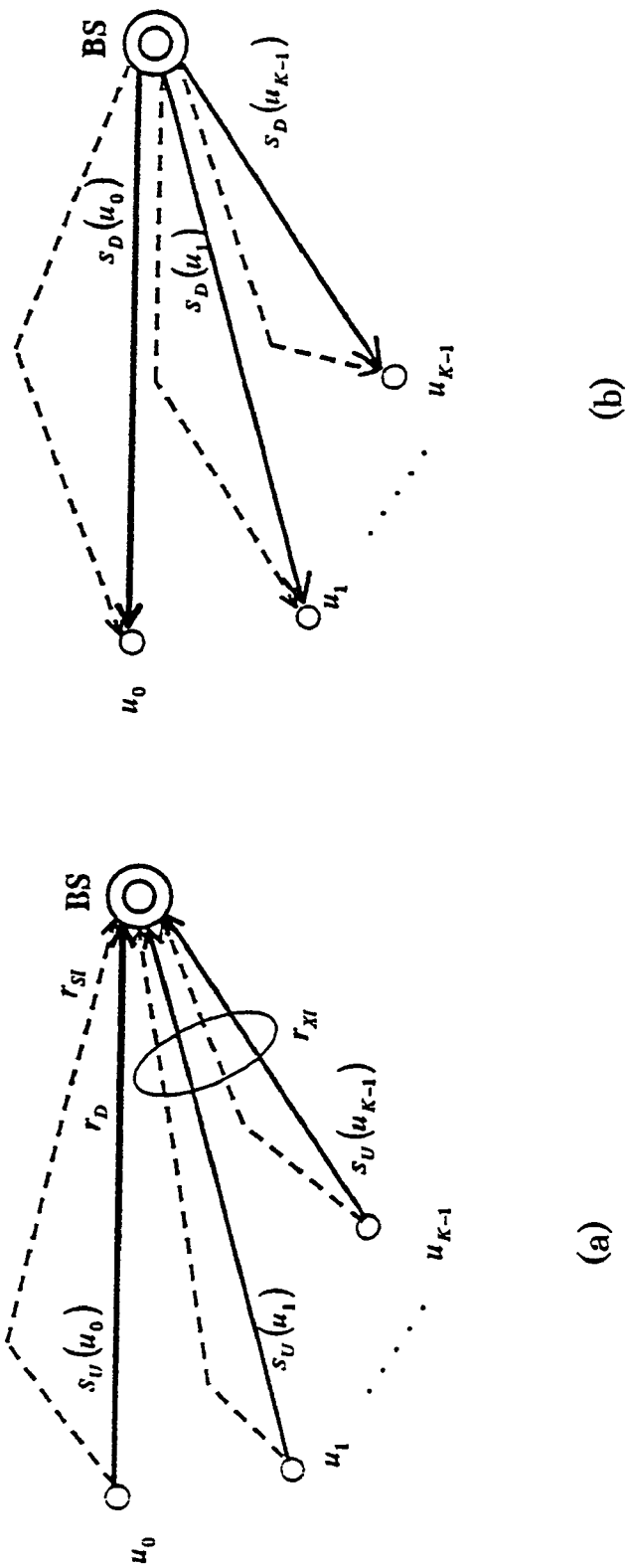
FIG. 1 shows explanatory drawings of intra-cell transmission-paths of CDMA communication system, in which (a) shows the paths of up-link transmission, while (b) shows the paths of down-link transmission.

FIG. 1 is an auxiliary explanatory drawing of the invention, indicating the intra-cell-transmission-paths of a CDMA communication system. The up-link transmission shown in FIG. 1(a) indicates the transmission state where the transmit-waves $s_t(u_k)$ are sent from the k-th mobile station $u_k$(k=0,1,2, ... K−1) (hereinafter referred to as "the k-th user station") communicating within this cell to the base station BS. Assuming that the 0-th user $u_o$ is a desired station (the subsequent description will be made under this assumption), the received direct wave $r_D(t)$ to BS becomes the desired wave. In the figure, the dotted lines show delayed waves due to multi-paths. A delayed wave generated by the transmission wave which the desired station has sent out becomes a self-interference-wave $r_{SI}(t)$. On the other hand, the transmission-waves sent out from the user stations other than the desired station (also referred to as the "interfering stations") are received as the inter-station-interference-waves $r_{XI}(t)$. These waves contain not only the direct waves, but also the delayed waves due to multi-paths as shown in the figure. Accordingly, the received interference-waves $r_I(t)$ is equal to a sum of the self-interference-wave and the inter-station-interference-waves. The total received waves r(t) may be expressed as follow $$\left. \begin{array}{l} r(t) = r_D(t) + r_I(t) + x(t) \\ r_I(t) = r_{SI}(t) + r_{XI}(t) \end{array} \right\} \quad (7)$$

where x(t) is the Additive White Gaussian Noise (AGWN).

FIG. 1(b) shows the down-link transmission-paths. In this transmission, the delayed waves due to multi-paths shown by dotted lines are similarly generated. The received waves received by user station $u_o$ contain not only an illustrated transmission wave $s_D(u_o)$ and its delayed wave, but also transmission waves to the other stations $u_k$(k≠0) and their delayed waves.

When there is an object intercepting the direct wave, demodulation may be performed using one of the delayed waves, instead of using the direct wave, as a principal wave. In this case, some of the interference-waves due to multi-paths precede the principal wave to be demodulated. The following description deals with the system design specifically for the technically more difficult up-link transmission by assuming states where none of preceding waves may take place, for convenience (without loss of generality).

Figure 2:
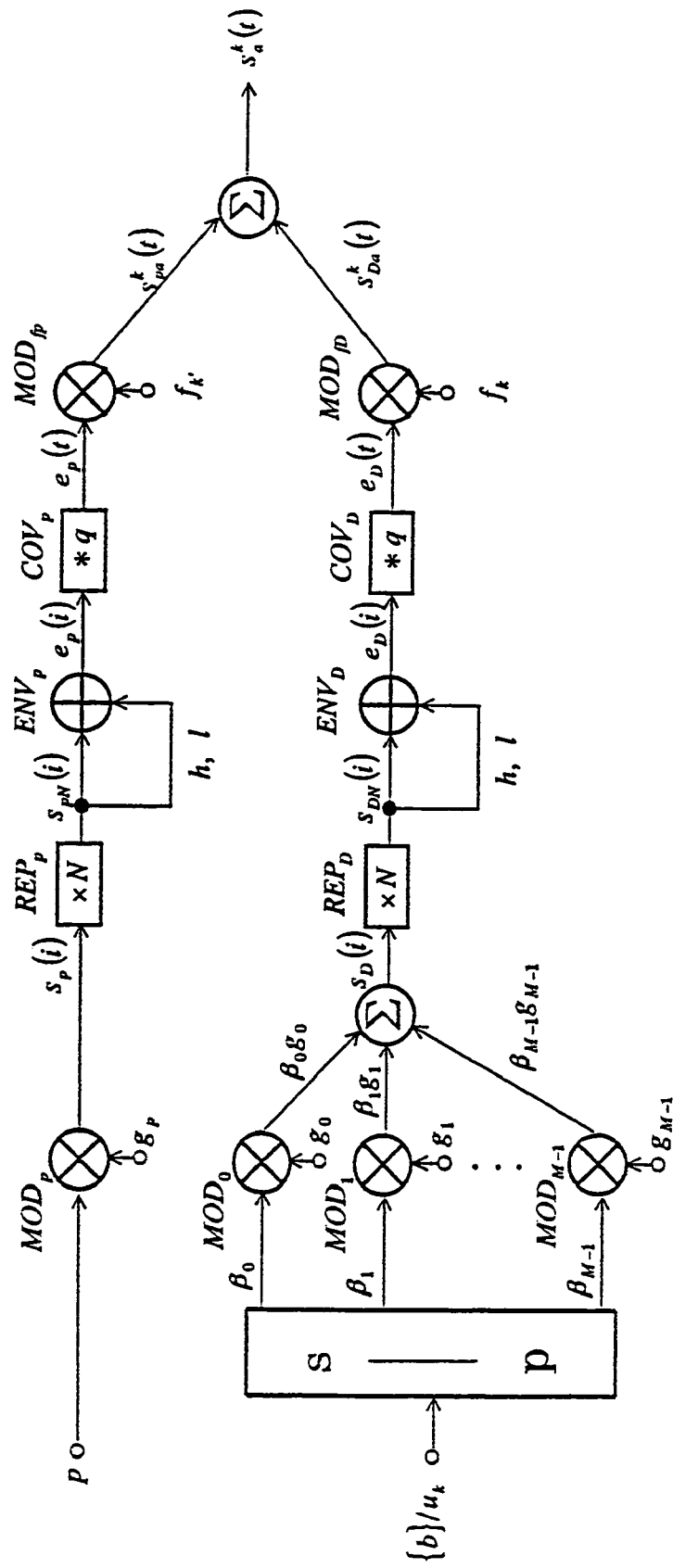
FIG. 2 shows an explanatory drawing of the first embodiment-example of the invention, indicating a circuit composition of the k-th user transmitter TX ($u_k$) of a frequency-division data-pilot-frame-transmission-system.
Figure 3:
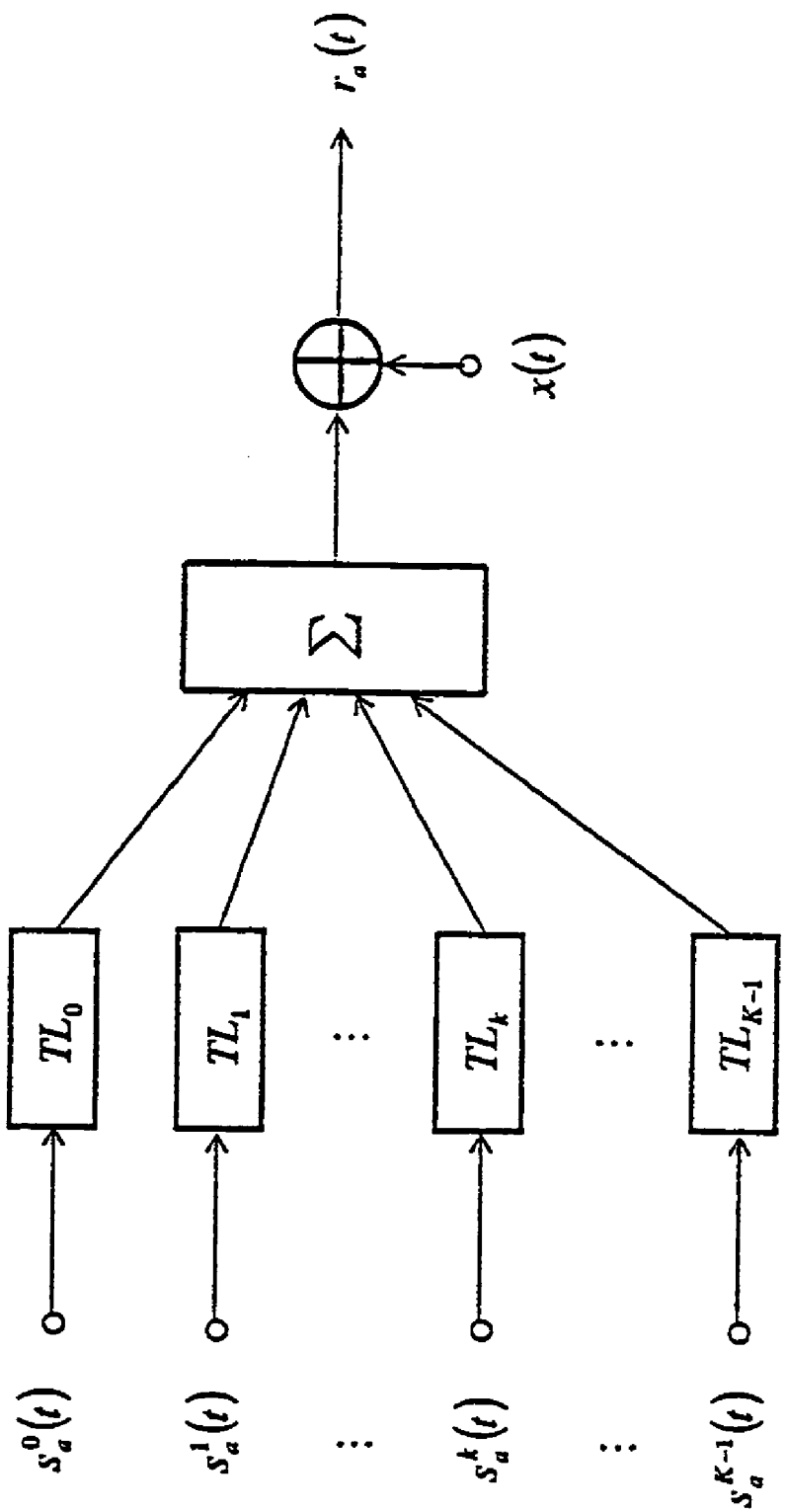
FIG. 3 shows an explanatory drawing of an embodiment-example of the invention, indicating a model of transmission paths between transmitters and a receiver of the communication system.
Figure 4:
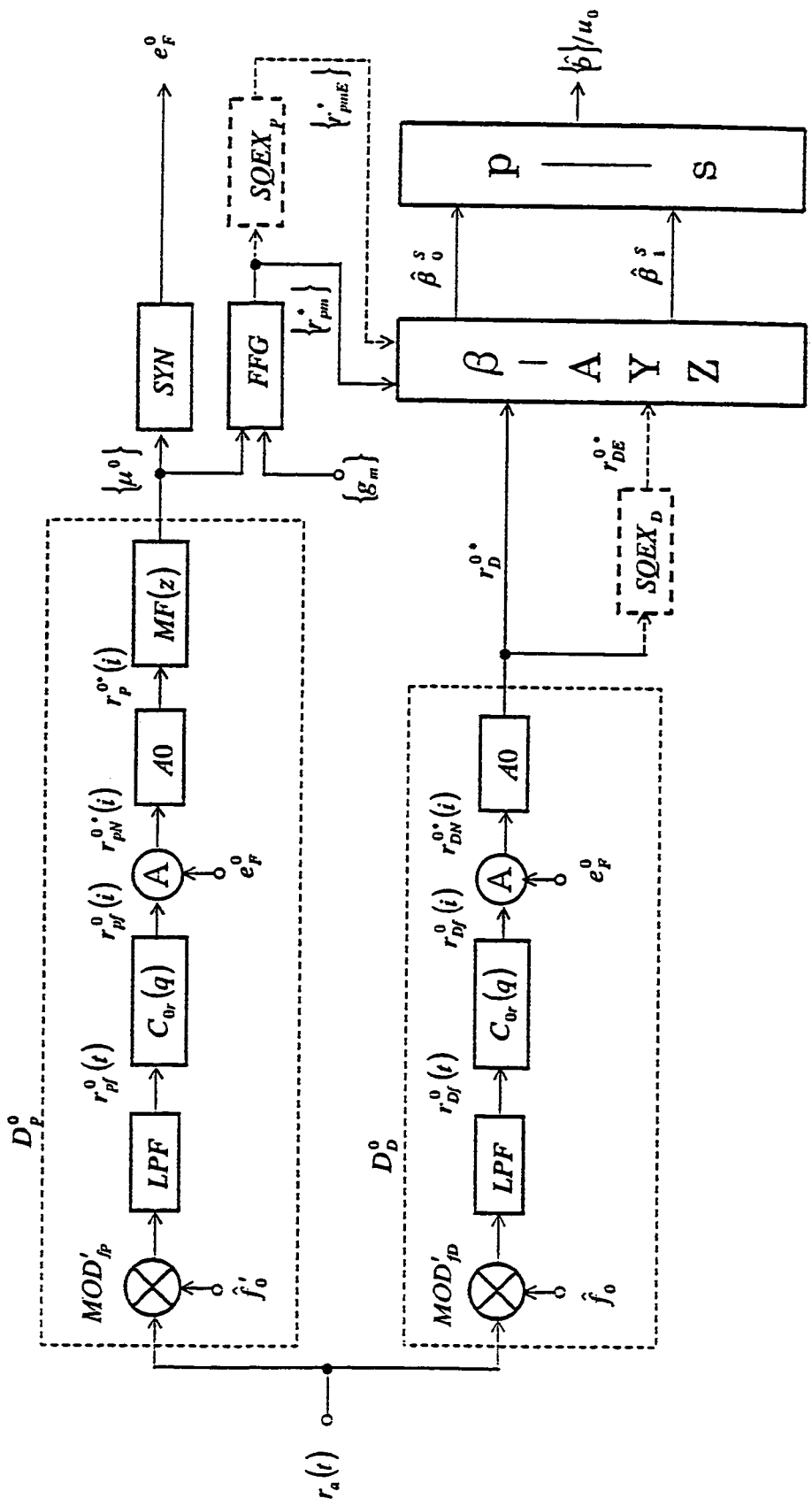
FIG. 4 shows an explanatory drawing of the first embodiment-example of the invention, indicating a circuit composition of base-station-receiver RX ($u_o$) of a frequency-division data-pilot-frame-transmission-system.

FIGS. 2 to 4 are explanatory drawings of the first embodiment-example of the invention, indicating the circuit-compositions of the transmitter and the receiver, and the transmission model where spreading sequences generally used, such as Gold sequences, and a frequency-division pilot-frame-transmission-system are used.

FIG. 2 shows a circuit of the transmitter TX($u_k$) of the k-th user $u_k$. An I-bit binary information-set {b} and a pilot-information p are prepared. The former is converted to a multi-value information-set {β} by means of the illustrated serial-parallel converter s-p, and its output is given as follows $$\{β\}=\{β_0, β_1, ... β_m, ... β_{M−1}\}[β_m ∈ 0,±1]. \quad (8)$$

The γ components of $β_m$ in M components of $β_m$ take a value ±1 while the remaining (M−γ) components of $β_m$ take the value 0. (Generally, $β_m$, can take one of multi-values including 0, real values, complex values, etc. However, for simplicity, it is assumed to take ternary values as stated above.) On the other hand, pilot-information is fixed normally as p=1. For user $u_k$, a sequence-population consisting of M kinds of mutually different basic spreading sequences $g_m(i)$ is provided. $g_m(i)$ is a discrete sequence with length L, as represented by $$g_m(i) = \sum_{i=0}^{L-1} g_{mi}δ(t − mT_c) = (g_{m0}, g_{m1}, ... g_{m,L−1}) \ (m = 0, 1, 2, ... M − 1) \quad (9)$$

where, $g_{mi}$ is the i-th chip amplitude, which is assumed here to be a binary value (±1). Generally, it may be given by either a multi-value, a real value, or a complex value. (In this invention, any random sequences can be used.) δ and $T_c$ stand for a delta function and a chip period, respectively. A pilot-sequence $g_P(i)$ is a similar basic spreading sequence with length L. At respective modulators $MOD_0$, $MOD_1$, ... $MOD_{M−1}$, this basic spreading sequence $g_m(i)$ is multiplied by said ternary information $β_m$, generating a symbol-frame consisting of L components each with a binary chip impulse (hereinafter, an expression omitting the symbol will be used). By synthesizing these outputs in the adderΣ, the multi-value synthesized impulse-sequence $s_D(i)$ consisting of L chips is produced. This output is repeated N-times at an illustrated repeating circuit $REP_D$ which generates a repeated core spreading sequence $S_{DN}(i)$ with sequence length $L_G$=NL. Moreover, by copying both the rear portion l(i) and the front portion h(i) of $S_{DN}(i)$ and by adding them to the front and rear sides of $S_{DN}(i)$, respectively, an enveloped frame $e_D(i)$ with sequence length $L_E$ is produced. The respective chip impulses of $e_D(i)$ are applied to a convolutional multiplier $COV_D$, where a convolution output with chip-waveform q(t) in Eq. (3) is obtained. This enveloped frame output $e_D(t)$ is a baseband transmit data-frame having a continuous time waveform with frame-period $T_E=L_E T_c$ as represented by $$e_D(t) = \sum_{m=0}^{M-1} \beta_m \{g_m(t)/T_E\} \quad (10)$$

where $g_m(t)/T_E$ is the convolution-output made of both the periodical sequence of $g_m(i)$ with sequence-length $L_E$ and q (t).

On the other hand, at modulator $MOD_p$, pilot discrete sequence $s_p(i)$ is produced, by using pilot-information p and basic spreading sequence $g_p(i)[i=0,1,2,\ldots L-1.]$. Moreover, using repeating circuit $REP_p$, enveloped circuit $ENV_p$, and convolutional multiplier $COV_p$, a baseband transmit-pilot-frame is obtained in the same way as stated above, and it is represented by $$e_p(t) = p\{g_p(t)/T_R\}. \quad (11)$$

At illustrated modulators $MOD_{fp}$ and $MOD_{fD}$, (enveloped) data-frame $e_D(t)$ modulates a carrier-wave $f_k$ while the (enveloped) pilot-frame $e_p(t)$ modulates a carrier-wave $f'_k$. Synthesizing of these modulations outputs $s_{D\alpha}{}^k(t)$ and $s_{p\alpha}{}^k(t)$ produces a transmit-frame-output $s_\alpha{}^k(t)$ in the radio-band.

FIG. 3 is a block diagram showing a transmission-path-model. A transmission-path $TL_k$ shows the parameter of channel characteristics (transfer function) between the k-th user $u_k$ and base station receiver BS. It means that a direct wave which is produced by attenuating transmit-signal $s_\alpha{}^k(t)$, and multiple delayed waves generated by multiple propagation paths are produced, and they are applied to BS. All of these waves generated from one transmit-frame are here called a flock-frame. All of $TL_k$ outputs are added at a receiving point (represented by $\Sigma$), as a consequence, a received frame-signal $r_\alpha(t)$ consisting of K flock-frames and the Additive White Gaussian Noise x(t) is produced.

FIG. 4 shows a receiver circuit $R_x(u_o)$ to detect the transmitted information of desired station $u_o$. $D_p^0$ is the generating circuit of a pilot-signal for $u_o$, which performs such processing that a baseband signal may be produced by demodulating the received input, and then applies the resultant output to a matched filter to produce a pilot-response. Received input $r_a(t)$ is converted into a baseband pilot-flock-frame $r_{pf}^0(t)$ (normally, a subscript f is attached to a flock-frame) by means of an illustrated modulator $MOD'_{fp}$, a low pass filter LPF, and a local carrier-wave $f'_0$ with a frequency equal to $f'_0$. [Actually, the real part $\cos 2\pi f'_0 t$ and imaginary part $\sin 2\pi f'_0 t$ of a carrier-wave are applied to respective modulators $MOD'_{fpI}$ and $MOD'_{fpQ}$, and their outputs are applied to respective low pass filters $LPF_I$ and $LPF_Q$. As a result, a complex output consisting of the real part (I) and the imaginary part (Q) of $r_{pf}^0(t)$ can be obtained. Details of the circuit to generate I and Q outputs are omitted for simplicity.] The attenuation and distortion of an waveform which desired station $u_0$ has transmitted are compensated by an equalizing circuit not illustrated.

A transmit-wave of respective user stations generates J delayed waves due to multi-paths, including the principal wave (the direct wave or one of the received waves with the maximum power). Therefore, an equalizing circuit output $r_{pf}^0(t)$ may contain the baseband transmit-wave $e_p(t)$ and its delayed waves. $D_D^0$ is a data demodulating circuit similar to $D_p^0$. Consider a low pass filter output generated at $D_p^0$ and a similar output of $D_D^0$. These baseband received waves are given by the following equations, assuming that p=1

$$r_{pf}^0(t) = \sum_{j=0}^{J-1} \mu_j^0 e_p(t - jT_C) + x(t) + \sum_{k=1}^{K-1} \tilde{r}_p^k(t) + \sum_{k=0}^{K-1} \hat{r}_D^k(t) \quad (12)$$

$$r_{Df}^0(t) = \sum_{m=0}^{M-1}\sum_{j=0}^{J-1} \hat{\mu}_j^0 \beta_m e_m(t - jT_c) + x(t) + \sum_{k=1}^{K-1} \tilde{r}_D^k(t) + \sum_{k=0}^{K-1} \hat{r}_p^k(t) \quad (13)$$

where the first terms of both the equations are flock-frames, each consisting of a sum of direct and delayed waves generated by the transmission pilot- or data-frame of user $u_0$. $\mu_j^0$ and $\hat{\mu}_j^0$ are the signal amplitudes of the j-th delayed wave of the 0-th user and each amplitude takes a complex value consisting of I and Q components due to the phase difference between the transmitted and the local carrier-waves. x(t) is AWGN. $r_a(t)$ contains the baseband components transmitted from the other user $u_k$($k \neq 0$) on both carrier-waves $f'_k$ and $f_k$, and the pilot- and data-frame components transmitted from $u_0$ on carrier-waves $f'_0$ and $f_0$, respectively. The third and fourth terms of above equations are outputs of inter-station and self-interference components which are obtained by demodulating them with the different orthogonal carrier-waves $f_0$ and $f'_0$, as described later. These outputs are made zero due to the above-described demodulation with the orthogonal carrier-waves and an averaging operation performed by an averaging circuit AO in FIG. 4 to be described later. [These outputs may be made zero, instead of using AO, an integrating operation performed by a matched filter MF (z) in FIG. 4 or a correlator $C_{or}$ (y) in FIG. 9.] Therefore, the following description will be made by assuming that these components do not exist.

Note also that $e_m(t)$ in Eq.(13) is an output of $e_m(i)$ convoluted with q (t), and $e_m(i)$ is an enveloped sequence with sequence length $L_E$ which is made by adding a header h (i) and tail l(i) to the core-sequence consisting of N-times repetition of $g_m(i)$.

Although both $r_{pf}^0(t)$ and $r_{Df}^0(t)$ are frame-waveforms on a continuous time axis, the following demodulation processing is performed after converting them into waveforms taking values in chip spacing $T_c$ on a discrete time axis. For this purpose correlation outputs between these continuous waveforms and chip-waveform q(t) are produced at an illustrated chip-waveform correlator $C_{or}$ (q) in every $T_c$. [The sampling function waveform is here assumed as q(t). Its time expanse is the integrating time of the correlator, and this time is selected to be sufficiently longer than chip period $T_c$ in order to reduce the correlation error.] These correlated outputs become discrete sequences $r_{op}(i)$ and $r_{OD}(i)$, each consisting of chip elements arranged in chip spacing. (The function of this correlator is equivalent to that of a transversal filter with the weighting coefficient of the f-type sampling function.)

The time position of synchronously received frame-period $T_G(=L_G T_C)$ synchronized to the principal wave of the received signal for the desired station is specified by an illustrated frame pulse $e_F^0$. [See FIG. 7(b).] With the gate A and $e_F^0$ in the figure, such core time portions of received frames $r_{pf}^0(i)$ and $r_{Df}^0(I)$ as designated by the core-sequence position of the principal wave is extracted. These frames are turned into (repeated) synchronously received pilot- and data-frames, $r_{pN}^{0*}(i)$ and $r_{DN}^{0*}(i)$ each consisting of $L_G$ (=NL) chips. These frames with repeated sequences are applied to two averaging circuits AOs shown in the figure, and AO converts the sequence length of these frames from NL to L chips by means of its averaging operation. Through this operation, two averaging circuits AOs produce synchronously received frames $r_p^{0*}(i)$ and $r_D^{0*}(i)$ each with length L, respectively.

Pilot-frame $r_p^{0*}(i)$ generated in this manner is applied to a matched filter $M_F(z)$ matched to a pilot analyzing sequence z(i), generating a cross-correlation-function $\{\mu^0\}$ corresponding to desired station $u_o$, as the channel-response (equivalent to $TL_o$ in FIG. 3) of the transmission-paths. Output $\{\mu^0\}$ is applied to a fabricated frame generator (FFG) and a synchronizing circuit SYN. The former generates the m-th fabricated pilot-frame $r*_{pm}(i)$ from channel-response $\{\mu^0\}$ and spreading sequence $g_m(i)$. [An illustrated double length frame $\{r*_{pmE}\}$ whose sequence length is extended to be twice is described later.] M pieces of similar frames $\{r*_{pm}\}$ are produced, which are applied to a β analyzing circuit.

Using channel-response $\{\mu^0\}$, synchronizing circuit SYN generates the frame pulse $e_F^0$ which is used to indicate the position of the synchronously received frame by known means and transmits it to circuits which need the frame pulse. With the aid of this timing, the core-sequence time portion of the principal wave is extracted from $r_a(t)$, as described above, to produce baseband outputs $r_{pN}^{0*}(i)$ and $r_{DN}^{0*}(i)$. [This system using accurate pilot-responses, do not need to establish carrier-wave-phase-synchronization.]

A synchronously received data-frame $r_D^{0*}(i)$ with length L is applied, together with a set of $r*_{pm}(i)$, denoted by $\{r*_{pm}\}$, to β analyzing circuit β-AYZ. (Circuits $SQEX_P$ and $SQEX_D$ indicated by dotted line frames in the figure will be described later.)

Circuit β-AYZ determines an estimate-set $\{β'\}$ ($β'_0$, $β'_1$, $β'_2$, ... $β'_{M-1}$) consisting of the M components of the information the desired station transmitted, using both data-frame $r_D^{0*}(i)$ and pilot-matrix $\rho'$. $\rho'$ consists of frame set $\{r*_{pm}\}$ with a method described later. Moreover, ordinal numbering is newly applied to such γ components of set $\{β'\}$, that each may take a value closer to ±1 than those of the other components, generating a set $\{\hat{β}^s\}=(\hat{β}_0^s, \hat{β}_1^s, \ldots \hat{β}_{γ-1}^s)$. The figure shows a case with γ=2. By applying $\{\hat{β}^s\}$ to a multi-value to binary value conversion circuit p-s, a detection output $\{\hat{b}\}/u_0$ corresponding to an information-set $\{b\}/u_0$ transmitted from $u_0$, is generated. In this transmission system assuming ($β_m \in ±1,0$), the information quantity I per transmission-frame $e_D(i)$ is given as follows $$I = γ + \log_2({}_MC_γ). \tag{14-A}$$

In the above-described system (A), γ has been fixed. Consider a system with γ not fixed. Let value γ be a natural number less then $γ_{max}$ as the first step, and let γ be components selected from M kinds of sequences as the second step. Consequently, the information quantity of the system is given as follows $$I = \sum_{γ=1}^{γ_{max}} γ + \log_2({}_MC_γ) \tag{14-B}$$
$$(γ = 1, 2, \ldots γ_{max}).$$

(To allow γ to have the degree of freedom of $γ_{max}$ or less, highly-accurate interference elimination technology such as this invention is required.) The description here deals mainly with the case where γ is fixed. If multi-values or complex values were to be used, instead of ±1 for $β_m$, I would become larger than that obtained from the above equation.

Figure 5:
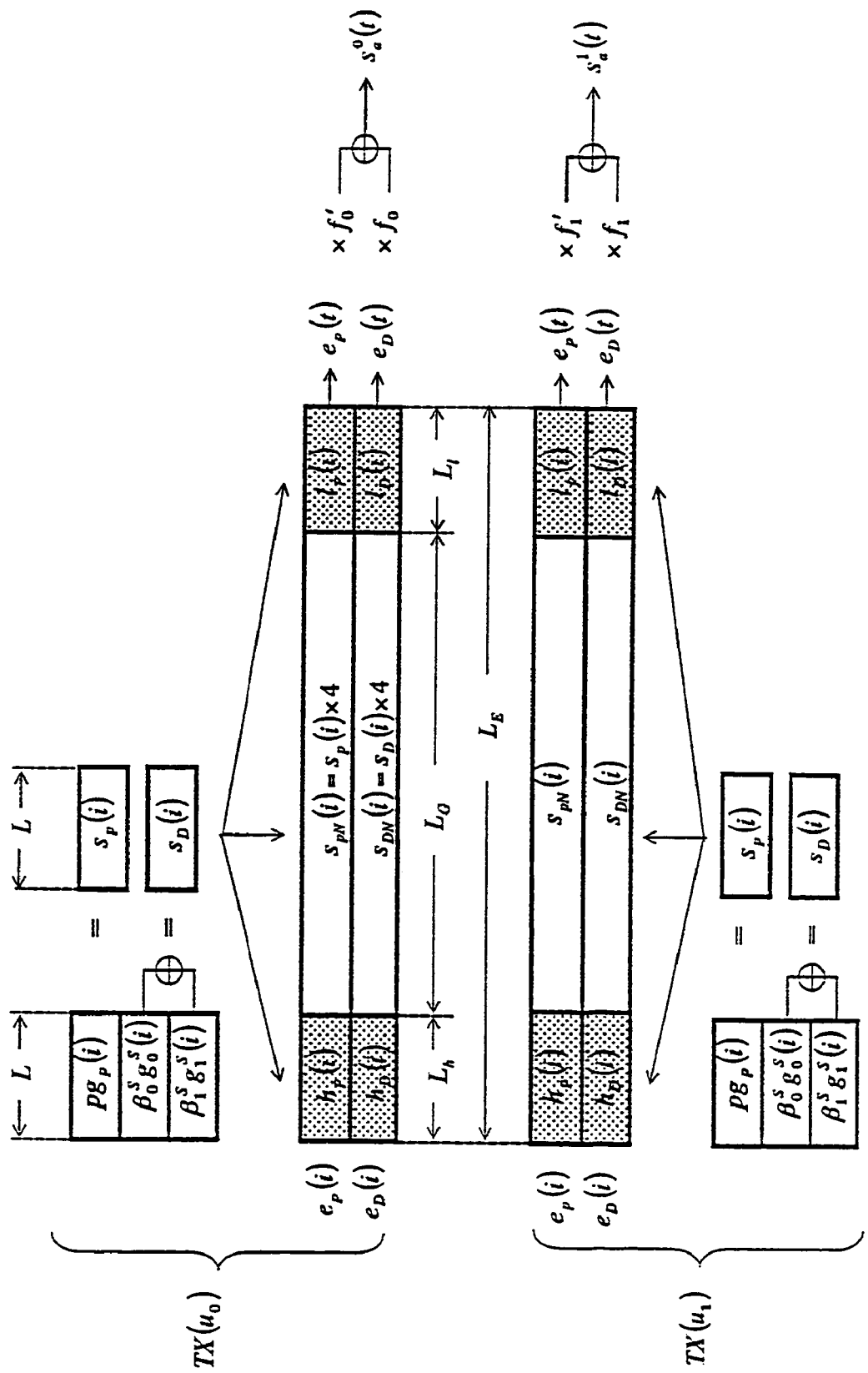
FIG. 5 shows an auxiliary explanatory drawing of FIGS. 2 to 4, indicating a method to compose frequency-division symbol-frames transmitted by the users for the up-link.

FIG. 5 shows an auxiliary explanatory drawing of embodiment-example of FIG. 2, indicating a frequency-division frame-composition on the up-link to be used by a user. This transmission-frame is obtained by synthesizing the pilot- and data-frames. The composing method of a frame transmitted by transmitter TX ($u_k$) of the k-th user $u_k=(k=0,1)$ is described here, as an example.

In TX ($u_o$), a basic spreading sequence $g_p(i)=(g_{p0}, g_{p1}, \ldots g_{pL-1})$ for a pilot with length L (chips) and selected spreading sequences $g_0^s(i)$ and $g_1^s(i)$ for data are provided. The latter two sequences are γ ($\leq M$, γ=2 in this case) sequences selected from M kinds of basic spreading sequences $g_m(i)=(m=0,1,2,\ldots,M-1)$ as described above, with the new ordinal numbers and superscript S. By multiplying these spreading sequences by the pilot information $p(=1)$ and data information $β_0^s$ and $β_1^s$ (±1), illustrated sequences $pg_p(i)$, $β_0^s g_0^s(i)$ and $β_1^s g_1^s(i)$ are generated. The former is a basic pilot-frame $s_p(i)$. A synthesized sequence with sequence length L, made by summing respective chips of the latter two sequences, is a basic data-frame $s_D(i)$.

Similar sequences illustrated as $pg_p(i)$, $β_0^s g_0^s(i)$ and $β_1^s g_1^s(i)$ are made in TX ($u_1$). $g_p(i)$ in this case is the same as the basic spreading sequence for $u_0$, but latter two sequences of $g_0^s(i)$, $g_1^s(i)$ are normally different from data sequences for $u_0$. This is because these data sequences correspond to transmission binary information-set $\{b\}/u_0$ and $\{b\}/u_1$ of $u_0$ and $u_1$, respectively. In TX ($u_o$), based on the basic pilot-frame $s_p(i)$ common to users, a core-sequence $s_{pN}(i)=s_p(i)\times 4$ is produced by repeating N times $s_p(i)$ (N=4 is set in this case) as shown in the figure. By adding a header sequence $h_p(i)$ and a tail sequence $l_p(i)$, as guard sequences, to the front and the rear sides of the core-sequence, an enveloped pilot-frame $e_p(i)$ is produced. Similarly, an enveloped data-frame $e_D(i)$ is produced based on $s_D(i)$. By convolutionally modulating said chip-waveform q(t) with these enveloped frame impulse-sequences, baseband enveloped frame waveforms $e_p(t)$ and $e_D(t)$ are produced, respectively. By modulating carrier-waves $f'_0$ and $f_0$ with these enveloped frames, respectively, and by synthesizing these modulated outputs (addition of respective chip-waveforms on the same time axis), a radio-band transmission-frame $s_a^0(t)$ of $u_0$ is produced.

In the similar manner, TX ($u_1$) produces $s_p^1(t)$ and $s_D^1(t)$. Modulating different orthogonal carrier-waves $f'_1$ and $f_1$ with these frames produces a radio-band transmission-frame $s_a^1(t)$ of $u_1$.

The sequence length $L_E$ (chips) and time width $T_E$ of the above enveloped frames are given by the following equations $$\left.\begin{array}{l} L_E = L_h + L_G + L_l \\ L_G = NL \\ N = 2K \end{array}\right\} \tag{15}$$

$$T_E = L_E T_C \tag{16}$$

where, $L_h$, $L_G$, and $L_l$ are the sequence lengths of the header, core, and tail, respectively, while N is the number of the basic sequence repetition, and also the number of carrier-waves, while $T_c$ is the chip period. In the above example, N=2K=4 has been set for the user population K(=2).

Figure 6:
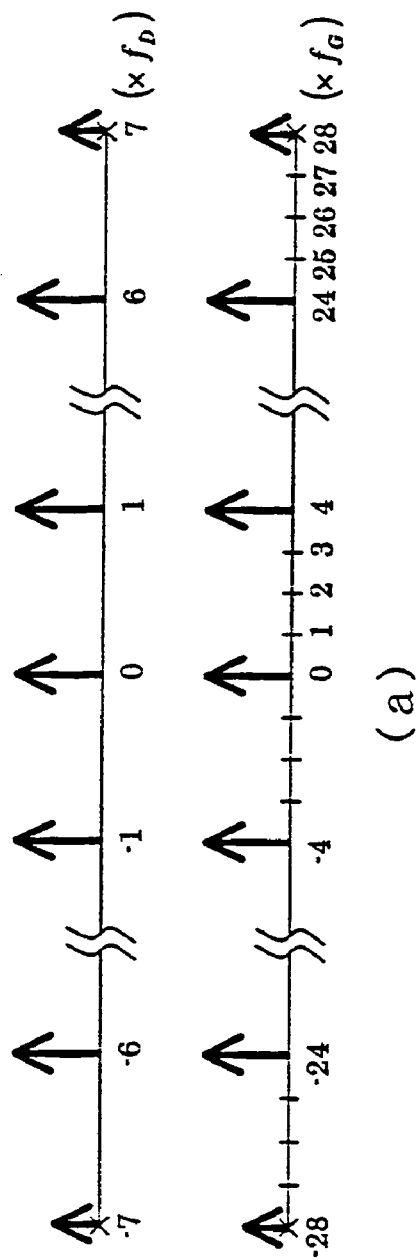
FIG. 6 shows auxiliary explanatory drawings of FIGS. 2 to 4, indicating the spectrum diagram of core-sequence contained in transmission-frames.
Figure 6:
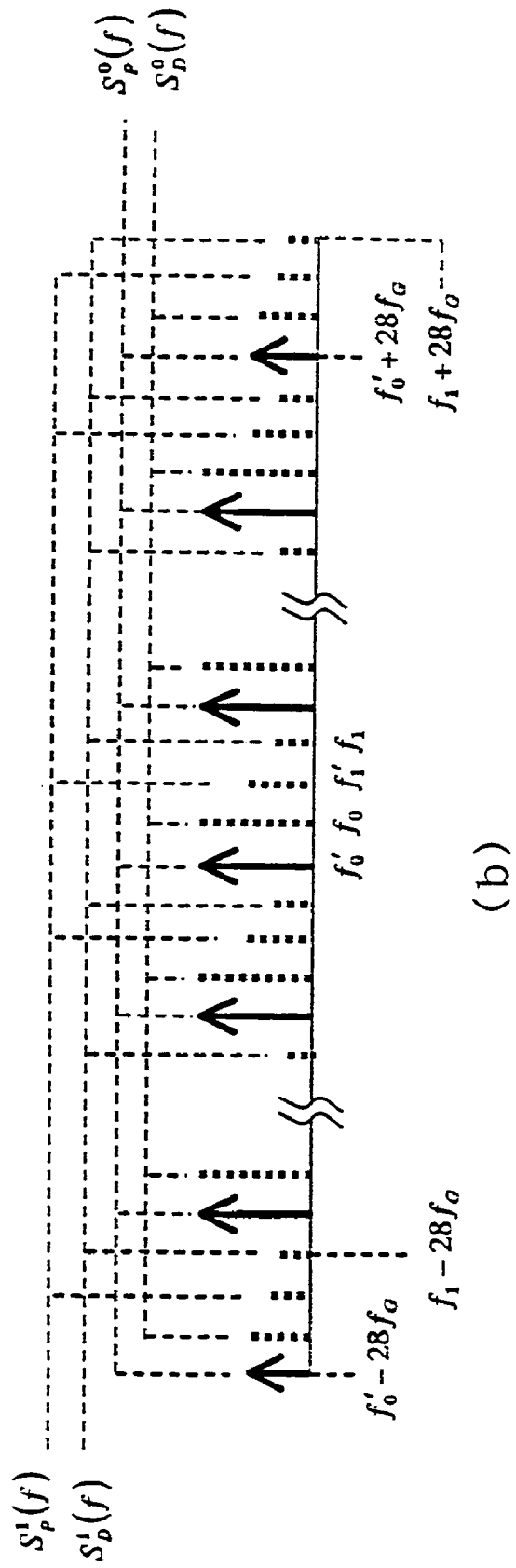

FIG. 6 is an auxiliary explanatory drawing of FIGS. 2 and 5, indicating the spectrum of core-sequence of the transmit-frame. For example, DFT (Discrete Fourier Transformation)

is applied to basic pilot-frame $s_p(i)$ with the length of L chips and to core-sequences $s_{pN}[=s_p(i)\times 4]$ with the length of $L_G(=4L)$ chips, both of which are elements composing of a transmit-pilot-frame. The principal parts of the resultantly obtained frequency spectrum are of shown in FIG. 6(a). The discrete frequencies $f_D$ and $f_G$ and the symbol rates $f_s$ shown in the figure are given as follows $$f_D = T_D^{-1} = (LT_C)^{-1}$$
$$f_G = T_G^{-1} = (L_G T_C)^{-1} = (NLT_C)^{-1}$$  (17)
$$f_S = T_E^{-1} = (L_E T_C)^{-1}$$

where $T_D$ and $T_G$ are the basic sequence-period and repeated sequence-period respectively. The comb-teeth shaped spectrum of FIG. 6 is an example for a case in which a basic sequence with L=7 is used. As $g_p(i)[=s_p(i)]$ consists of seven chips [in this case, an f-type sampling function with roll-off factor $\alpha=1$ is assumed to be used as the chip-waveform $q(t)$.], the spectrum extends up to $\pm 7f_D$ from 0. On the other hand, since core-sequence $g_{pN}(i)$ [$=g_p(i)\times 4$] consists of 28 chips, the spectrum exists up to $\pm 28f_G$ from 0. [Although the spectra on $\pm 7f_D$ and $\pm 28f_G$ are zero, they are represented by a small amplitude in this example.] As both sequences use the same chip period $T_c$, the occupied bandwidths are the same. The number of the latter frequency-slots increases by fourfold of the former, and the spectrum exists in one quarter of all the slots, while others are empty slots because of the effect of sequence repetition.

The spectrum of core-sequence $s_{pN}(i)$ [$=s_p(i)\times 4$] occupies the comb-tooth shaped frequency-slot similarly. Assuming that $f_{00}$ is an arbitrary reference-frequency, the following relationship may be applied to said carrier-waves used by $u_k$ $$f'_k = f_{00} + 2kf_G$$
$$f_k = f_{00} + (2k+1)f_G.$$  $(k = 0, 1, 2, \ldots K-1)$  (18)

In this case, let us relate the time waveform and the spectrum as follows $$s_{pa}^k(t) \longleftrightarrow S_p^k(f)$$
$$s_{Da}^k(t) \longleftrightarrow S_D^k(f).$$

Thus such a synthesized spectrum is obtained that the spectra of the respective frames may be not mutually overlap, as shown in FIG. 6(b). [$s_p^0(f)$ is represented by a bold solid line while the spectrum corresponding to each frame is represented by different amplitudes to understand the distinction.]

Discretely distributed multiplexing on the frequency axis by using carrier-waves with orthogonal frequencies having such relationship as expressed in Eq. (18) is thus provided. As a consequence, the frame components modulated with many different frequencies which are contained in a synchronously received frame with period $T_G$ become mutually orthogonal. Therefore, the receiver can perform correlative demodulation so as to separate these frame components.

Figure 7:
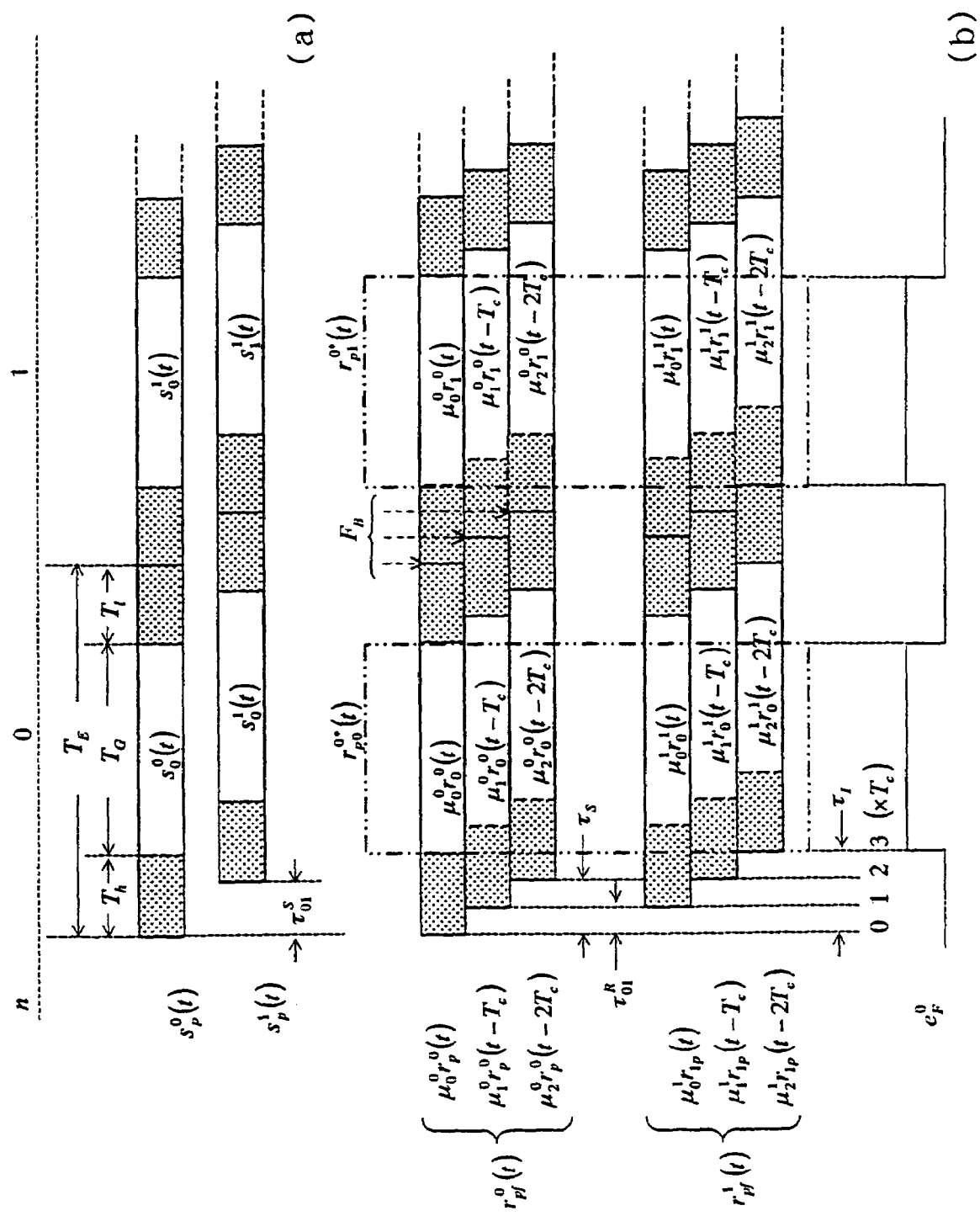
FIG. 7 shows auxiliary explanatory drawings of FIGS. 2 to 4, indicating the time-sequence-diagram of continuous-time-waveforms of transmit- and receive-frames.

FIG. 7 shows an auxiliary explanatory drawing of the embodiment-example of FIGS. 2 and 4, indicating the time sequence drawing of received frames with continuous time waveform. For simplicity, under such assumption that only the pilot-frames among the symbol frames in FIG. 5 are transmitted, the time relationship between a baseband transmit-frame and received frames is shown in FIG. 7. FIG. 7(a) shows the k-th pilot-signals $s_p^k(t)$, $u_k(k=0,1)$ has transmitted. This is an waveform equivalent to the extended frame $e_p(t)$ shown in FIG. 5. The enveloped frames corresponding to a time-sequence-frame-number n shown in the top portion of the drawing is represented by $s_n^k(t)(k=0,1, n=0,1, \ldots)$ where subscript p is omitted. The time difference $\tau_{01}^s$ between $s_p^0(t)$ and $s_1^0(t)$ is controlled with a down-link control channel, so that the receiving time difference $\tau_{01}^R$ may become smaller in the receiver.

FIG. 7(b) shows the flock-frames $r_{pf}^k(t)$ received in correspondence with transmitted pilot-signals $s_p^k(t)$ in FIG. 7(a). The flock-frame shown in the figure, as an example, consists of the principal wave $\mu_0^k r_p^k(t)$ and the delayed waves, $\mu_1^k r_p^k(t-T_c)$ and $\mu_2^k r_p^k(t-2T_c)$, which are received at timings delayed by $T_c$ and $2T_c$ seconds from the principal wave. $\mu_j^k(j=0, 1, 2, \ldots J-1$. J=3 in this case) is the complex amplitude of the principal wave and delayed waves obtained by demodulating the received wave with the pilot carrier-wave $\hat{f}_k$ of the desired station. [In practice, a delayed wave is received at a delayed timing equivalent to a real-value multiple times of $T_c$. As this wave can be converted into a sum of plural delayed frames each consisting of sampled values obtained by correlator $C_{or}(q)$ in FIG. 4, at time position $jT_c$, that is integer multiples of $T_c$. Therefore, correct demodulation can be performed by analytically processing this converted output. For this reason, this example shows only waves with delay times of integer multiple.]

In FIG. 7, let us notice the first (n=0) frame, one can find that the time range of the core-sequence of the enveloped principal wave frame $\mu_0^0 r_0^0(t)$ received from desired station $u_o$ is designated by a synchronously received frame-pulse $e_F^0$. Signals received with this timing (all the signals enclosed by the dotted line frames) are denoted by $r_{po}^{0*}(t)$. $e_F^0$ shown in the lower part of the figure is generated in the synchronizing circuit of the receiver shown in FIG. 4. Pilot-frame $r_{po}^{0*}(t)$ is extracted and analyzed as described later.

A time difference $\tau_s$ shown in FIG. 7(b) is the difference between the received frame (principal wave) of the desired station and the wave incoming with the maximum delay (or advance) (the frame delayed by $2T_c$ sec in this figure) among the self-interference-waves. $\tau_I$ is the similar time difference from the wave incoming with the maximum delay (or advance) among the inter-station interference-waves. $\tau_I$ contains also the delay $\tau_{01}^R$ between principal waves as above-described. Here, the time width for the header and the tail is set as follows $$T_h, \geq \tau_s, \tau_I \quad (\tau_s, \tau_I > 0)$$
$$T_l, \geq -\tau_s, -\tau_I \quad (\tau_s, \tau_I < 0).$$  (19)

As $\tau_s$ and $\tau_I$ are determined by the cell radius and topography, $T_h$ and $T_l$ can be designed to meet the above equation. [Note that $r_0^0(t)$ is used as a time reference. Therefore, negative-polarity $\tau_s$ and $\tau_I$ may occur, if there are any interfering waves coming in advance to $r_0^0(t)$ or self-preceding waves $r_0^0(t+T_c)$, because in the time difference calculation, $r_0^0(t)$ is used here as a reference. The time width $T_l$ of the tail plays a role of guard sequence against such negative-polarity time difference.]

FIG. 7(b) shows a case in which a quasi-synchronization-condition as above-described is satisfied. In this case, both interference components, such as $\mu_1{}^0 r_0{}^0(t-T_c)$ and $\mu_2{}^1 r_0{}^1(t-2T_c)$ contained in the synchronously received frame $r_{p0}{}^{0*}(t)$, are sequences made by multiplying cyclically shifted sequences of the core-sequence-portions (period $T_G$) of $s_0{}^0(t)$ or $s_0{}^1(t)$ by the complex amplitude. If Eq. (19) is not satisfied, the slant portion in $r_{p0}{}^{0*}(t)$ generally results in containing the tail or header of an preceding (n=−1) or succeeding (n=1) frame carrying different information [$\beta_0{}^s$, etc.] from that of the desired station or the interference station. In consequence, interference components fail to become simple N-time repeated sequences of a certain sequence, so that the orthogonal relationship on the frequency axis explained in FIG. 6 is lost. Namely, if Eq. (19) is satisfied and, as a result, the boundary $F_B$ of information modulation of flock-frames received from the desired station or an interference station is not contained in $r_{p0}{}^{0*}(t)$, an orthogonal relationship due to the orthogonal carrier-waves is established between the components of synchronously received frames of $r_{pf}{}^0(t)$ and $r_{pf}{}^1(t)$, so that existence of preceding and succeeding frames can be ignored during demodulation of $r_{p0}{}^{0*}(t)$. This means that there is no interference from other stations. For the same reason, by assuming that the data-frame is transmitted within the same time span from $u_o$, the synchronously received data-frame $r_D{}^{0*}(t)$ is obtained in the same manner. Even if this component is contained in the same synchronously received frame-period as that of $r_{p0}{}^{0*}(t)$, mutual orthogonal relationship is established, because the component exist on the frequency-slot corresponding to the different frequency $f_0$, and both components are the similar repeated sequences. Therefore, the synchronously-received pilot- and data-frames of the same user can be separated in the demodulating analysis. According to this principle, the receiver can obtain isolated pilot-responses so as not to be affected by the interference disturbance as described later.

Figure 8:
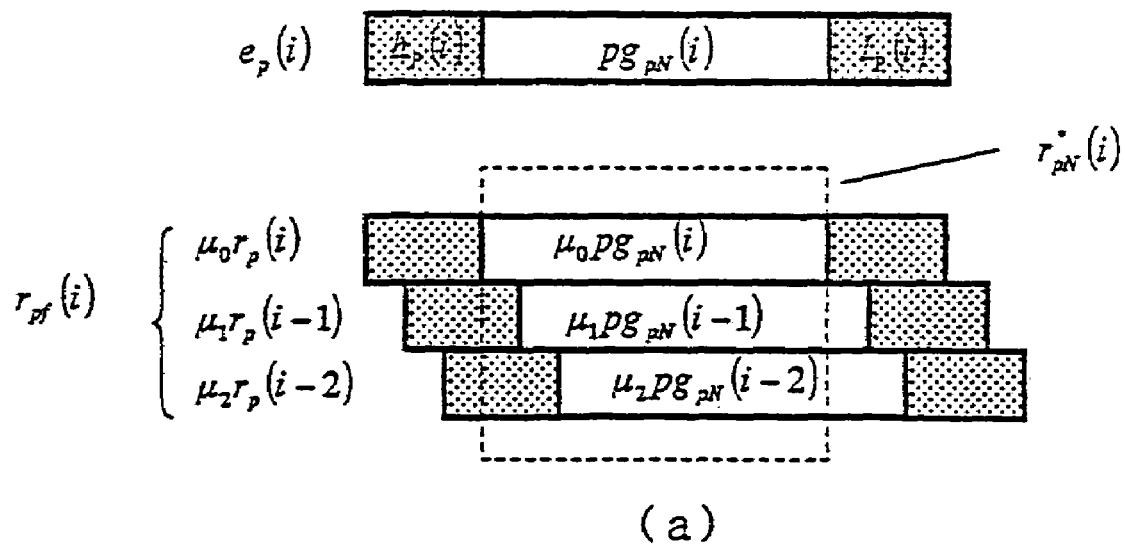
FIG. 8 shows auxiliary explanatory drawings of FIG. 7, indicating the detailed view of baseband transmit- and receive-symbol-frames of a single user ($u_o$).
Figure 8:
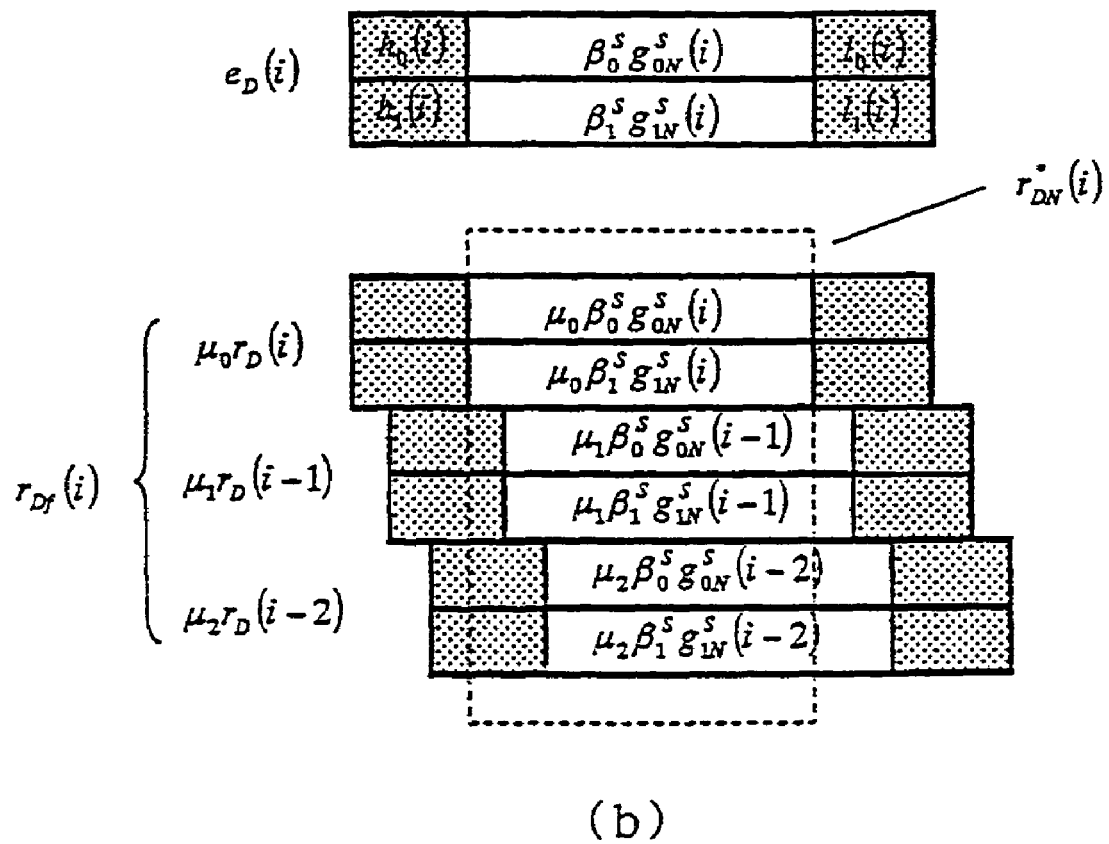

FIG. 8 is an auxiliary explanatory drawing of FIG. 7, which is the detailed drawing of baseband transmit and received symbol-frames of a single user. Therefore, this drawing provides description while omitting the superscript indication of the user number k and the time sequence ordinal number n. FIG. 8(a) shows the enveloped pilot-frame $e_p(i)$ and the corresponding received flock-frame $r_{pf}(i)$ as explained in FIG. 5. Assuming that N=4, the core-sequence of enveloped sequence $e_p(i)$ is $pg_{pN}(i)$ [=$s_p(i) \times 4$], while the header $h_p(i)$ and tail $l_p(i)$ are also contained in $e_p(i)$. Generally, the repeated sequence $r^*_{pN}(i)$ is given by the following equation $$r^*_{pN}(i) = \sum_{j=0}^{J-1} \mu_j g_{pN}(i-j) + x_p(i) \qquad (20)$$
$$= (\overline{p}'_{00}, \overline{p}'_{01}, \ldots \overline{p}'_{L-1}, \overline{p}'_{11}, \ldots \overline{p}'_{1,L-1}, \ldots \overline{p}'_{N-1,L-1})$$
$$(i = 0, 1, 2, \ldots NL-1)$$

where, $\overline{p}'_{s,i}$ indicates the i-th (=0,1,2, ... L−1) chip amplitude in the s-th (=0,1,2, ... N−1) unit sequence which is made by repeating N-times one unit (basic) sequence with L chips. Prime symbol ' indicates what contains of a deviation due to AWGN. Here i and j are used to represent the discrete value of the time variable $t=iT_c$ and the delay time variable $\tau=jT_c$. This example received frame consists of three waves in correspondence with J=3. [For $r_{pf}(i)$, and $r_{Df}(i)$ to be described later, the symbol indication of the header and tail in the drawing is omitted.] Note also that $x_p(i)$ is AWGN.

FIG. 8(b) shows enveloped data-frame $e_D(i)$ shown in FIG. 5 and flock-frame $r_{Df}(i)$ corresponding to this frame. $g_{0N}{}^S(i)$ is the sequence obtained by repeating the 0-th selected basic spreading sequence by N times. The difference from FIG. 8(a) is that each wave is composed of a sum of two sequences in correspondence to γ=2. Therefore, in this example, the components of synchronously received data-frame $r^*_{DN}(i)$ received on the synchronously received period denoted by $r^*_{p0}(t)$ in FIG. 7 are of NL chips consisting of γJ=6 sequences. Assuming $\hat{\mu}_j$ be the complex amplitude of the j-th delayed wave of the data-frame delayed by $jT_c$, and $x_D(i)$ be AWGN, $r^*_{DN}(i)$ is given by the following equation:

$$r^*_{DN}(i) = \sum_{m=0}^{M-1} \sum_{j=0}^{J-1} \hat{\mu}_j \beta_m g_{mN}(i-j) + x_D(i) \qquad (21)$$
$$= (\overline{d}'_{00}, \overline{d}'_{01}, \ldots \overline{d}'_{0,L-1}, \overline{d}'_{10}, \overline{d}'_{11}, \ldots \overline{d}'_{1,L-1}, \ldots \overline{d}'_{N-1,L-1})$$

where, $\overline{d}_{s,i}'$ indicates the i-th component of the s-th unit sequence, similarly to the case of $\overline{\sigma}_{s,i}'$. Both frames $r'_{DN}(i)$ and $r'_{pN}(i)$ are produced by repeating N-times a unit sequence with L chips. Therefore, by averaging N same chip components on the unit sequences concerned, they can be converted in to components composed of L chips. (The noise power reduces 1/N fold.) Accordingly, at averaging circuit A0s contained in $D_p{}^0$ and $D_D{}^0$ of FIG. 4, $r^*_{pN}(i)$ and $r^*_{DN}(i)$ with NL chips can be converted into synchronously received pilot- and data-frames, each consisting of L chips, by carrying out an averaging operation given by the following equations $$\rho'_i = \frac{1}{N} \sum_{S=0}^{N-1} \overline{p}'_{S,i} \qquad (22)$$
$$d'_i = \frac{1}{N} \sum_{S=0}^{L-1} \overline{d}'_{S,i}.$$

[This averaging operation can be included in the solution processing of Eq. (29) or the correlation processing of Eq. (25) to be described later. Note also that the component shown with the third and fourth terms in, Eqs. (12) and (13) becomes zero through this averaging operation.]

$$r^*_p(i) = \sum_{j=0}^{L-1} \mu_j g_p(i-j) + x_p(i) = (\rho'_0, \rho'_1, \ldots \rho'_{L-1}) \qquad (23)$$

$$r^*_D(i) = \sum_{m=0}^{M-1} \sum_{j=0}^{J} \hat{\mu}_j \beta_m g_m(i-j) + x_D(i) = (d'_0, d'_1, \ldots d'_{L-1}). \qquad (24\text{-A})$$

Comparing Eqs. (23) and (24), and noticing that $\mu_j$ and $\hat{\mu}_j$ (j=0,1,2) can be converted mutually, and $\beta_m{}^s = \pm 1$ hold good for p=1, one can find that the value of $\beta_m{}^s$ may be obtained by analyzing $r^*_D(i)$ with $r^*_p(i)$. The specific approach is described.

The matched filter MF(z) in FIG. 4 is of matched to a sequence z(i). z(i) is a pilot analyzing sequence with sequence length L, and it satisfies the following cyclic cross correlation function $R_{pz}$ $$R_{pz}(\tau) = \frac{1}{L}\sum_{i=0}^{L-1} g_p(i)\overline{z(i-\tau)} = 1 \quad \tau = 0 \\ = 0 \quad \tau \neq 0 \quad (25)$$

where $g_p(i)$ is a basic spreading sequence for pilot, while $^-$ is a symbol denoting the complex conjugate. A cyclic cross-correlation-function $\{\mu\}$ between this pilot analyzing sequence z(i) and synchronously received pilot-frame $r^*_p(i)$ which omits the subscript of user number k is a channel-response representing the transmission-path characteristics, and it is given by the following equation, assuming AWGN is zero (x(i)=0)

$$\mu_j = \frac{1}{L}\sum_{i=0}^{L-1} r_p^*(i)\overline{z(i-j)} \quad (J < L, j = 0, 1, 2, \ldots J-1) \quad (26\text{-}A)$$
$$\{\mu\} = \sum_{j=0}^{J-1} \mu_j \delta(i-j) = (\mu_0, \mu_1, \ldots \mu_{J-1})$$

where $\mu_j$ is the received frame amplitude delayed by $jT_c$ from the direct wave, as shown in FIGS. 7(*b*) and 8(*b*), and it takes generally a complex value. For J≧L, the above equation is expressed as follows, because the delayed wave delayed by $nLT_c(n=0,1,2,\ldots)$ is detected in an overlapped manner $$\{\mu\} = (\mu'_0, \mu'_1, \ldots \mu'_{L-1}) \quad (J \geq L) \quad (26\text{-}B)$$
$$\mu'_j = \sum_{n=0}^{N'} \mu_{j+nL} \quad \{N' = [J/L], j = 0, 1, 2, \ldots L-1\}$$

where [ ] is Gauss symbol. Thus, the channel-response $\{u^k\}$ which corresponds to the transmission-path characteristics $TL_k$ in FIG. 2 without being affected by disturbance of the interference-waves may be obtained under conditions in Eqs. (18) and (19), by the aid of the isolated pilot. [However, this response is disturbed by AWGN. Besides, the output $\{u^0\}$ of MF(z) in FIG. 4 corresponds to $TL_0$ in FIG. 3]

Now, let us fabricate (synchronously received) fabricated pilot-frame $r^*_{pm}(i)$, which would be obtained when a pilot-frame were to be transmitted using a basic spreading sequence $g_m(i)$ for data, instead of using basic spreading sequence $g_p(i)$ for pilot. This response is L chip components which are produced from both modified channel-response $\{\hat{\mu}\}$ to be described later, and $g_m(i)$ at a fabricated frame generator FFG in FIG. 4, as expressed by $$r_{pm}^*(i) = \sum_{j=0}^{J-1} \hat{\mu}_j g_m(i-j) + x_p(i) = (\rho'_{m0}, \rho'_{m1}, \ldots \rho'_{m,L-1}) \quad (27)$$

where $\rho_{mi}(i=0,1,2,\ldots L-1)$ is the i-th chip amplitude and prime symbol ' indicates that the deviation caused by AWGN is included.

Assume here that enveloped pilot-frame $e_p(i)$ has been transmitted simultaneously using carrier-waves for pilot and data, $f_k$ and $f_k$, as shown in Eq. (18). The receiver is assumed to demodulate the received frame with the local carrier-waves $\hat{f}_k$ and $\hat{f}_k$, generating synchronously received frames $r^*_p(i)$ and $r^*_D(i)$ in Eq. (23) and (24). These frames are assumed to be applied respectively to two matched filters MF(z) similar to those shown in FIG. 4, producing correlation function outputs $\{\mu\}$ and $\{\hat{\mu}\}$ as expressed by Eq. (26). In this case, there exists the following relationship between j-th components of these outputs.

$$\hat{\mu}_j = \mu \exp(\sqrt{-j\theta}) \\ \theta = 2\pi f_G jT_c \quad (28)$$

In this case, $f_G$ is the shift frequency in Eq. (17) while $jT_c$ is the delay time of the j-th delayed wave. When carrier-waves carrying the signal have different frequencies, a phase rotation θ takes place in their channel-response. Therefore, when producing fabricated pilot-frame $r^*_{pm}(i)$ to analyze data-frame $r^*_D(i)$, the corrected response $\{\hat{\mu}\}$ must be used.

[Direct Analysis Method]

The data-frame in Eq. (24-A) is represented by means of the fabricated pilot-frame in Eq. (27), as follows $$r_D^*(i) = \sum_{m=0}^{M-1} \beta_m r_{pm}^*(i) + x'_D(i) = (d'_0, d'_1, \ldots d'_{L-1}) \quad (24\text{-}B)$$

where, $x'_D(i)$ is AWGN generated based on $x_D(i)$ and $x_p(i)$ in Eqs. (24) and (27). Considering that $\beta_m$ consists of M components, the pilot-frame may be rewritten as follows by using an expression with transposed elements in Eq. (27) (changing the subscript order)

$$[\rho'][\beta'] = [d'] \quad (29)$$
$$\begin{pmatrix} \rho'_{00} & \rho'_{01} & \cdots & \rho'_{0m} & \cdots & \rho'_{0,M-1} \\ \rho'_{10} & \rho'_{11} & \cdots & \rho'_{1m} & \cdots & \rho'_{1,M-1} \\ \vdots & \vdots & & \vdots & & \vdots \\ \rho'_{n0} & \rho'_{n1} & \cdots & \rho'_{n0} & \cdots & \rho'_{n,M-1} \\ \vdots & \vdots & & \vdots & & \vdots \\ \rho'_{L-1,0} & \rho'_{L-1,1} & \cdots & \rho'_{L-1,i} & \cdots & \rho'_{L-1,M-1} \end{pmatrix} \begin{pmatrix} \beta'_0 \\ \beta'_1 \\ \vdots \\ \beta'_n \\ \vdots \\ \beta'_{L-1} \\ \beta'_L \\ \vdots \\ \beta'_{M-1} \end{pmatrix} = \begin{pmatrix} d'_0 \\ d'_1 \\ \vdots \\ d'_n \\ \vdots \\ d'_{L-1} \end{pmatrix}$$

$$\rho'_{nm} = \rho_{nm} + \Delta\rho_{nm} \\ \beta'_n = \beta_n + \Delta\beta_n \\ d'_n = d_n + \Delta d_n \quad (30)$$

where, ρ', β', and d' are respectively the pilot matrix with size (L×M) consisting of $\rho'_{nm}$ as the element on the n-th column and the m-th row, an unknown matrix consisting of $\beta'_n$ as the element, and the received data-matrix consisting $d'_n$ as the element. Prime symbol ' indicates what deviated components ($\Delta_{pnm}$, $\Delta\beta_n$, $\Delta d_n$) due to AWGN shown in Eq. (30) are contained. The method of detecting the transmitted information by solving Eq. (29) is called a direct analysis method.

[Maximum Likelihood Judgment Method]

Normally, the solution can be obtained for Eq. (29) when $M \leq L$. Even when $M > L$, the solution can be obtained according to a method such as the maximum likelihood solution, as long as $\gamma \leq L$, considering that $(M-\gamma)$ elements among M elements consisting of unknown set $\{\beta\}$ takes zero. Three methods to obtain the maximum likelihood solution are specifically described as follows.

Solution (a):

Decrease M unknown variables in Eq. (29) and select an optional integer $M_R$ that satisfies the following equation.

$$\left.\begin{array}{r} M > M_R \geq \gamma \\ M_R \leq L. \end{array}\right\} \quad (31)$$

Let the 0-th arrangement-set among $N_R$ reduced size unknown sets be $\{\beta^R\}_0 = (\beta_0^R, \beta_1^R, \ldots \beta_m \ldots \beta_{M_R-1}^R)$, and $N_R$ is given by $$N_R = {}_M C_{M_R}. \quad (32)$$

Prepare similarly $N_R (= {}_M C_{M_R})$ sets $\{\beta^R\}_v (v=0,1,2, \ldots N_R-1)$. In this case, the reduced size system of linear equations (with $M_R$ unknowns) holds good as follows, where the size of Eq. (29) is reduced to $(M_R \times M_R)$ for $\{\beta^R\}_0$.

$$\begin{pmatrix} \rho'_{00} & \rho'_{01} & \cdots & \rho'_{0,M_R-1} \\ \rho'_{10} & \rho'_{11} & \cdots & \rho'_{1,M_R-1} \\ \vdots & \vdots & & \vdots \\ \rho'_{M_R-1,0} & \rho'_{M_R-1,1} & \cdots & \rho'_{M_R-1,M_R-1} \end{pmatrix} \begin{pmatrix} \beta'_0 \\ \beta'_1 \\ \vdots \\ \beta'_{M_R} \end{pmatrix} = \begin{pmatrix} d'_0 \\ d'_1 \\ \vdots \\ d'_{M_R-1} \end{pmatrix}. \quad (33)$$

Generally, the solution of above equation is obtained under a condition that $M_R$ satisfies Eq. (31).

When all of $\gamma$ components of selected information were to be contained in set $\{\beta^R\}_0$ stated above, the solution $\{\beta^{R'}\}_0$ of Eq. (33) would take the maximum likelihood solution ($\{\beta^R\}_0^H$) that is one of correct combinations [such combinations, that $\gamma$ elements in the above reduced unknown sets $\{\beta^R\}_0$ take $\pm 1$, while the remaining $(M_R-\gamma)$ elements take 0]. If it is not satisfied, the above solution takes considerably different values from any combination of the correct values. Let us define deviations representing the distance between the m-th unknown (solution) $\beta_m^{R'}$ among $M_R$ elements of $\{\beta^{R'}\}_0$ composing of a solution of Eq. (33) and the transmitted information $\beta_m = 0, \pm 1$ by the following equations $$\left.\begin{array}{l} \Delta_{m0} = |\beta_m^{R'}| \\ \Delta_{m+} = |\hat{\alpha}_m^{R'} - 1| \\ \Delta_{m-} = |\hat{\alpha}_m^{R'} + 1|. \end{array}\right\} \quad (34)$$

Here, the minimum value of the three deviations for one unknown solution is taken and represented as $\Delta_m^A (\in \Delta_{m+}, \Delta_{m-})$ or $\Delta_m^B (\in \Delta_{m0})$. Let us align $\Delta_m^A$ and $\Delta_m^B$ in the order from small to large, respectively, provide new superscripts A and B with respective values, provide individual ordinal numbers $n=(1,2,\ldots)$ with the elements composing of respective sets, and represent these deviation sets as $\{\Delta^A\}_0 = \{\Delta_0^A, \Delta_1^A \ldots \Delta_{\gamma-1}^A\}_0$, sets $\{\Delta^B\}_0 = \{\Delta_0^B, \Delta_1^B \ldots \Delta_{M_R-\gamma-1}^B\}$. Then, prepare the other unknown $\{\beta_R\}_v (v \neq 0)$, and determine the similar deviation sets $\{\Delta^A\}_v$ and $\{\Delta^B\}_v$ from the respective sets. For these deviation sets, as a deviation evaluation function, a following algebraic sum of constituent elements is calculated $$S_v = \sum_{n=0}^{\gamma-1} \Delta_n^A + \sum_{n=0}^{M_R-\gamma-1} \Delta_n^B \quad [\Delta_n^A \in \{\Delta_n^A\}_v, \Delta_n^B \in \{\Delta_n^B\}_v] \quad (35)$$

This is the evaluation function for v being fixed. (Such candidates that the number of members composing $\Delta_n^A$ takes a number other than $\gamma$ should be excluded.) For $N_R$ unknown sets, the similar evaluation functions are obtained. If $S_{v'}$ of these sets takes the minimum value, then said unknown set $\{\beta^R\}_{v'}$ is obtained as the maximum likelihood set $\{\beta^R\}_{v'}^H$. By making hard decisions whether this set is positive or negative, the detected set $\{\hat{\beta}^s\} = (\hat{\beta}_0^s, \hat{\beta}_1^s, \ldots \hat{\beta}_{\gamma-1}^s)$ corresponding to $\{\beta^s\}$ is obtained. Applying $\{\hat{\beta}^s\}$ to a parallel to serial converter p-s in FIG. 4 produces detected output $\{\hat{b}\}$ corresponding to the transmitted binary set.

For a case of $\gamma$ being not fixed, $\{\hat{\beta}^s\}$ may be determined based on $\gamma$ which satisfies the following equation $$\left.\begin{array}{r} \gamma \leq \gamma_m \\ (\Delta_{\gamma-1}^A - \Delta_{\gamma-2}^A) / (\Delta_\gamma^A - \Delta_{\gamma-1}^A) \ll 1. \end{array}\right\} \quad (36)$$

Solution (b):

Select sets $U_s (s=0,1,2, \ldots N_u-1)$, each consists of $\gamma$ pieces of M fabricated pilot-frames $r^*_{pm}$. There are $N_u = {}_M C_\gamma$ sets as the possible combinations. On condition of excluding the case of all polarity inversion, $2^{\gamma-1}$ pieces of virtual (transmitted information) sequences $C_h (= c_0, c_1, \ldots c_{\gamma-1})$, each consisting of $\gamma$ fabricated pilot-frames whose polarity take $+1$ or $-1$ can be produced. By multiplying the element frame consisting of each set of $U_s$ by the element (polarity) of $C_h$ sequentially, plural pieces of receivable fabricated transmission-frames $F_{sh}$ are generated. This combination amounts to $2^{\gamma-1} N_u$, in excluding the case of polarity inversion. For simplicity, a case for M=4 and $\gamma=2$ is explained as follows.

As the fabricated pilot-frames in this case are $r^*_{pm}(i)(m=0,1,2,3)$, let one set selected from those frames be $U_0[\gamma^*_{p0}, r^*_{p1}]$ according to $\gamma=2$. As a result, fabricated transmission-frames $F_{sh}(i)$ are given by the following equations, based on $U_0$ and $C_h$, where two virtual sequences $C_0(=1,1)$ and $C_1(1,-1)$ exist $$\left.\begin{array}{l} F_{00}(i) = [U_0 / C_0] = r^*_{p0} + r^*_{p1} \\ F_{01}(i) = [U_0 / C_1] = r^*_{p0} - r^*_{p1}. \end{array}\right\} \quad (37)$$

Similarly, fabricated transmission-frames are obtained for the other sets $U_1$ to $U_5$, producing twelve frames in total. The 0-shift-correlation value between synchronously received data-frame and each of the fabricated transmission-frames is given by $$R_{sh} = \frac{1}{L} \sum_{i=0}^{L-1} r^*_D(i) \cdot \overline{F_{sh}(i)} \quad (s = 0, 1, \ldots 3, h = 0, 1) \quad (38)$$

Among the twelve frames, a fabricated transmission-frame whose $R_{Sh}$ takes a value closest to ±1 is identified using the following evaluation functions $$S_{sh+} = |R_{sh} - 1| \atop S_{sh-} = |R_{sh} + 1|. \qquad (39)$$

The subscript s of $S_{sh\pm}$ determines $\beta_m$ corresponding to the combination and order of $r^*_{pm}(i)$, while h and +, − determine the polarity of $\hat{\beta}_m$. For example, if the evaluation function taking the minimum value is $S_{00+}$ or $S_{01-}$, the detected value of the transmitted information $\{\hat{\beta}^s\}=(\hat{\beta}_0^S, \hat{\beta}_1^S)$ may be obtained from the following relationship $$S_{00+} \to \min: \quad \hat{\beta}_0 = \hat{\beta}_1 = 1 \atop S_{01-} \to \min: \quad \hat{\beta}_0 = -\hat{\beta}_1 = -1. \qquad (40)$$

Solution (c)

Derive an analyzing sequence $w_m(i)$ that satisfies the following equation, in which the 0-shift-correlation value between $w_m(i)$ and fabricated pilot-frame $r^*_{pm}(i)$ in Eq. (27) takes 1, while the 0-shift-correlation value between $w_m(i)$ and each of $M_T(\gamma < M_T \leq M-1)$ pieces of $r^*_{pm'}(i)(m' \neq m)$ takes 0:

$$\frac{1}{L}\sum_{i=0}^{L-1} r^*_{pm}(i) \cdot \overline{w_m(i)} = 1 \atop \frac{1}{L}\sum_{i=0}^{L-1} r^*_{pm'}(i) \cdot \overline{w_m(i)} = 0 \ [m, m' \in 0, 1, 2, \ldots M] [m' \neq m] \qquad (41)$$

Since $r^*_{pm}(i)$ has L chips in length, $w_m(i)$ also takes L in length. Considering [m=0,m'∈0,1,2, … $M_T,M_T \leq (L-1)$)<M] as an example of the combination, the following equation is obtained using an analyzing sequence omitting the subscript m, $w(i)=(w_0, w_1, \ldots w_{L-1})^T$ $$\begin{pmatrix} \rho'_{00} & \rho'_{01} & \cdots & \rho'_{0,L-1} \\ \rho'_{10} & \rho'_{11} & \cdots & \rho'_{1,L-1} \\ \vdots & \vdots & & \vdots \\ \rho'_{M_T,0} & \rho'_{M_T,1} & \cdots & \rho'_{M_T,L-1} \end{pmatrix} \begin{pmatrix} w'_0 \\ w'_1 \\ \vdots \\ w'_{L-1} \end{pmatrix} = \begin{pmatrix} 1 \\ 0 \\ \vdots \\ 0 \end{pmatrix} \qquad (42)$$

shown in where $\rho'_{mn}$ is the element given by Eq. (27). For m fixed, produce multiple combinations of m', that is denoted by [m'], amounting to $N_m = [(M-1)/(M-1-M_T)]+1$, ([ ] is a Gauss symbol). Let $w_{m[m']}(i)$ be the analyzing sequence corresponding to each of the combinations. Thus, $N_m$ analyzing sequences stated above can cover the (M−1) kinds of sequence areas. Using these sequences, the 0-shift-correlation value given by the following equation is obtained $$R_{m[m']} = \frac{1}{L}\sum r^*_D(i) \cdot \overline{w_{m[m']}(i)} \quad m = (0, 1, 2, \ldots M-1) \atop [m'] = [1'], [2'], \ldots [N'm']. \qquad (43)$$

If all of γ components of transmitted information $\{\beta^s\}$ is contained in $\beta_m$ and $\beta_{[m']}$, these correlation values indicate values extremely close to ±1. Therefore, by identifying a set of γ components taking the nearest correlation values to ±1 among $R_{m[m']}$ determined for all of MNm' combinations, as the maximum likelihood set, using the evaluation function similar to that in Eq. (39), the respective γ correlation values $R_{\hat{m}[m']}(\hat{m}=0,1,2, \ldots \gamma-1)$ become the maximum likelihood solution. The detected values of the transmitted information $\{\hat{\beta}^s\}=(\hat{\beta}_0^s, \hat{\beta}_1^s, \ldots \hat{\beta}_{\gamma-1}^s)$ can be determined by making these solutions on the hard decision.

[Correlation Analysis Method]

Figure 9:
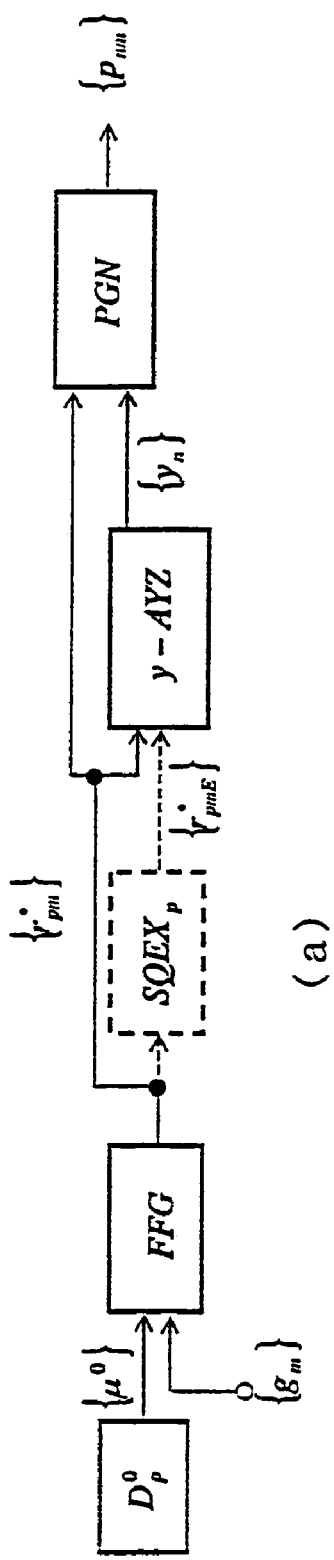
FIG. 9 shows the block diagrams of a receiver RX ($u_o$) used by the second embodiment-example of the invention.
Figure 9:
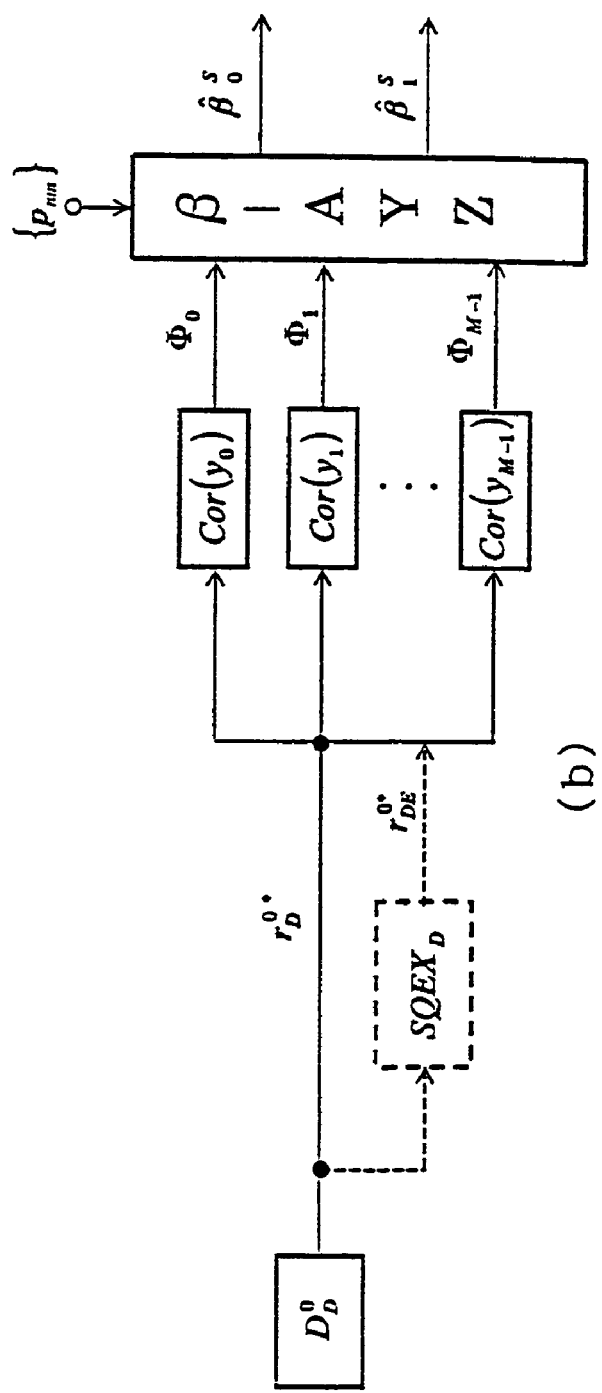

Instead of analyzing $r^*_D(i)$ in Eq. (24) with $r^*_{pm}(i)$ in Eq. (27), both of them are subject to correlative analysis with an identical analyzing sequence $y_m(i)$ and the outputs may be used to establish a system of linear equations. The partial circuit of a receiver of the second embodiment-example using this correlation analysis method is shown in FIG. 9. This partial circuit corresponds to the rear part in FIG. 4. In FIG. (a), output $r^*_{pm}$ of fabricated frame generator FFG is the fabricated pilot-frame in Eq. (27). Consider a case where a data analyzing sequence $y_m(i)$ is generated such that the conditions given to the cyclic cross-correlation-function represented by the following equation may be satisfied in the process of y-AYZ in the figure $$R_{my}(\tau) = \frac{1}{L}\sum_{i=0}^{L-1} \{r^*_{pm}(i)\}\overline{y_m(i-\tau)} \quad (0 \leq \tau < L) \atop = 1 \qquad \tau = 0 \atop = 0 \qquad \tau \neq 0. \qquad (44)$$

Namely, $y_m(i)$ is a sequence orthogonal to fabricated pilot-frame $r^*_{pm}(i)$, except the 0-shift value.

Then, fabricated pilot-frame $r^*_{pm}(i)$ and data analyzing sequence $y_n(i)(n=0,1,2, \ldots M-1)$ with subscript changed from m to n are applied to a pilot-response generator PGN in the figure, to obtain the 0-shift-correlation value (correlation coefficient) between both of them $$p_{nm} = \frac{1}{L}\sum_{i=0}^{L-1} r^*_{pm}(i)\overline{y_n(i)} \qquad (45)$$

[where $r^*_{pm}(i)$ contains AWGN, so that $p_{nm}$ in the above equation contains the deviation due to noise. Here, the deviation is assumed to be 0]. When assuming $p_{nm}$ is an entry on the n-th column and m-th row, the pilot-response (Decorrelation) matrix P with size M×M is generated. P is parameters defining mutual relation between M kinds of data-frames that may possibly be received from $u_0$ and analyzing sequences $y_n(i)$. This is also an isolated pilot-response which is not affected by disturbance due to the pilot- and data-frames received from the other stations and modulated by different carrier-waves.

On the other hand, synchronously received data-frame $r_D^{0*}(i)$ which are outputs of the data demodulating circuit $D^{D0}$ in FIG. 9(b), and data analyzing sequences $y_n(i)$, are both applied to correlators $C_{or}(y_n)$, generating the 0-shift correlation values $\Phi_n$ between both of them. If $x_D(i)=x_p(i)=0$ is assumed in Eq. (24) and (27), the data decorrelating matrix $\Phi$, which is a set of $\Phi_n$, can be expressed as follows $$\Phi = \sum_{n=0}^{M-1} \Phi_n \delta(i-n) = (\Phi_0, \Phi_1, \ldots \Phi_n, \ldots \Phi_{M-1})$$

$$\Phi_n = \frac{1}{L}\sum_{i=0}^{L-1} r_D^*(i)\overline{y_n(i)}.$$

(46)

From Eq. (28), (45), and (46), $\Phi_n$ is expressed as follows $$\Phi_n = \sum_{n=0}^{M-1} \beta_n p_{nm}$$

(47)

With Eq. (47), a following system of linear equations with M unknowns is obtained $$[P][\beta]=[\Phi]$$

(48)

Taking the deviation due to AWGN contained in $r^*_p(i)$ and $r^*_D(i)$ into account as in the case of Eq. (30), and representing the value containing such deviation by the following equation is obtained $$[P'][\beta'] = [\Phi']$$

(49)

$$\begin{pmatrix} \rho'_{00} & \rho'_{01} & \cdots & \rho'_{0m} & \cdots & \rho'_{0,M-1} \\ \rho'_{10} & \rho'_{11} & \cdots & \rho'_{1m} & \cdots & \rho'_{1,M-1} \\ \vdots & \vdots & & \vdots & & \vdots \\ \rho'_{n0} & \rho'_{n1} & \cdots & \rho'_{nm} & \cdots & \rho'_{n,M-1} \\ \vdots & \vdots & & \vdots & & \vdots \\ \rho'_{M-1,0} & \rho'_{M-1,1} & \cdots & \rho'_{M-1,m} & \cdots & \rho'_{M-1,M-1} \end{pmatrix}$$

$$\left\{ \begin{pmatrix} \beta'_0 \\ \beta'_1 \\ \vdots \\ \beta'_n \\ \vdots \\ \beta'_{M-1} \end{pmatrix} \begin{pmatrix} \Phi'_0 \\ \Phi'_1 \\ \vdots \\ \Phi'_n \\ \vdots \\ \Phi'_{M-1} \end{pmatrix} \right\}$$

$$\begin{aligned} p'_{nm} &= p_{nm} + \Delta p_{nm} \\ \beta'_n &= \beta_n + \Delta\beta_n \\ \Phi'_n &= \Phi_n + \Delta\Phi_n \end{aligned}$$

(50)

where P', β' and Φ' (are respectively a pilot-response-matrix with size (M×M) consisting of $\rho'_{nm}$ as the entry, an unknown matrix consisting of $\beta'_n$ as the entry, and a data response matrix consisting of $\Phi'_n$ as the element. In β-AYZ in FIG. 9(b), by solving the above equations, the unknown variable (the estimated value of the transmitted information) $\beta'_n$ including an error $\Delta\beta_n$ can be obtained. (Hereinafter, the ordinal number in β is changed from n to m.) Considering the assumption of $\beta_m=0,\pm1$, $\beta_m=0$ is viewed as an ineffective output, let us divide M components of outputs {β'} in Eq. (49) into negative and positive groups after making them on the hard decision, and denoting the respective values by $\beta'_{m+}$ and $\beta'_{m-}$. Using these values, let us obtain the following absolute difference values for the threshold $\pm 1$, $\Delta_{m+}$ and $\Delta_{m-}$.

$$\begin{aligned} \Delta_{m+} &= |\beta'_{m+} - 1| \\ \Delta_{m-} &= |\beta'_{m-} + 1|. \end{aligned}$$

(51)

Align $\Delta_{m+}$ and $\Delta_{m-}$ in the order from small to large and provide a new superscript A and an ordinal number n with each value, so as to be $\Delta_0^A < \Delta_1^A \ldots < \Delta_{\gamma-1}^A$. Select γ components from the forehead and make the hard decision whether the corresponding estimated value {β'} takes negative or positive. Then, the detected values of the transmitted information, $\{\hat{\beta}^s\}=(\hat{\beta}_0^s, \hat{\beta}_1^s, \ldots \hat{\beta}_{\gamma-1}^s)$ can be determined as outputs of β-AYZ. Thus, the detected values of the transmitted information-set, $\{\hat{b}\}/u_0$ can be determined based on $\{\hat{\beta}^s\}$. When the rank of matrix P' reduces in solving Eq. (49), any one of said solving methods (a) to (c) can be applied.

According to the above method when a transmit-data-frame consisting of γ components, that is a modulated sequence-set, selected from M kinds of frames is received via multi-transmission-paths, γ binary information $\{\beta^s\}$ carried by the respective sequences can be detected, by demodulating the received signal to a baseband signal and analyzing it, for example, by obtaining $\beta_0^s g_0^s(i)$ without being disturbed by other multiple sequences $\beta_m^s g_m^s(i)(m\ne 0)$ transmitted simultaneously, and by identifying the above set consisting of γ modulated sequences. In this case, if deviations $\Delta\rho_m$, $\Delta d_m$, $\Delta p_{nm}$, and $\Delta\Phi_n$ contained in Eq.(30) and (50) are large, this processing may be affected by disturbance of other sequences transmitted simultaneously. But such disturbance can be sufficiently alleviated by selecting a set of M kinds of sequences with small cyclic cross-correction-values.

Note that, when determining the transmitted information estimate value $\beta'_0$, for example in Eqs. (29) and (49), the energy of the principal wave and all the delayed waves contained in the received flock-frame carrying this information value are used in the form of a row vector, such as $(\rho_{00}, \rho_{10}, \rho_{20}, \ldots \rho_{M-1,0})$ or $(p_{00}, p_{10}, p_{20}, \ldots p_{M-1,0})$. On the other hand, since a Rake reception method, which has been described as Method (C), uses a received pilot-response containing interference-wave components, it is difficult to use all the energies of delayed waves. However, the method of the present invention uses the isolated pilot-response according to the principle described above, therefore an ideal Rake reception characteristic may be achieved.

In the above description, z(i) and $y_m(i)$ were used as pilot and data analyzing sequences. Any other optional sequences may be used instead of them. For example, the use of $g_m(i)$ instead of $y_m(i)$ produces the same result if there is no noise.

Since the analyzing method using $y_m(i)$ has such a characteristic as to provide high sensitivity in detecting $r^*_{pm}(i)$ component contained in $r_D^{0*}(i)$, it results in enhancing the regularity of the pilot-response-matrix P and making solution β' less sensitive to noise $\Delta P_{nm}$ and $\Delta\Phi_n$.

The method described above uses a set of M kinds of different sequences. By extending this method so that the respective $\tau(=0,1,2 \ldots L-1)$ shift sequences may be added to M' kinds of basic sequence $g_m(i)$, the number of sequences increases to LM'. According to this idea, consider a cyclically shifted multiple sequence method, with which γ sequences of LM' kinds of sequences are selected for transmission. When applying the above method to the direct analysis method using FIG. 2, the system is equivalent to that defined by elements composing the transmit-sequences in the previous description. By setting as $$M = M'L, \tag{52}$$

the solution can be obtained using Eq. (29).

On the other hand, when applying this sequence set to the correlation analysis method, it is required to use matched filters $MF[y_n(i)](n=0,1,2, \ldots M'-1)$ as the correlators in FIG. 9(b). The total number of these outputs is $M=M'L$. Therefore, this can be applied to the system of linear equations in Eq. (49). Namely, the synchronously received data-frame $r_D^{0*}(i)$ is applied to M matched filters. The n-th matched filter $MF[y_n(i)]$ generates the n-th correlation output $\Phi_{n\tau}$ shown in the following equation with shift values $\tau(=0,1,2, \ldots L-1)$.

$$\Phi_{n\tau} = \frac{1}{L}\sum_{i=0}^{L-1} r_D^{0*}(i)\overline{y_n(i-\tau)} \tag{53}$$

On the other hand, the fabricated pilot-frames of this method is given by $r^*_{pm}(i-\tau)$ which are the cyclically shifted sequences of $r^*_{pm}(i)$. The $\tau$ shift correlation with analyzing sequence $y_n(i)$ is given by the following equation $$p_{m\tau n\tau'} = \frac{1}{L}\sum_{i=0}^{L-1} r^*_{pm}(i-\tau) \cdot \overline{y_n(i-\tau')} \quad (m, n = 0, 1, 2, \ldots M'-1) \tag{54}$$

$$(\tau, \tau' = 0, 1, 2, \ldots L-1)$$

Using $P_{m\tau n\tau'}$ and $\Phi_{n\tau}$, a system of linear equations with size M×M may be obtained as, similarly to the case in Eq. (49)

$$[P'][\beta']=[\Phi']. \tag{55}$$

Solving the above equation to obtain $\gamma$ components of $\{\hat{\beta}^s\}$, a transmitted information-set $\{\hat{b}\}/u_0$ is detected.

Therefore, this method achieves large-capacity transmission using the minimum number M' of the basic spreading sequences. When using self-orthogonal sequences (such that the auto-correlation takes 0 at the shift positions except 0-shift. Two-phase sequences with length L=4, four-phase sequences with length L=16, etc are well known) as $g_m(i)$, it is easy to solve the system of linear equations in Eq. (55).

With M'=1 is assumed for the above sequence population, the M kinds of spreading sequences can be made, for example, with only cyclically shifted sequences of $g_0(i)$. This is a cyclically shifted single sequence method, and if auto-orthogonal sequences is to be used as $g_0(i)$, an excellent error rate characteristic may be obtained.

Now, consider another example of using M kinds of spreading sequences. Let us produce a product of each column (Walsh function) of Hadamarl matrix with size N×N and a partial sequence $M_s(s=0,1,2, \ldots S-1)$ with sequence length L, for example, which has been extracted from a long M-sequence. Assuming the product to be a spreading sequence $g_{ns}(i)$, a set of NS spreading sequences $\{g_{ns}(i)\}$ can be obtained. As sequences $g_{n's}(i)$ and $g_{ns}(i)(n' \neq n)$ are orthogonal each other, this method can generate a sequence set characterized by a large population, small cross correlation, and short sequence length. The present invention can use such sets as stated above.

[Data Channel Sharing Method]

As the third embodiment-example, let us explain a data-channel sharing method, in which data-frames of all users are transmitted using a common carrier-wave $f_D$. The transmitter and receiver can be expressed by using the block diagram in FIGS. 2 and 4 whose symbols are to be changed. This example is characterized in that the baseband-transmission-data-frames of all the users, $e_D(i)/u_k$, (k=0,1,2, ... K−1) can be transmitted with a common data carrier-wave $f_D$. [In the first and second embodiment-examples, mutually different data-carrier-waves $(f_k)$ for respective users are used.] Assume here that the transmitter of the k-th user $u_k$ uses M' kinds of spreading sequences $g_m^k(i)$(k=0,1,2, ... M'−1). In this case, the system requires $$M = KM' \tag{56}$$

kinds of sequences.

The transmitter according to the present invention is designed by replacing the k-th data carrier-waves $f_k$ in FIG. 2 with the common carrier-wave $f_D$, while keeping the pilot carrier-wave $f_k'$ as it is.

Figure 10:
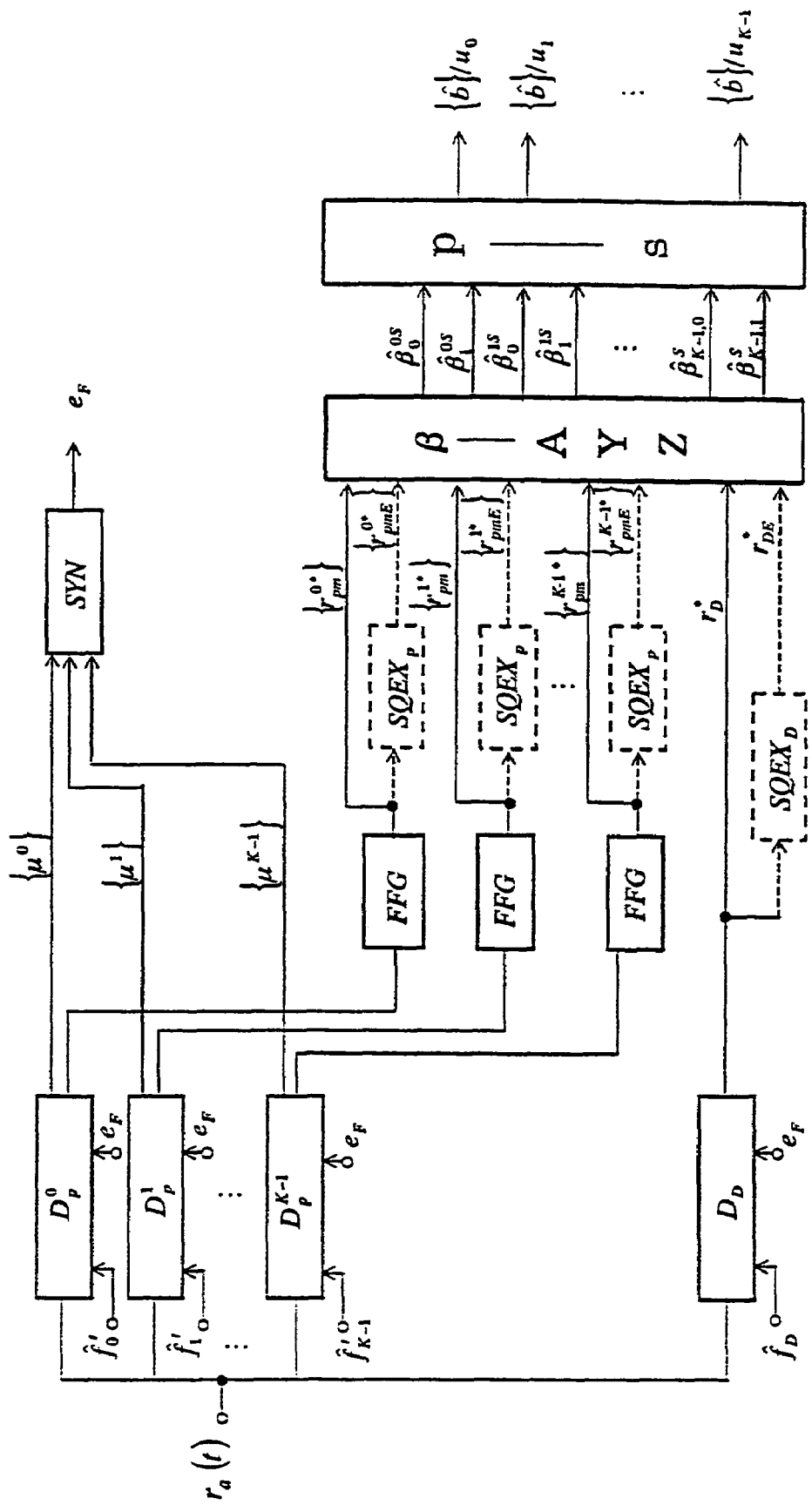
FIG. 10 shows an explanatory drawing of the third embodiment-example of the invention, indicating the circuit composition of a receiver using a data-channel-sharing-method.

FIG. 10 shows a block diagram of a multi-user-receiver RX in which the direct analysis method is applied to this embodiment-example. Among the functions in this system in FIG. 4, the pilot demodulating circuit $D_p^0$ for $u_0$ is expanded to pilot demodulating circuits for all the users, $D_p^0, D_p^1 \ldots D_p^{K-1}$. Based on the channel response of the k-th user, $\{\mu^k\}$, a set of M' kinds of fabricated pilot-frames $\{r_{pm}^{k*}\}$ to be used by the k-th user, is generated. Similarly to the case in Eq. (27), $r_{pm}^{k*}(i)$ is given by $$r_{pm}^{k*}(i) = \sum_{j=0}^{J-1} \mu_j g_m^k(i-j) + x(i) \tag{57}$$
$$= (\rho_{m0}^{k'}, \rho_{m1}^{k'}, \ldots \rho_{m,L-1}^{k'}),$$

thus producing M' frames in total.

The above channel response $\{u^k\}$ is applied to synchronous circuit SYN in which the frame pulse $e_F$ to designate the synchronously received frame-period is produced. $e_F$ is set so that the boundary of enveloped frames incoming from all the users may not be included in this period. Similarly to the case in FIG. 4, the illustrated data-signal demodulating circuit $D_D$ produces the following synchronously received data-frame with frame pulse $e_F$ $$r_D^*(i) = \sum_{k=o}^{K-1}\sum_{m=0}^{M-1}\sum_{j=0}^{J} \hat{\mu}_j^k \beta_m^k g_m^k(i-j) + x_D(i) = (d_0', d_1', \ldots d_{L-1}'). \tag{58}$$

$r^*_D(i)$ is applied, together with M=KM' fabricated pilot-frames, to the analyzing circuit β-AYZ. Generating a pilot-matrix ρ' using the fabricated pilot-frames, each is made by transposing the user related components (attached by superscript k) of $\{\rho'_{mi}\}$ in Eq. (27), the following equation is obtained. The analysis is performed by solving the equation.

$$[\rho'][\beta^{k'}] = [d']$$

$$\begin{pmatrix} \rho_{00}^{0'} & \rho_{01}^{0'} & \cdots & \rho_{0,M'-1}^{0'} & \rho_{00}^{1'} & \rho_{01}^{1'} & \cdots & \rho_{0,M'-1}^{1'} & \cdots & \rho_{00}^{K-1'} & \rho_{01}^{K-1'} & \cdots & \rho_{0,M'-1}^{K-1'} \\ \rho_{10}^{0'} & \rho_{11}^{0'} & \cdots & \rho_{1,M'-1}^{0'} & \rho_{10}^{1'} & \rho_{11}^{1'} & \cdots & \rho_{1,M'-1}^{1'} & \cdots & \rho_{10}^{K-1'} & \rho_{11}^{K-1'} & \cdots & \rho_{1,M'-1}^{K-1'} \\ \vdots & \vdots & \vdots & \vdots & \vdots & \vdots & & \vdots & & \vdots & \vdots & & \vdots \\ \rho_{L-1,0}^{0'} & \rho_{L-1,1}^{0'} & \cdots & \rho_{L-1,M'-1}^{0'} & \rho_{L-1,0}^{1'} & \rho_{L-1,1}^{1'} & \cdots & \rho_{L-1,M'-1}^{1'} & \cdots & \rho_{L-1,M'-1}^{K-1'} & \rho_{L-1,1}^{K-1'} & \cdots & \rho_{L-1,M'-1}^{K-1'} \end{pmatrix} \times \begin{pmatrix} \beta_0^{0'} \\ \beta_1^{0'} \\ \vdots \\ \beta_{M'-1}^{0'} \\ \beta_0^{1'} \\ \beta_1^{1'} \\ \vdots \\ \beta_{M'-1}^{1'} \\ \vdots \\ \beta_{M'-1}^{K-1'} \end{pmatrix} = \begin{pmatrix} d_0' \\ d_1' \\ \vdots \\ \vdots \\ \vdots \\ \vdots \\ \vdots \\ d_{L-1}' \end{pmatrix} \quad (59)$$

The size of matrix ρ' in the above Eq. is (L×M). When M=KM'=L, the solution is normally obtained. For M<L, the previously stated method to obtain the maximum likelihood solution, (a), (b), and (c), can be applied. In this case, the parameters used in the previous method are to be converted so as to be (M→KM', γ→Kγ).

Thus, in the unknown set {$\beta^{k'}$}, γ (γ=2 in the figure) information-components each user transmitted are contained. By solving the above Eq., Kγ information-components in total can be obtained. Namely, the embodiment in FIG. 10 has a multi-user-receiver function. Since it is required for this method to establish mutually orthogonal relationship among K pilot carrier-waves $f_k$ and data common carrier-wave $f_D$. As a consequence, for example, it is necessary to give the following relation by referring to Eq.(18)

$$f_D = f_{00} \quad (60)$$
$$f_k' = f_{00} + (k+1)f_G$$

Based on Kγ transmitted information thus obtained, the transmitted information-set {$\tilde{b}$}/$u_k$ of the user $u_k$ with circuit p-s shown in the figure can be obtained.

Note that the correlation analysis method may also be applied to the third embodiment-example. In this case, the correlation-outputs p*$_{nm}$ and Φ*$_n$ between each of $r_{pm}^{k*}$(i) and $r_D^{k*}$(i), and data analyzing sequence $y_n^{k}$(i) are obtained, respectively, and a system of linear Equations similar to Eq.(49) is solved, to determine unknown set {$\beta^{k'}$}.

In this embodiment-example, if setting M'=1, a single-ary system is realized, in which each user uses a single spreading sequence $g_k$(i) and is supported by the isolated pilot. The above methods can be also applied to the receive-demodulation of this system.

[Complex Number Developed Sequence Extending Method]

As the channel-response {$u^k$} generally takes complex numbers in the above-described system, fabricated pilot-frame r*$_{pm}$(i) takes complex numbers even when transmit basic sequence $g_m$(i) is a binary phase or real-number sequence. As a result, it has been described that all of data-frames r*$_D$(i), pilot-response p'$_{nm}$, and data-response Φ' take complex numbers. In solving Eq. (29), a condition $M''L$ is required mathematically, regardless of whether the constituent elements of the equation are real numbers or complex numbers. By noticing here that M is restricted by the length L of basic spreading sequences, the fourth embodiment-example method in which this sequence length L is artificially increased at a receiver is described.

This method is to develop a synchronously received frame with L chips taking complex numbers, and convert it into a frame with 2L chips taking real numbers. Each chip amplitude of fabricated pilot-frame r*$_{pm}$ and received data-frame r*$_D$(i) in Eq. (27) and (24), respectively, is represented by complex numbers in the following equation $$r_{pm}^*(i) = (\rho_{m0R}' + j\rho_{m0J}', \rho_{m1R}' + j\rho_{m1J}', \cdots \rho_{m,L-1,R}' + j\rho_{m,L-1,J}') \quad (61)$$
$$(M = 0, 1, 2, \ldots M-1)$$
$$r_D^*(i) = (d_{0R}' + jd_{0J}', d_{1R}' + jd_{1J}', \cdots d_{L-1,R}' + jd_{L-1,J}')$$

where j=$\sqrt{-1}$, and the chip amplitude in Eq. (25) is represented with the real part having subscript R and the imaginary part having the subscript J, such as $\rho'_{m0} = \rho'_{m0R} + j\rho'_{m0J}$. By regarding the imaginary part of the above Eq. as another real part, a frame excluding the sum symbol + and imaginary symbol j is made as follows $$r_{pmE}^*(i) = (\rho_{m0R}', \rho_{m1R}', \cdots \rho_{m,L-1,R}', \rho_{m0J}', \rho_{m1J}' \cdots \rho_{m,L-1,J}') \quad (62)$$
$$(m = 0, 1, 2, \ldots M-1)$$
$$r_{DE}^*(i) = (d_{0R}', d_{1R}', \cdots d_{L-1,R}', d_{0J}', d_{1J}', \cdots d_{L-1,J}')$$

where the element alignment order can be arbitrary selected. (However, the same alignment order must be used for pilot and data-frames.) Thus, the double length frame consisting of 2L chips can be produced. The important matter is that all of the above double length frames can be regarded to be of made from random sequences because the real part and the imaginary part of channel-response {$u^k$} are mutually independent random variables. [For a transmission-path without multi-path, independence of the above real and imaginary parts is lost. To cope with such situation, it is enough to use a four-phase sequence consisting of random sequences with real and imaginary parts being mutually independent, as the transmission basic sequence $g_m$(i).]

In applying the principle of this sequence extending method to the first embodiment-example, the parameter changes L→2L in Eq. (29). In consequence, when Eq. (29) is to be solved according to a general solution method, a condition M≦L is required in the above description. However, this restriction may be alleviated as follows by using the above double length frame $$M \leq 2L. \tag{63}$$

If the previous solutions (a), (b), and (c) are to be applied to a case of M>2L, the use of double length frame can improve considerably the error rate characteristics caused by noise. For cases where this principle is applied to the second and fourth embodiment-examples, respectively, it becomes easy to increase M and KM' as the analyzing dimension increases.

When this is applied to the first embodiment-example, a conversion from $r^*_D(i)$ in Eq. (61) to $r^*_{DE}(i)$ in Eq. (62) is performed at sequence extender $SQEX_D$ shown in the dotted line frame in FIG. 4. The similar function for fabricated pilot-frames is performed with sequence extender $SQEX_p$ prepared in FFG, resultantly $r^*_{pmE}(i)$ shown in the figure is outputted. In this case, $r^*_{DE}$ and $\{r^*_{pmE}\}$ are used instead of $r^*_D$ and $\{r^*_{pm}\}$ shown in the figure, as the inputs to analyzer β-AYZ. In cases where applied to the second and third embodiment-examples, outputs $r^*_{pmE}$, $r^*_{DE}$; $r^{k*}_{pmE}$, $r^*_{DE}$ of sequence extenders $SQEX_p$ and $SQEX_D$ shown by the dotted line frames in FIGS. 9 and 10 may be used for previously described analysis.

[Diversity Received Type Sequence Extending Method]

Figure 11:
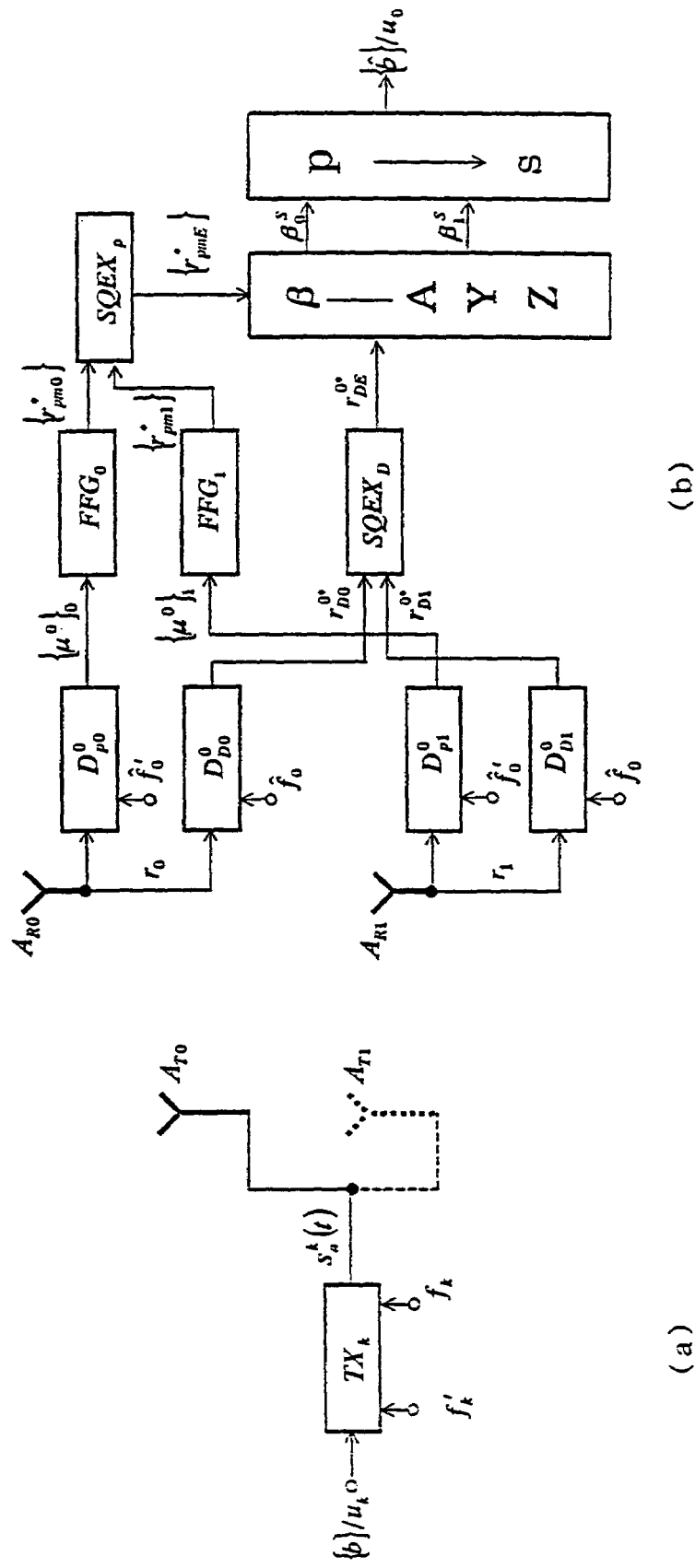
FIG. 11 shows explanatory drawings of the fourth embodiment-example of the invention, in which (a) shows the circuit composition diagram of a transmitter TX ($u_k$) using diversity-antennae, while (b) shows the circuit composition diagram of a receiver RX ($u_0$).

FIG. 11 shows the fourth embodiment-example which is a circuit composition of a transceiver in which a sequence extending method using diversity-antennae is applied to the first embodiment-example. FIG. (a) shows a circuit composition of a transmitter of the k-th user $u_k$. The output of the transmitter circuit $TX_k$ in FIG. 2 is transmitted to two (generally, one or plural pieces) diversity-antennas $A_{T0}$ and $A_{T1}$.

FIG. (b) shows a receiver to detect the signal of the 0-th user $u_0$, as a desired station. The receiver is provided with $N_d(\geq 2)$ pieces of receive-diversity-antennae $A_{Rd}$(d=0,1, . . . Nd−1). $D_{pd}^0$, $D_{Dd}^0$ and $FFG_d$(d=001) in the figure are respectively the pilot demodulating circuit $D_p^0$, data demodulating circuit $D_D^0$, and fabricated frame generator FFG which were used as the circuits of receiver in FIG. 4, and two systems of the circuits are prepared in correspondence to $N_d$=2. $A_{R0}$ and $A_{R1}$ are installed generally apart by half a wavelength of the carrier-wave, based on the space diversity reception principle. If a polarization diversity is to be used (or the polarization diversity is to be used in parallel), it is physically possible to obtain two outputs with one antenna. (In this case, it is necessary to use transmit-polarization-diversity-antennae, or to use transmit-polarization-diversity-antennae in parallel.)

Pilot demodulating circuit $D_{pd}^0$ outputs channel-response $\{\mu^0\}_d$, and fabricated frame generator $FFG_d$ produces a set of fabricated (synchronously-received) pilot-frames $\{r^*_{pm}\}_d$ using both the outputs and basic spreading sequence set $\{g_m\}$ not illustrated. These outputs are applied to the sequence extender $SQEX_p$. When m is assumed to be fixed, $N_dL$ chip elements are applied to $SQEX_p$, because each frame of $\{r^*_{pm}\}_d$ consists of L chip elements. These elements are arranged in a predetermined order on the time axis. An extended fabricated pilot $r^*_{pmE}$ consisting of $N_dL$ chip elements, arranged as described above is produced. Since there are M kinds of extended fabricated pilots, M sets $\{r^*_{pmE}\}$ are fabricated.

On the other hand, a synchronously received data-frame $r_{pd}^{0*}$, which is a baseband output of data demodulating circuit $D_{pd}^o$, is applied to sequence extender $SQEX_D$. Here, similarly to the case previously described, all the elements ($N_dL$ chips) of the respective frames, each of which consists of L chip elements, are arranged on the time axis, generating an extended synchronously received data-frame $r_{DE}^{0*}$ consisting of $N_dL$ chips is produced.

Similarly to Eq. (61), the inputs to sequence extenders $SQEX_p$ and $SQEX_D$ may be expressed as follows $$r^*_{pm}(i)_d = (\rho'_{m0-d}, \rho'_{m1-d}, \ldots \rho'_{m,L-1,-d}) \tag{64}$$
$$r^{0*}_D(i)_d = (d'_{0-d}, d'_{1-d}, \ldots \rho'_{L-1,-d})$$

where $\rho'_{mi-d}$ and $d'_{i-d}$ are the i-th complex chip amplitudes including AWGN. For example, taking a method in which the inputs in Eq. (64) are sequentially aligned with regard to d in cascade, the outputs of $SQEX_p$ and $SQEX_D$ are given by the following Eq. for a fixed value m.

$$r^*_{pmE}(i) = \lfloor r^*_{pm}(i)_0, r^*_{pm}(i)_1, \ldots r^*_{pm}(i)_{Nd-1} \rfloor \tag{65}$$
$$r^{0*}_{DE}(i) = [r^*_D(i)_0, r^*_D(i)_1, \ldots r^*_D(i)_{Nd-1}]$$

For simplicity, using Eq. (64), the constituent elements of the above Eq. may be expressed as follows, for $N_d$=2

$$r^*_{pmE}(i) = (\rho'_{m0E}, \rho'_{m1E}, \ldots \rho'_{m,2L-1,E}) \tag{66}$$
$$\rho'_{miE} = \rho'_{mi-0} \quad (0 \leq i \leq L-1)$$
$$= \rho_{m,(i-L),-1} \quad (L \leq i \leq 2L-1)$$

$$r^{0*}_{DE}(i) = (d'_{0E}, d'_{1E}, \ldots d'_{2L-1,E}) \tag{67}$$
$$d'_{iE} = d'_{i-0} \quad (0 \leq i \leq L-1)$$
$$= d'_{(i-L),-1} \quad (L \leq i \leq 2L-1).$$

From a set $\{r^*_{pmE}\}$ of the above extended fabricated pilots, pilot matrix ρ' with size $N_dL \times M$ is produced. On the other hand, unknown matrix β' and the extended synchronously received data-matrix d', consisting of M and $N_dL$ elements, respectively, are produced. Using these matrices, a system of linear equations similar to Eq. (29) is produced. Therefore, the number of dimensions available to obtain the solution with a general method increases to $M \leq N_dL$.

In the previous description using the circuit composition in FIG. 11, the m-th basic spreading sequence $g_m(i)$ used by transmitter TX to transmit the m-th transmit information $\beta_m$ was assumed to be one kind. Now, assume that $N_v$ kinds of sequences are prepared in correspondence to $N_v$ transmit antennas. Namely, a sequence set $\{g_m\}=(g_{m0}, g_{m1}, \ldots g_{mv}, \ldots g_{m,Nv-1})$ is prepared. For simplicity, γ=1 is assumed here. Since $\beta_m g_{mv}$ becomes the basic data-frame $s_{Dv}(i)$ in FIG. 5, $N_v$ frames are similarly produced.

On the other hand, preparing a sequence set $\{g_p\}=(g_{p0}, g_{p1}, \ldots g_{p,Nv-1})$ for pilots, $N_v$ basic pilot-frames $pg_{pv}$ similarly to the description stated above are produced. Sequences made by synthesizing the above data-frames and pilot-frames, respectively, are denoted by $s_{Dv}(i)$ and $s_{pv}(i)$ in FIG. 5. By repeating each of them N times, the respective core-sequences are produced, to which the guard sequences are added to produce the baseband enveloped transmit-frames $e_{Dv(i)[=eDmv}(i)]$ and $e_{pv}(i)$. Convolutionally modulating the chip-waveform and then modulating the orthogonal carrier-wave with these frames produce the v-th transmit-frame $s_{\alpha v}(t)$. This is transmitted via the v-th transmitting diversity-antenna $A_{Tv}$.

At the receiver, pilot demodulating circuit $D_{pd}^{\ 0}$ is replaced with $D_{pvd}^{\ 0}$, while data demodulating circuit $D_{Dd}^{\ 0}$ is replaced with $D_{Dvd}^{\ 0}$ in FIG. 11(b), because the number of inverse spreading sequences increases from one to $N_v$, so that $N_v$-fold of both the demodulating circuits are required. As the outputs of the pilot demodulating circuits, $N_v N_d$ channel-responses $\{\mu^0\}_{vd}$(v=0,1, ... $N_v$-1, d=0,1, ... $N_d$-1) are produced. Similarly, $N_v N_d$ synchronously received data-frames $r^*_{Dvd}$ are also produced. Based on the above pilot-response and basic spreading sequences, the fabricated pilot-frame $r^*_{pmvd}$ with sequence length L is fabricated. Sequence extender $SQEX_p$ aligns these frames, generating a set of extended fabricated pilot-frames $\{r^*_{pmE}\}$ with sequence length $N_v N_d L$. (This sequence length may reduce less than $N_v N_d L$ by eliminating a part of small-power frames or through addition on the time axis.) Similarly, based on synchronously received data-frame $r^*_{Dvd}$, and using the same alignment method, extended synchronously received data-frame $r^*_{DE}$ with the same sequence length may be produced. Thus, the number of dimensions of a system of linear Eq.s can be increased to $N_v N_d L$.

Note that the complex number developed sequence extending functions described with Eq. (62) may be included in the functions of sequence extenders $SQEX_p$ and $SQEX_D$ described above. Since the number of dimensions of the above matrices increases to $2N_v N_d L$, a condition such as to solve the equations easily can be alleviated as follows $$M \leq 2N_v N_d L \quad (68)$$

Note also that the principle of the diversity reception method described with FIG. 11 can be applied to the second and third embodiment-examples. Namely, in FIG. 10, $N_d$ receive antennas are provided. The output from one antenna is applied to a receiving block consisting of K pilot blocks $D_p^k$-FFG and one data demodulating circuit $D_D$. The outputs from all the antennas are applied to similar $N_d$ receiving blocks whose outputs are applied to $SQEX_p$ and $SQEX_D$, respectively, similar to sequence extenders $SQEX_p$ and $SQEX_D$, in FIG. 11, to produce M extended fabricated pilot-frames and one extended synchronously received data-frame. With this method, a multi-user receiver having dimensions increased with aid of the extended sequences can be realized. On the other hand, if $N_d$ receiving blocks each consisting of $D_p^{\ 0}$ and $D_D^{\ 0}$ similarly are provided in FIG. 9, a receiver such as to use the extended sequences and the correlation analysis method can be realized.

The transmit-diversity-principle may be applied to the above cases. Namely, by increasing the number of transmit-antennas and extended sequences by $N_v$ fold, the number of dimensions of the equations can be further increased.

[Analyzing Matrix Regularization Method]

Regularity of pilot-response-matrix P' in Eq.(49) degrades generally when kind M of the basic spreading sequences are excessively large and a condition of $M \geq L$ for the sequence length L exists. To avoid this problem, known matrix regularization technology using dummy pilot-response [M. Tomita, et al, "An interference analyzing system for CDMA signals utilizing lone pilot-responses and an additional dummy pilot-response", Technical resport of the Institute of Electronics, Information and Communication Engineers, SST2000-43] may be employed. This known method is technology in which the kinds of symbol frames (number of information) that can be transmitted on an identical symbol-frame-time-width $T_E$ is reduced to (L−1) for the spreading sequence length L. In this case, the remaining one is used to send dummy-information which is not actual transmit-information. Namely, there exists a problem that, despite it has a capability of transmitting L pieces of information, only (L−1) pieces of information can be transmitted to enhance the regularity.

In this invention, the above technology is developed further where a method of using additional vectors along with the Dummy-information and the Dummy Spreading Sequence is explained. Namely, h (generally $h \geq 1$) fabricated synchronously received frames which are not actually transmitted, are added for the analysis in a receiver. For this purpose, the receiver increases the size of the sequence population, for example, by adding h dummy spreading sequences, to (M+h), where actually M kinds of sequences are used. In other words, pilot-response-matrix P' in Eq.(49) is modified to expanded matrix $P'_+$ with size (M+h)×(M+h). Assume here that h=1 and the dummy spreading sequence is $g_M(i)$. A case in which let the right-most pilot-response corresponding to a fabricated pilot-frame $r^*_{pM}(i)$, not contained in the actual synchronously received frame $r^*_D(i)$, be an additional column vector $(P_{01}, P_{1M}, \ldots P_{nM}, \ldots P_{M,M})^T = (\alpha_0, \alpha_1, \ldots \alpha_n \ldots \alpha_M)^T$ is described.

The receiver produces fabricated pilot-frame $r^*_{pm}(i)$ from both dummy spreading sequence $g_M$ and channel-response $\{\mu^0\}$ between desired station $u_0$ and base station BS, using Eq. (27). Based on this frame, an additional row vector $P'_M = (P'_{M0}, P'_{M1}, \ldots P'_{Mn} \ldots P'_{M,M-1})$ using Eq.(45) is produced. Column vector A does not contain a noise component while row vector $P'_M$ contains a noise component because it is affected by the noise of $\{\mu^0\}$. Column vector A is selected by the receiver so that the regularity of the extended pilot-response-matrix $P'_+$ may be enhanced. In addition, the M-th information is set to be a dummy-information $\beta_M^D = (\beta_\gamma^S) = 1$ and, the n-th correcting term $\alpha_n$ corresponding to vector A are added to the n-th element $\Phi'_n$, of the data response matrix on the right side of Eq. (49).

Assuming that the corrected value is $\Phi''_n$ $$\Phi\Delta_n = \Phi'_n + \alpha_n (n=0,1,2, \ldots M) \quad (69)$$

where $\Phi'_M$ is given by Eq. (46) and $\gamma_M(i)$ obtained from Eq. (44). ($a_n=0$ may be set in the above equation, with $\beta_M^D = 0$.)

From these equations, the following equation in which the size of Eq. (49) is enlarged is obtained.

$$[P'_+][\beta'_+] = [\Phi''_+] \quad (70)$$

$$\begin{pmatrix} & & & a_0 \\ & (P') & & a_1 \\ & & & \vdots \\ & & & a_{M-1} \\ P'_{M,0} & P'_{M1} & \cdots & P'_{M,M-1} & a_M \end{pmatrix} \begin{pmatrix} \beta'_0 \\ \beta'_1 \\ \vdots \\ \beta'_{M-1} \\ \beta_M^D \end{pmatrix} = \begin{pmatrix} \Phi'_0 \\ \Phi'_1 \\ \vdots \\ \Phi'_{M-1} \\ \Phi'_M \end{pmatrix} + \begin{pmatrix} a_0 \\ a_1 \\ \vdots \\ a_{M-1} \\ a_M \end{pmatrix}$$

The above Eq. is a system of linear Eq.s in which the additional column vector A and additional row vector $P'_M$ are added. In this case, $P'_+$, $\beta'_+$ and $\Phi''_+$ are the enlarged pilot-response-matrix, the enlarged unknown matrix, and the corrected data response matrix, respectively, and A is selected by the receiver. Specifically, with $|a_n|=1$, select the polarity (or complex number value) of $\alpha_n$ so that the value (determinant) of matrix $P'_+$ or the singular value may be increased.

For a case where the rank of P' reduces by more than two, the processing may be made by increasing the number of dummy sequences h to more than two. In this way, the best characteristics may be provided to P'$_+$. Consequently, with this method not much affected by the effect of additive white Gaussian noise, highly reliable transmitted information estimate {β'} can be obtained.

Note that Eq. (49) can be solved in most cases under a condition of M≤L. If not, the regularity of these Eq.s can be improved by preparing the means of selecting the above additional column vectors A so that the absolute values of determinants D[P'$_+$] of pilot-response-matrices P' and P'$_+$ [or the normalized singular values (ratios the minimum to the maximum singular values)] may increase.

Eq. (49) can be solved using a known method in which the elements of the equations contained in Eq. (49) are separated into real and imaginary parts to convert them to equations with doubled sized matrix. However, by producing fabricated pilot-frame $r^*_{pm}(i)$, synchronously received data-frame $r^*_D(i)$, and analyzing sequence $y_m(i)$ each of which is a real value frame with double length of 2L chips, and using the previously described complex number developed sequence extending method, Eq. (49) can be solved inmost cases under a condition of M≤2L. If not, the above-described additional column vector A may be added to solved it. Therefore, it is more advantageous to use the additional vector method together with the sequence extending method.

With h>1, the effect of enhancing the regularity of matrix P' increases. This additional vector method can be applied to solve Eq. (55), etc. With the direct analysis method, column vector P'$_M$ in Eq. (70) cannot be obtained. When a system of linear equations with M unknowns is to be solved by setting L=M in Eq. (29), it can be solved by developing further the technology of using the unknown dummy number, the dummy spreading sequence, and the additional row vector stated above, even if the rank of pilot matrix ρ' were to reduce.

By adding an additional column vector A similarly to the case in Eq. (70), and by introducing further an additional row vector C=($c_0, c_1, \ldots c_{M-1}$) and a dummy-information $\beta_M^D$, Eq. (29) is converted to a system of linear equations with (M+1) unknowns as follows $$[\rho'_+][\beta'_+] = [d'_+] \quad (71)$$

$$\begin{pmatrix} & & & a_0 \\ & (\rho') & & a_1 \\ & & & \vdots \\ & & & a_{M-1} \\ c_0 & c_1 & c_2 \cdots c_{M-1} & a_M \end{pmatrix} \begin{pmatrix} \beta'_0 \\ \beta'_1 \\ \vdots \\ \beta'_{M-1} \\ \beta_M^D \end{pmatrix} = \begin{pmatrix} d'_0 \\ d'_1 \\ \vdots \\ d'_{M-1} \\ d_M \end{pmatrix} + \begin{pmatrix} \Delta d_0 \\ \Delta d_1 \\ \vdots \\ \Delta d_{M-1} \\ \Delta d_M \end{pmatrix}$$

where ρ'$_+$, β'$_+$ and d'$_+$ are respectively the enlarged pilot matrix, enlarged unknown matrix, and compensated data-matrix. Note that $d_M$ is an additional constant while $\Delta d_m$ (m=0,1,2, ... M−1) is the compensating term defined by column vector A and $\beta_M^D$ as $(\Delta d_m = \alpha_m \beta_M^D)$.

For simplicity, let us assume $$|\alpha_n| = |c_m| = 1 \quad (n,m=0,1,2,\ldots M-1). \quad (72)$$

Besides, the following relationship is established, because of restriction of transmitted information $$\sum_{m=0}^{M-1} |\beta_m| = \gamma \quad (\beta_m \in \pm 1, 0). \quad (73)$$

Virtual data element $d_M$ is given by the following equation $$d_M = \sum_{m=0}^{M-1} c_m \beta'_m + a_M \beta_m^D. \quad (74)$$

If $\beta_M^D = 0$ is assumed for simplicity, the second term in the above equation and $\Delta d_m$(m=0,1,2, ... M−1) in Eq.(71) take 0. Considering $c_m(\epsilon \pm 1)$ and $\beta_m(\epsilon \pm 1,0)$, there exists a row vector C so that $d_M = 0$ holds good for γ of even number and $d_M = 1$ (or −1) holds good for γ of odd number.

Assume, for example, to set γ=2, $\beta_0 = \beta_1 = 1$ and $c_o = -c_1 = 1$, and to provide an optional values to $c_m$(m≠0,1), then $d_M = 0$ may be obtained. There exists at least one row vector C that gives $d_M = 0$ for each combination of β'$_+$. Therefore, by preparing in advance multiple row vector sets $C_l$(l=0,1,2, ... N'$_c$−1), $d_M = 0$ for respective unknown sets can be found, using one of vectors in sets $C_l$.

In Eq. (73), by assuming γ=2 and setting $d_M = 0$, and every time of providing one of N$_C$' kinds of row vectors $C_l$ sequentially, let us set column vectors $A_l$ for original pilot matrix ρ' and $C_l$ so that the regularity of ρ'$_+$ may be enhanced. Using matrix ρ'$_+$, thus obtained, an unknown estimate-set {β'}$_l$ is obtained. Using a method similar to Eqs. (34) and (35), let us determine the maximum likelihood set among N'$_c$ sets stated above. Making the maximum likelihood unknown set on the hard decision, the transmitted information detected value {$\hat{\beta}^s$} may be obtained.

For received pilot matrix ρ' whose rank reduces by more than two, it can be solved by using additional column vectors $A_0, A_1, \ldots A_{h-1}$, row vectors $C_0, C_1, \ldots C_{h-1}$ with h (≧2), dummy-information-set {$\beta^D$}=($\beta_M^D, \beta_{M+1}^D, \ldots, \beta_{M-h-1}^D$), and virtual data elements {d}=($d_M, d_{M+1}, \ldots d_{M+h-1}$) to convert it to a system of linear Equations with (M+h) unknowns. An effect of regularity improvement will be demonstrated, when the above method is applied to an ordinary system of linear equations.

[Scrambled Sequence Analysis Method]

In CDMA transmission systems, the service area is divided into multiple cells, each of which has a base station, and users within a cell communicate with the base station in the cell. By allocating the same frequency band to respective cells, enhancing the frequency utilization efficiency is attempted. As a result, the communication is affected by interference not only from other users within the cell, but also from users in the neighboring cells. As described above, according to the present invention, the k-th user in each cell occupies the comb-tooth shaped frequency-slots in FIG. 6, based on carrier-wave frequencies $f_k$ and $f_k$ in Eq. (18). Therefore, intercell-interference occurs between the pilot-frames of the k-th users in a cell and the neighboring cells, and similar interference does between the data-frames. [In a sector system in which a cell is divided, for example, into six sectors, to eliminate the intercell-interference due to directional antennae, interference from the neighboring sectors, not neighboring cells should be considered.]

In the previous method in which the k-th user $u_k$ uses data carrier-wave $f_k$, each user can use the same spreading sequence set (M kinds of sequences), even if considering inter-station-interference within a cell. If the same sequence set can be allocated to users in a neighboring cell, the system design becomes more advantageous. As a means to realize such same sequence method, let us allocate a scrambling code $\sigma_c(i)(c=0,1,2,\ldots N_{c-1})$ inherent to each cell. Assume here that the number of cells causing intercell interference is $N_c=(7)$. A user in the c-th cell performs chip base multiplication to both spreading sequences $g_p$ and $g_m$, producing the following scrambled sequence sets, referring to Eq. (9)

$$\left.\begin{array}{l} g_m^c(i) = (g_{m0}\sigma_{C0}, g_{m1}\sigma_{C1}, \ldots g_{mL-1}\sigma_{CL-1},) \ (m = 0, 1, 2, \ldots M-1) \\ \sigma_C(i) = (\sigma_{C0}, \sigma_{C1}, \ldots \sigma_{C,L-1}) \end{array}\right\} \quad (75)$$

$g_p^c(i)$ is also produced in the similar manner.

Conventional CDMA systems often use scrambling system. In this case, the transmitter transmits the above scrambled sequences without converting them to the enveloped frames having the guard sequences previously stated, while the receiver performs descrambling with the scrambling code (used by the transmitter) synchronized to the principal wave of the received signal for the desired user. Such conventional practice resultantly performs asynchronous descrambling to the delayed waves coming from the desired station, and performs correlative demodulation to produce odd-correlation-components, so that it may be difficult to utilize the enough energy of the delayed waves for signal detection process.

According to the present invention, the transmitter produces an enveloped transmit-frame by using the scrambled sequence set as the spreading sequences, while the receiver produces analyzing sequence z(i) in Eq. (25) based on pilot and data scrambled sequence sets $g_p^c(i)$ and $g_m^c(i)$ similar to those used by the transmitter of the desired station. By using this analyzing sequence, channel-response $\{\mu\}$ is produced. Based on this response and sequence $g_m^c(i)$, is produced fabricated pilot-frame $r^*_{pm}(i)$ in Eq. (27), with which the synchronously received data-frame is analyzed. In this way, demodulation detection capable of using all the energy of delayed waves coming from the desired station can be achieved, by eliminating the most of the inter-cell or inter-sector interference. Therefore, the present invention can provide the methods far more advantageous in terms of the receiving error rate characteristics.

[Pilot-Frame Transmission Method]

Figure 12:
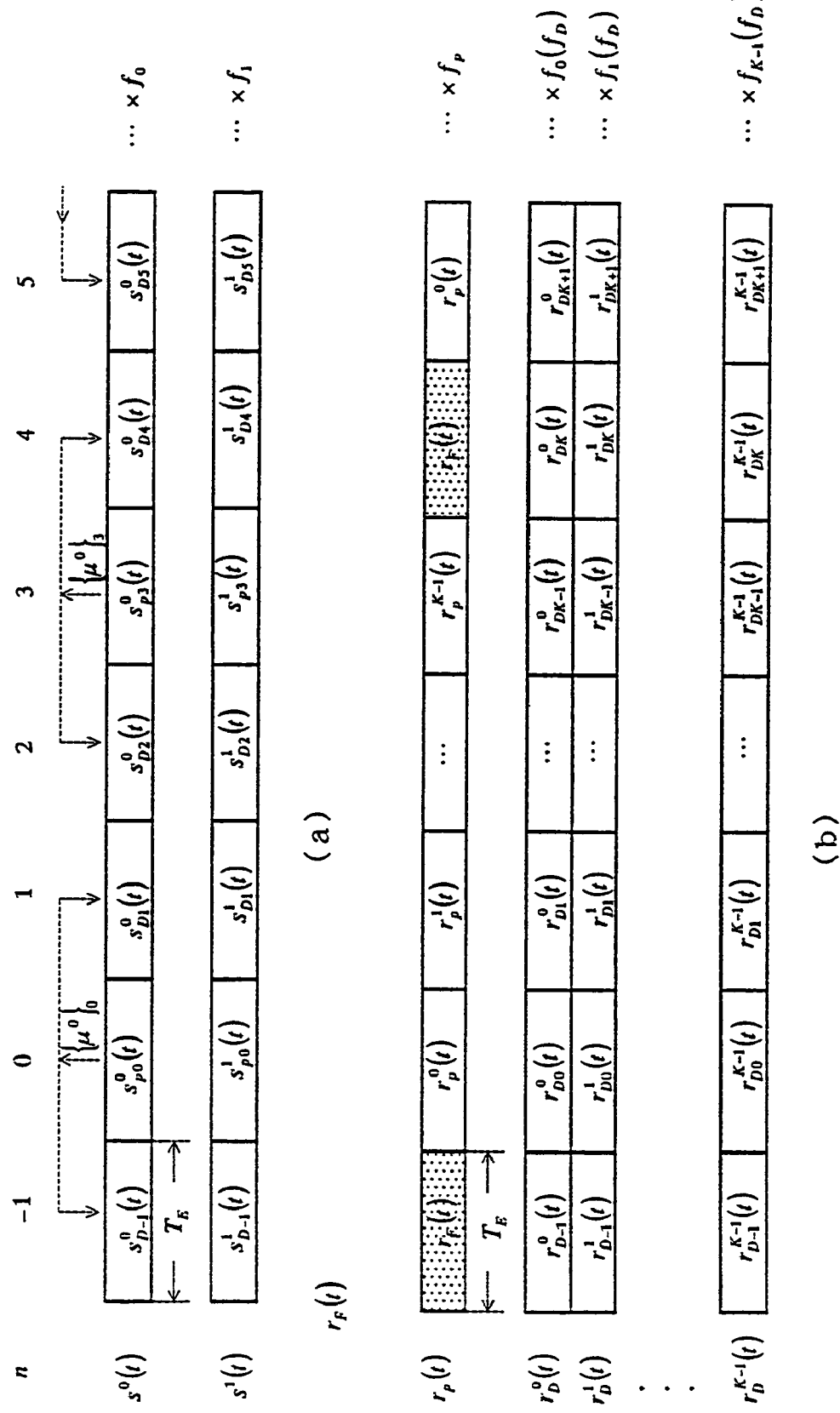
FIG. 12 shows auxiliary explanatory drawings of FIGS. 2, 4, 9, 10, and 11, indicating the composition diagrams of baseband transmission-frames used for pilot-time-division transmission-systems.

The first to fourth embodiment-examples described with reference to FIGS. 2, 4, 9, 10, and 11 have used K orthogonal carrier-waves $f'_k$ to transmit isolated pilot-frames for respective users. Namely, this example corresponds to a frequency-division pilot-frame-transmission-method. In contrast, a time-division pilot-frame-transmission-method may be used. FIG. 12 shows an auxiliary explanatory drawing of the composition of baseband transmit and received frames, similar to FIG. 7.

FIG. 12(a) shows the k-th transmit signal $s^k(t)$ of two users $u_k(k=0,1)$ in a data-sharing-channel-type time-division-pilot-transmission-system. The figure shows seven extended frames (with period $T_E$) which include the frame-sequence ordinal number n,n'(n≠n') at the end of the subscript in $s^k(t)$. In this case, pilot-frames $s_{pm}^k(t)(n=0,3,\ldots)$ and data-frames $s_{Dn}^k(t)(n'=-1,1,2,4,5\ldots)$ are arranged on the time axis as shown in the figure. This figure indicates the case in which insertion ratio of pilot and data-frames is 1:2 (equivalent to the pilot overhead $\alpha_p=\frac{1}{2}$ to be described later). $s^k(t)$ modulates the carrier-wave with orthogonal frequency $f_k$ in Eq. (18) and the modulated output is transmitted from transmitter $TX(u_k)$.

Receiver $RX(u_0)$ extracts the synchronously received frame corresponding to pilot-frame $s_{pm}^0(t)$ in time-division-manner using the frame pulse. This frame can be used to produce channel-response $\{\mu^0\}$ with a circuit approximately similar to pilot-signal generating circuit $D_p^0$ in FIG. 4, without being subjected to interference from the data-frames or the pilot-frames transmitted by other stations. In this example, using channel-response $\{\mu^0\}_0$ produced from $s_{p0}^0(t)$, the synchronously received data-frames corresponding to neighboring data-frames $s_{D-1}^0(t)$ and $s_{D1}^0(t)$ are analyzed as shown in the arrow mark in the figure. Similarly, using the illustrated response $\{\mu^0\}_3$, the synchronously received data-frames corresponding to neighboring data-frames $s_{D2}^0(t)$ and $s_{D4}^0(t)$ are analyzed. For a slow moving speed of the transmitters, the changing rate of a received signal is slow, resulting in a low Doppler shift frequency $f_d$. Let the ratio relative with symbol rate $f_l$ be $$\lambda = f_d / f_l. \quad (76)$$

The pilot-frame insertion frequency (or $\alpha_p$ to be described later) can be reduced, for $\lambda \ll 1$. Note that receiver RX can identify the order of pilot-frames and data-frames using known synchronization technology.

It is also possible to allocate common comb-tooth shaped frequency-slots to all the users in a cell for pilot-transmission and to allow each user to use the frequency-slots in the time-division-manner. The composition of baseband received frames, received by base station BS using such common pilot-channel-type time-division-transmission-system, is shown in FIG. 12(b). In the figure, $r_p(t)$ is a time-sequence (multi-frame) of extended frames on the above common pilot-channel, and the time slot $r_p^k(t)$ on the time axis is sequentially allocated to K users (k=0,1,2, ... K−1) and a synchronizing frame $r_F(t)$ is inserted every K pilot-frames.

On the other hand, the data-frames received by BS is represented as $r_{Dn}^k(t)(n=-1,0,1,\ldots)$. This is a continuous waveform on the k-th carrier-wave $f_k$ (or a common carrier-wave $f_D$), which has a composition approximately similar to the data-flock-frame $r_D(t)$ in FIG. 8(b). The receive timings of data-frames $r_D^k(t)$ in FIG. 12(b) are illustrated so as to coincide with regard to k, but it does not always coincide completely, because of the quasi-synchronous conditions in Eq. (19) and the delay time of the delayed waves. The time occupancy range of respective received flock-frames $r_{pf}^k(t)$ and $r_{Df}^k(t)$ show different extent around the illustrated time slots for those with different k, and the parts of neighboring flock-frames mutually may overlap.

The time slot of synchronizing frame $r_F(t)$ is supplied by a timing circuit in the receiver of base station BS. The transmit-timing of user $u_k$ is controlled so that the synchronously received data- and pilot-frames, $r_D^k(t)$ and $r_p^k(t)$ may arrive at the center of or near by slot $r_p^k(t)$, that is the k-th slot away from this synchronizing frame-slot. Therefore, a certain synchronously-received frame does not contain neighboring flock-frames coming from different users.

For frequencies $f_p$ and $f_k$ of carrier-waves carrying $r_p(t)$ and $r_D^k(t)$ in FIG. 12(b), the following orthogonal relationship is provided, similarly to the cases in Eq. (18) and (60)

$$f_P = f_{00} \brace f_k = f_{00} + (k+1)f_G.} \quad (77)$$

If this time-division pilot-frame-transmission-method is applied to the common data-channel-method of the third embodiment-example, by replacing $f_k$ with $f_D=f_{00}+f_G$, the number of the carrier-waves of N=2 is obtained as given by $$f_P = f_{00} \brace f_D = f_{00} + f_G.} \quad (78)$$

By designing the required parameter using this principle, RX can receive the isolated pilot-frames without being subjected to any disturbance due to data-frames or pilot-frames coming from other users.

[Description of the Partial Circuits]

Figure 13:
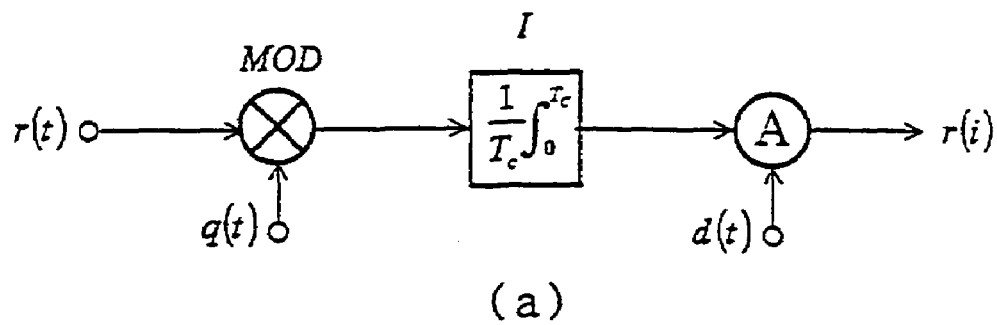
FIG. 13 shows auxiliary explanatory drawings of FIGS. 4, 9, 10, and 11 each of which is used as a partial circuit of the receiver, and (a) is a correlator $C_{or1}$ (q), (b) is a correlator $C_{or2}$ (y), and (c) is a matched filter MF(z).
Figure 13:
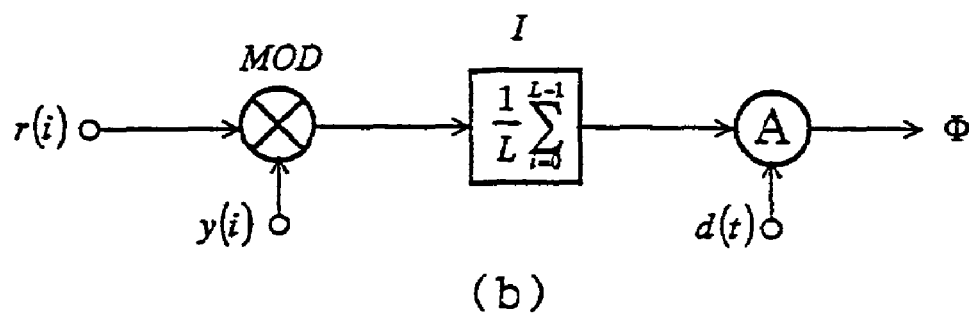
Figure 13:
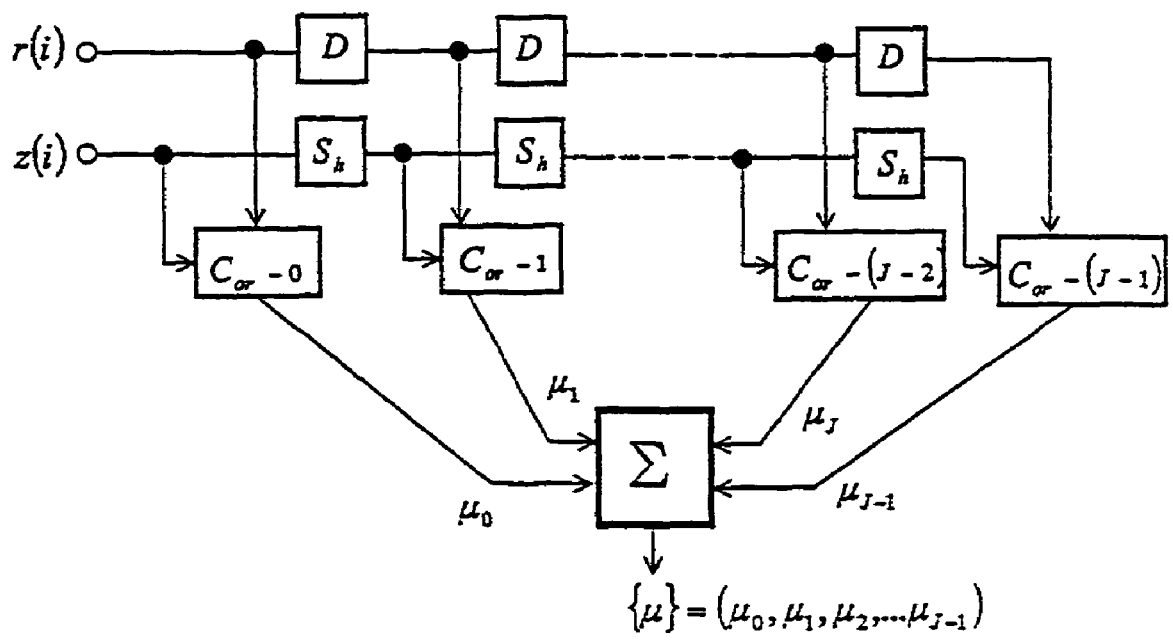
Figure 14:
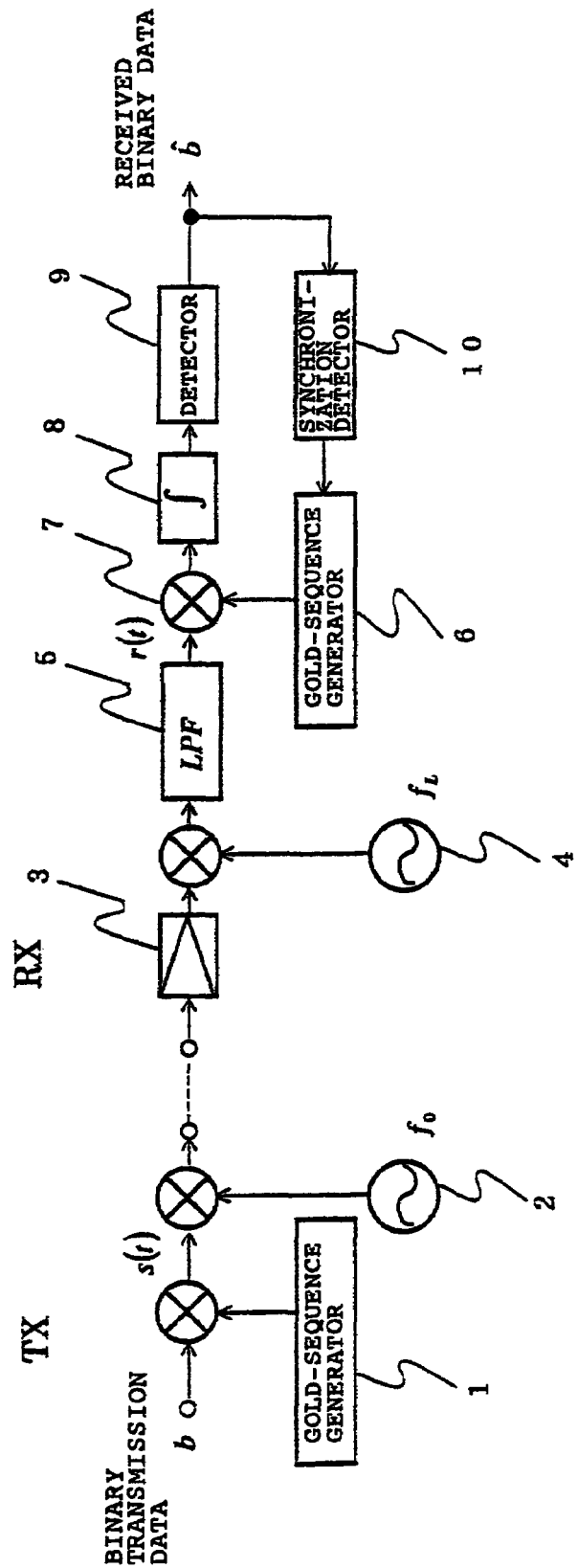
FIG. 14 shows a block diagram indicating general composition of a mobile communication system using direct-sequence spread spectrum communications (DS-SS) over radio-channels.
Figure 15:
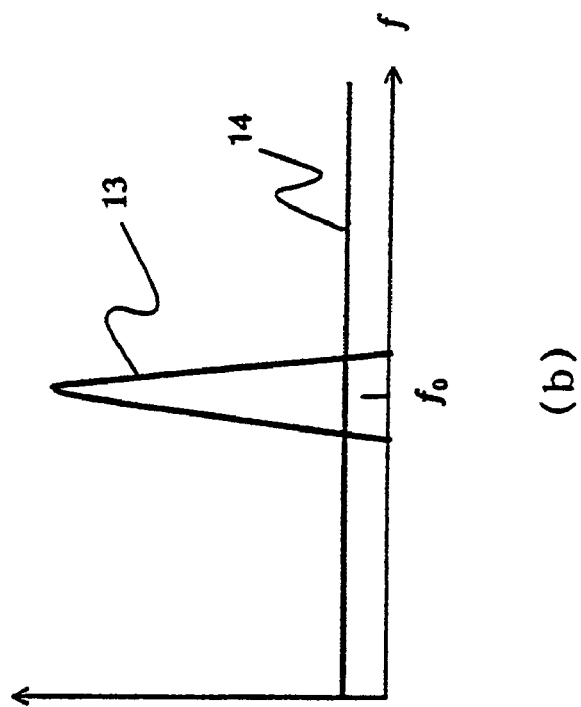
FIG. 15 shows the modeled spectrum of signals appeared in the transmission process.
Figure 15:
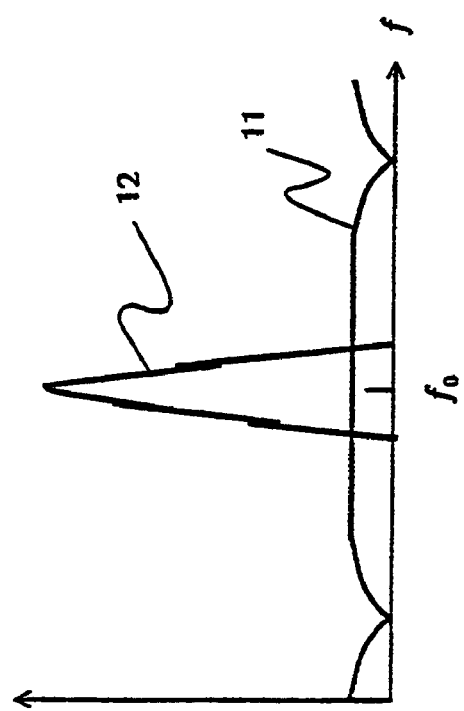
Figure 16:
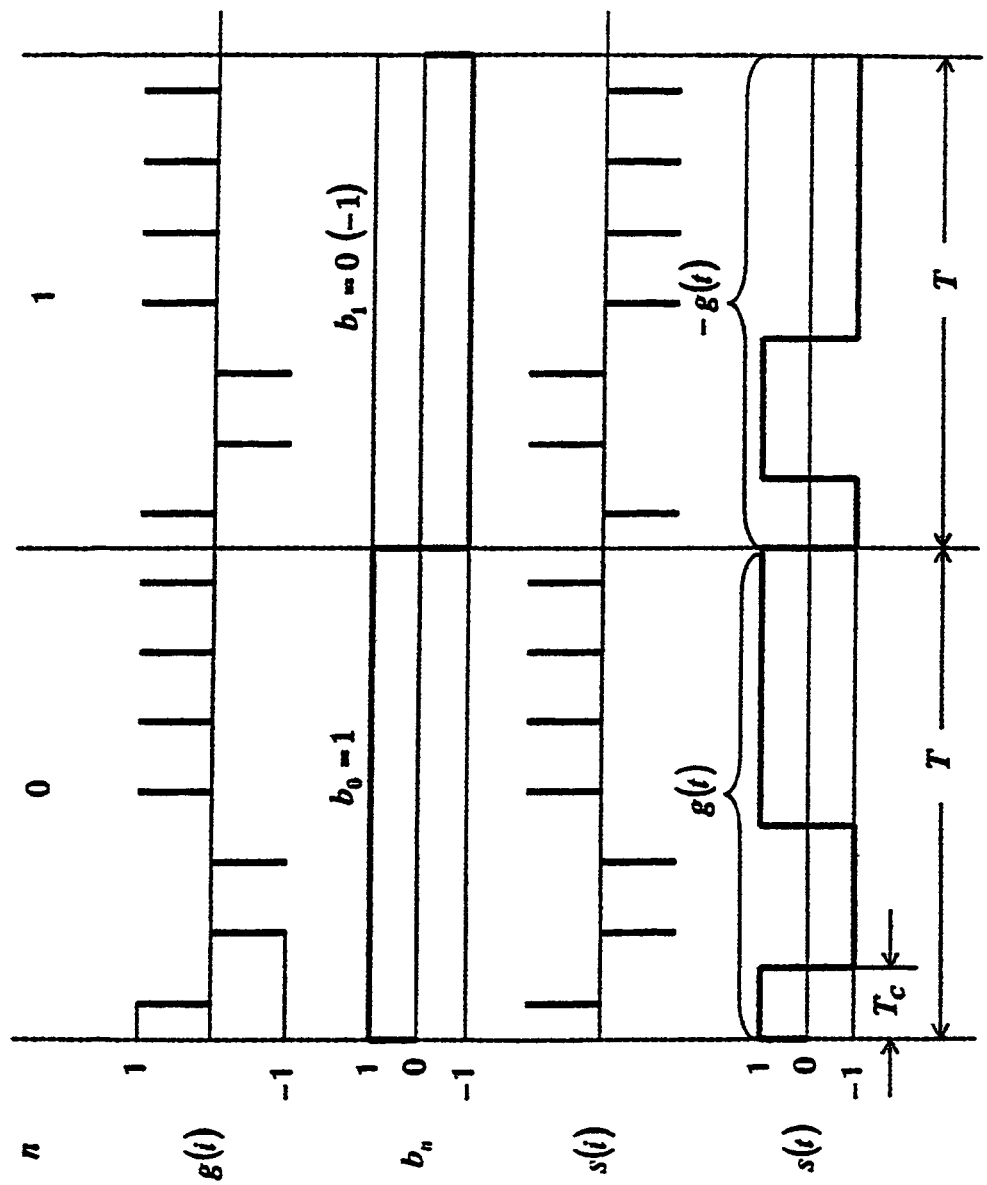
FIG. 16 is a diagram showing correspondence between a spreading (impulse) sequence $g_1$ and binary information in conventional direct-sequence spread spectrum communication systems (DS-SS).

FIG. 13 shows detailed partial circuits of the receiver used in FIG. 4 and FIGS. 9 to 11. The cross correlation processing function of these circuits is the most important element of demodulating analysis for a CDMA receiver.

FIG. 13(a) shows the continuous time correlator (matched filter) $C_{or1}(q)$. r(t) is a continuous time received frame waveform [L chip sequence waveform obtained by multiplying g(t) in Eq. (2) by information β is assumed], while q(t) is a continuous time chip-waveform in Eq. (3). Both waveforms are multiplied at the multiplier MOD and the resultant output is applied to the integrator I. If the output of I is applied to the AND-gate A the integrated value r(i) is obtained sequentially with the trigger input d(t) designating the end of integration, as the 0-shift cross-correlation output. Integrator I is reset at every trigger timing point. This circuit is used as $C_{or}(q)$ in FIG. 4. In this case, chip-waveform q(t), that is an element waveform to compose r(t) is assumed as a square wave with chip time width $T_c$. If q(t) is an f-shaped sampling function waveform, it is necessary to extend the integration range of I to $[-nT_c\sim nT_c, n>10]$. Therefore, 2n or more correlators must be arranged in parallel to perform the reset function stated above.

FIG. 13(b) shows a circuit to produce the 0-shift cross-correlation output between discrete time waveform r(i) obtained in FIG. (a) and data analyzing sequence y(i). All the processing is performed on the discrete time axis $iT_c$. Therefore, when compared with FIG. (a), the integrator I becomes an adder. The trigger point of trigger input d(t) becomes $[t=n(LT_c), n=0,1,2, \ldots L]$ with the frame number n, and the output $\Phi_n$ is obtained at every $LT_c$. This circuit is used as $C_{or}(y_n)$ in FIG. 9.

FIG. 13(c) shows a matched filter which produces the cross correlation output in FIG. (b) for all the shift positions ($\tau=0,1,2, \ldots L-1$). Here is explained an example circuit which obtains cyclic cross-correlation-function between received frame r(i) and pilot analyzing sequence z(i) defined in Eq. (25).

In the figure, D is a delay circuit by $T_c$ seconds; $S_h$ is a circuit having such a function as to delay by $T_c$-seconds and to shift sequence z(i) cyclically by one chip; and $C_{or-j}(j=0, 1,2, \ldots J-1)$ is a correlator similar to FIG. (b). In the figure, the inputs to the j-th correlator $C_{or-j}$ can be viewed as r(i) and z(i-j), when considering them by neglecting the delay time. Accordingly, the output is the j-shift-correlation-value $\mu_j$ occurring at the time position delayed by $jT_c$. Thus, the sum $\{\mu\}$ of all the correlator outputs is obtained. If all of elements are to be obtained simultaneously, J components of $\mu_j$ are obtained as parallel outputs by eliminating D and delay function in $S'_h$. (As the input to the correlator is a complex number, the complex operation processing is performed at each correlator.) This circuit is also used as matched filter MF(z) in FIG. 4.

[Power Bandwidth Characteristics]

Let the number of chips v required to transmit one bit, as an evaluation measure indicating the frequency utilization efficiency of this system. v is represented by the following equation $$v = \frac{L_E}{KI} = \frac{K(\alpha_p + \alpha_D)L(1+\alpha_h)}{KI} \quad (79)$$

where,
$L_E$: Sequence length of extended frame ($=L_G+2L_h$)
K: Number of users
I: Amount of information per symbol-frame [see Eq. (14)]
L: Length of basic spreading sequence
$L_h$: Length of header sequence (assumed to be equal to the tail sequence)
$L_G$: Length of core-sequence (=NL)
N: Number of carrier-waves [$N=K(1+\alpha_p)$]
$\alpha_p$: Overhead ($\leq 1$) caused by the insertion of pilot-frame
$\alpha_D$: Overhead ($\leq 1$) due to the number of data-frame-transmission-carrier-waves
$\alpha_h$: Overhead ($\leq 1$) due to the addition of header and tail.

Converting the value of the above equation to the information quantity that can be transmitted over the occupied bandwidth of 1 Hz, approximately (2/v) bits/Hz is obtained. Note that $\alpha_p<1$ can be achieved, when the data-sharing-channel-type- or common pilot-channel-type-time-division-transmission-method as described above is used. When the third embodiment-example as described above is used, $\alpha_D<1$ can be also achieved. When the cell size is relatively small, $\alpha_h$ can be reduced. For a large information quaintly I per symbol, a long extended frame-period can be used, consequently $\alpha_h$ can be reduced.

Now let us consider the transmission power of a user located at an average distance from the base station. As the degradation of the error rate characteristics due to additive white Gaussian noise on the pilot-frames is more considerably lager than that due to noise on the data-frames, the pilot-frame power $P_P$ must be L-times larger than, according to the basic spreading sequence length, the unit power $P_{D0}$ of data-frame for a case of $\gamma=1$. On the other hand, for a low-speed moving body, $\lambda=f_d/f_r<<1$ is established in Eq. (76), therefore, $P_P$ can be chosen to be a sufficiently small value by using values obtained by integrating a number of neighboring pilot frame-responses as the pilot response. [Assuming that the number of frames to be integrated is $N_\alpha$, the noise power contained in the pilot-response becomes $1/N_\alpha$] Here, let the total transmission power of each user be as follows $$P_U = P_P + P_D = (\eta + \gamma)P_{D0} \quad (80)$$

If $\lambda<<1$ and $\eta=P_P/P_{D0}<<1$ are established, then the power can be reduced to $P_U \cong \gamma P_{D0}$. Alternatively, instead of reducing η, v can be further reduced by setting $\alpha_p<<1$. With γ=around 2–3, it is not required to consume excessive power for a transmitter of a mobile station which favors low power dissipation.

Consider applying this invention to the down-link transmission. In this case, a common pilot-frame can be used, so that the number of carrier-waves to be allocated to the pilot-frame transmission may become one, resulting in dramtic reduction in $\alpha_p = 1/K$ in Eq. (79). The transmit-power of the base-station-transmitter for the down-link, when all the users are located in an average distance, is given by $$i \ P_B = (\eta + K\gamma)P_{D0} \tag{81}$$

Since the base-station can practically increase the transmit-power, it is possible to increase $\gamma$ and resultantly to decrease v. When the maximum value of $\gamma_m$ is used, $\gamma$ of the above equation should take an average less than $\gamma_m$. The product of the above transmit-power and the chip/bit is a power-bandwidth-product that is required for transmission of one-bit information, and given by the following equation $$PB = vP \tag{82}$$

where $P_U$ or $P_B$ is used as P. It is considered that the less PB is the more advantageous the system becomes.

Now, consider the design-example shown in Table 1.

| System | | M | γ | $\gamma_m$ | I | K | $\alpha_P$ | $\alpha_D$ | N | L | $L_G$ |
|---|---|---|---|---|---|---|---|---|---|---|---|
| Up-link | X | 65 | 2 | | 13.0 | 30 | 1 | 1 | 60 | 10 | 600 |
| | X' | 65 | | 2 | 20.0 | 30 | 2 | 1 | 60 | 10 | 600 |
| | Y | 8 | 3 | | 8.8 | 30 | 1 | 1 | 60 | 8 | 480 |
| | Y' | 8 | | 3 | 19.6 | 30 | 1 | 1 | 60 | 8 | 480 |
| | W | 8 | 3 | | 8.8 | 30 | 1 | 1/30 | 31 | 13 | 403 |
| | W' | 8 | | 3 | 19.6 | 30 | 1 | 1/30 | 31 | 13 | 403 |
| Down-link | Z | 67 | 4 | | 23.5 | 30 | 1/30 | 1 | 31 | 10 | 310 |
| | Z' | 67 | | 4 | 65.2 | 30 | 1/30 | 1 | 31 | 10 | 310 |

| System | | $L_h$ | $L_E$ | v | $P_U/P_B$ (× $P_{D0}$) | PB |
|---|---|---|---|---|---|---|
| Up-link | X | 60 | 720 | 1.85 | 2 | 3.7 |
| | X' | 60 | 720 | 1.20 | 1.5 | 1.8 |
| | Y | 48 | 576 | 2.18 | 3 | 6.5 |
| | Y' | 48 | 576 | 0.98 | 2 | 2.0 |
| | W | 40 | 483 | 1.83 | 3 | 5.5 |
| | W' | 40 | 483 | 0.82 | 2 | 1.6 |
| Down-link | Z | 31 | 372 | 0.53 | 120 | 63.6 |
| | Z' | 31 | 372 | 0.19 | 75 | 14.3 |

X, Y, and W are example-systems for up-link-transmission, while Z is one for down-link-transmission. X is also a system shown in FIGS. 2 and 4, Y is of using the cyclic shift single-sequence in FIG. 9, and W is of the data-channel-sharing-method in FIG. 10. Z is a system with $f_k = f_p$ in FIGS. 2 and 4. The systems with prime symbol are of using $\gamma_m$, a method in which the maximum value $\gamma_m$ is set and all of $\gamma$ less than $\gamma_m$. The values of PB (consider 1/30 times the values shown in the table for the down-link as the values per user) of systems X, Y, and W take far more favorable values than about 10 that can be achieved by current practical system. As $\alpha_P = 1$ is selected in the above design-examples, one pilot-frame per symbol-frame is transmitted, the noise on the pilot frame can be reduced through integration. Therefore, $\eta \cong 0$ may be assumed in Eqs. (80) and (81). Value v in system Z for the down-link is generally lower than that for the up-link, because a common pilot can be used, indicating that advantageous characteristics can be achieved. However, the time-division-transmission-method of pilot may be used for the up-link as well to reduce further v and PB.

When compared with the systems of using a fixed value for γ, the systems using the maximum value $\gamma_m$ demonstrates further advantageous characteristics. Thus, the present invention can realize systems having extremely higher frequency-utilization-efficiency than that of conventional systems.

The extended frame-period and header sequence-period are given as follows, when the information-transmission-rate of the system is assumed to be R(bits/sec).

$$\left. \begin{array}{l} T_E = 1/R \\ T_h = \dfrac{T_E L_h}{L_E} \end{array} \right\} \tag{83}$$

$T_h = 10.8$ μsec is obtained in the above design-example (X) for R=100 kbps. When the cell radius is assumed to be 1 km, the maximum delay time is $\tau_M \cong 1.8$ μsec. Therefore, $\tau_M \ll T_h$ indicates that the quasi-synchronous condition in Eq. (19) is sufficiently satisfied.

Note that the present invention has an ideal Rake-reception-function. This function is also called path-diversity, which utilizes the power of not only the direct wave but also multiple delayed waves, resulting in improvement of the error rate characteristics. Moreover, by adding the two kinds of sequence extending methods to the systems shown in Table 1, the number of sequences, M, or the number of users, K can be increased, resultantly materializing extremely superior systems which are capable of reducing value PB to a fraction of the values shown in the table.

According to the present invention as described for the first embodiment-example, in order to transmit transmit-information of I bit per symbol, a transmitter creates M kinds of enveloped sequences in which guard sequences are added to a repeated spreading sequence, from which γ components are selected to produce an original information set {β} consisting of (M−γ) components of 0 and γ components of non-0. Using this set, a selected information-set {β$^s$} consisting of γ components is produced. By modulating the respective selected enveloped sequences with {β$^s$}, a baseband data-frame is produced. In the similar manner, using one pilot basic sequence, an isolated pilot-frame is produced. Each data-frame modulates an orthogonal individual carrier-wave so that data-frames transmitted by respective users may not be interfered one another, generating a frequency-division type radio-band transmit-data-frame to be transmitted. A receiver receives data-flock-frame and pilot-flock-frame corresponding to the previously-described transmitted frames, analyzes the former on the basis of accurate channel responses produced from the demodulated output of the latter, and estimates the influence of interference-wave-components from the analytical result. As a consequence, the receiver eliminates the influence of interference-components from the received demodulated components, so that transmit-information of I (for example, I=13 with M=65 and γ=2) per symbol can be detected without being subjected to interfering disturbance. In consequence, a high frequency-utilization-efficiency is achieved. Moreover, the transmit-power can be kept low, unless an excessively large value is selected for γ so that this method may be applied to an up-link-transmission.

The invention shows a direct analysis method used by a receiver which operates for the transmit-functions of the invention according to the first embodiment. In the receiver, a pilot-matrix is produced from both channel responses produced from synchronously received pilot-frames and the respective spreading sequences, and a received data-matrix is produced based on a synchronously received data-frame. With the direct analysis method solving a system of linear equations in M unknowns, produced using of these matrices and an unknown matrix, respective transmitted information can be detected without being subjected to the disturbance due to the other spreading sequence components transmitted simultaneously. Therefore, even when the number of sequences of spreading sequence population M or the number of selected sequences γ is excessively large, for example, an estimate value $\beta_0^{s'}$ of information $\beta_0^s$ carried by the 0-th spreading sequence $g_0^s$ can be obtained without being subjected to the disturbance due to the other spreading sequence $g_m^s (m \neq 0)$ components transmitted simultaneously. Moreover, this analysis is performed on the basis of the channel response obtained with an isolated pilot, and it utilizes the same received signal power as that of an ideal Rake-reception. Therefore, this method is effective in achieving excellent error rate versus SN (signal/noise) ratio characteristics.

The invention is a method to transmit the respective user data-frames with a common carrier-wave $f_D$, over the common comb-tooth shaped frequency-slots, where the k-th user transmitter transmits the pilot-frame using frequency-division-transmission with the carrier-wave $f_k$ over the k-th comb-tooth shaped frequency-slots. Namely, this method is effective in saving the bandwidth to be occupied, because all the users share the same bandwidth for data-transmission.

The invention is methods related to the transmission of accurate pilot-frames. The transmitter provides an enveloped sequence, in which guard sequences are added to a core sequence made by repeating a basic spreading sequence for pilot. When transmitting the baseband transmit-pilot-frame made by multiplying the enveloped sequence by the pilot information, such synchronizing technology is provided that the received timing deviation of flock-frames which the receiver received from respective user stations may be kept within the range of guard sequences. In addition, respective users transmit the transmit-pilot-frames over the respective comb-tooth shaped frequency slots in frequency-division-manner by using carrier-waves with mutually-orthogonal frequencies (belong to a carrier-wave set with the frequency interval which is the reciprocal of the synchronously received frame-period). As a consequence, the pilot-frame concerned may have the orthogonal relationship with the data-frames transmitted by all the stations or the pilot-frames transmitted by the other stations. Alternatively, such technology is provided, that the pilot-frame uses a carrier-wave with the same orthogonal frequency as the data-frame and it is transmitted in the time-division manner with the data-frame. Alternatively, such frequency-division, time-division combined technology is provided, that with all the pilot-frames are transmitted on the time axis of common pilot-frame in time-division-manner by using a carrier-wave common to user stations.

According to the present invention, the receiver can receive an accurate isolated pilot of the desired station, without being disturbed by the interference due to the data-frame of the own station as well as pilot- and data-frames transmitted by the other users, and can produce an exact channel response based on the received pilot. The error rate versus SN ratio characteristics of the embodiment-examples according to the present invention can be remarkably improved due to high purification of this pilot. The time-division-transmission of pilot-frame is advantageous in that the pilot overhead can be reduced.

The invention uses the correlation analysis method, instead of the direct analysis method of the receiver of the first embodiment, Namely, the correlation-functions of synchronously received pilot- and data-frames with the same analyzing sequence y is obtained, and using its outputs, that are the pilot-response and data-response, a system of linear equations with size M×M is established, and by solving it the transmitted information is obtained. This method is free from a restriction of limiting the size to the sequence length L, and can produce a system with size M×M for M kinds of sequences prepared in the transmitter. Besides, this method enables the analysis focused on specific sequence components, which is effective in increasing the degree of freedom in solving the equations.

The invention is such technology is provided that the effective length of pilot (response)-matrix is doubled by means of the complex-number developed type sequence extended method, the dimensions of the system of linear equations is doubled. Namely, according to this technology, the sequence length of synchronously received data-frame $r^*_D$ which the receiver has received is equal to the sequence length L of transmission basic spreading sequence, but the L components of chip elements with the $r^*_D$ complex amplitude are separated into the real and imaginary parts. The imaginary part is assumed as a new real part, and both real parts are added to make up a double-length sequence-frame for analysis.

The invention is such technology that the dimensions may be increased by means of sequence extending with transmission-diversity and diversity-reception. Namely, $N_v$ pieces of transmit-diversity-antennas and $N_d$ pieces of receive-diversity-antennas are provided, respectively, on the output side of the transmitter and on the input side of the receiver, and plural ($N_d$) received inputs are applied to plural ($N_v N_d$) pieces of pilot- and data-receive-blocks which have such functions as pilot-signal-demodulation, channel-response-generation, fabricated-pilot-frame-generation, and data-frame-demodulation. The respective $N_v N_d$ fabricated pilot-frames with L chip elements which are the outputs from these blocks are aligned on the time axis, generating an extended fabricated pilot-frame with effective sequence-length $N_v N_d L$. On the other hand, $N_v N_d$ of data-frames with L chip elements, which are outputs from the above blocks, are similarly aligned to produce an extended data-frame. Thereby the dimensions of the system of linear equations can be increased to $N_v N_d L$.

The invention is such technology that the sequence extending technology may be combined. Thus, the invention provides such technology as to increase the effective length of spreading sequences to be processed by the receiver. The technology not only enhances the regularity of said receive-pilot-matrix and pilot-response-matrix, but also increases the number of sequences M or the number of available users K to be accommodated. Therefore, the technology is effective in enhancing the frequency-utilization-efficiency of the systems, while reducing the power-bandwidth-product.

The invention is such technology that problems taking place whenever the kinds M of basic spreading sequences prepared by the transmitter is excessively larger than the spreading sequence length (effective spreading sequence length) may be overcome. On the above-stated condition, the rank of pilot-matrix and pilot-response-matrix produced tends to reduce. By utilizing such character that the number γ of selected sequences to be transmitted is sufficiently smaller than M or the spreading sequence length, plural virtual solution sets are obtained. By introducing an evaluation function indicating the difference from the true values, one of these virtual solutions (sets) is determined as the maximum likelihood solution (set). Since this allows M to increase, there is an effect in improving the frequency-utilization-efficiency.

The invention enables an increase in the information quantity per symbol and thereby improves the frequency-utilization-efficiency, by allowing selection of γ under a condition of $γ \leq γ_m$, instead of fixing γ, that is the number of the spreading sequences to be transmitted by the transmitter. This technology can be achieved only when used together with the high-level interference-wave-elimination technology of the present invention.

The invention is such technology as to add $h(\geq 1)$ dummy information and an additional column vector A into the system of M linear equations. In the case of, by adding an additional column vector A and an additional row vector C, it is converted into a system of (M+h) linear equations, thereby the regularity of the pilot (response) matrix may be enhanced by selecting the additional vector A, when solving a system of M linear equations the receiver has produced by based on pilot-response-matrix and data-frame-response. Note that the additional row vector C is selected to obtain the maximum likelihood solution. This technology is effective in minimizing the influence to the solution due to the noise and error components contained in the pilot-response-matrix by enhancing the regularity.

The invention is to provide such technology that respective users in each cell generate a scrambled spreading sequence set inherent to the cell based on the M kinds of common basic spreading sequences, as the M kinds of basic spreading sequences, by allocating a cell-inherent scrambling sequence to each cell. Despite users, mobile stations, move to and from in many cells, they can always use the same basic sequence set in the all cells, thereby of the system scale can be simplified. Moreover, in this invention, the receiver produces the above scrambled sequence set and performs demodulation analysis based on the said principle using this set and the channel response. Therefore, the superior interference (due to inter-cell and intra-cell) separation function can be achieved and effective utilization of all the energy of delayed waves coming from the desired station can be utilized. Therefore, this method realizes more advantageous transmission characteristics than that of conventional systems.

The invention provides M'N kinds of sequence population made by multiplying M' kinds of basic spreading sequences by Hadamarl codes with size N×N. A transmitter produces data-frames by selecting γ components of the spreading sequences from the population, and transmits it. The present invention is effective in generating multiple kinds of spreading sequence sets with small cross-correlation based on a few basic spreading sequences for transmission.

The invention provides LM' kinds of sequence population in correspondence to the spreading sequence length L, by producing the cyclically shifted sequences based on each spreading sequence of M' kinds of basic spreading sequences, and then adding them to the basic spreading sequences. A transmitter produces data-frames by selecting γ components of the spreading sequences from the population, and transmits it. The receiver obtains a data analyzing sequence corresponding to the basic spreading sequence, and prepares M' pieces of matched filters which are matched to the analyzing sequences, outputting M=LM' pieces of correlation-outputs. By solving a system of linear equations in M unknowns based on such outputs, the transmitted information is detected. Accordingly, LM" pieces of sequence populations can be used on the basis of M' kinds of sequences, so that the information quantity per symbol may increase. Application of the present invention technology to down-link-transmission enables the use of a common pilot-frame. Besides, the down-link has the synchronous transmission characteristics, so that the number of guard-chips can also be reduced, thus reducing the overhead of pilot- and guard-sequences. Consequently, a higher frequency-utilization-efficiency for the down-link than that for the up-link can be achieved.

Consider the application of the present invention to radio LAN. Since LAN is a stationary system, the transmitting frequency of pilot-frames can be decreased. Therefore, the overhead for pilot-transmission can be reduced by the use of a common carrier-wave for pilot-frame-transmission. As a result, a high frequency-utilization-efficiency may be achieved.

For the reason described above, application of the transmission technology according to the present invention to cellular mobile communication systems or radio LAN systems will achieve remarkable performance. When the additional vector type high accuracy solution method according to the present invention is applied to all systems requiring the solution of a system of linear equations containing noise and error components in multiple unknowns, remarkable effects can be obtained.

The invention claimed is:

1. A CDMA communications system using multiple spreading sequences characterized by, in a direct-sequence spread-spectrum CDMA communications system comprising, a transmitter of a k-th user $u_k(k=0,1, \ldots K-1)$ comprises such a function as to transmit information of I bits per symbol-frame by providing;

means of a sequence-set consisting of M kinds of basic spreading sequences $g_0, g_1, \ldots g_m, \ldots g_{M-1}$, each sequence having code length L, is prepared, an information-set consisting of γ components, $\{β^S\}=(β_0, β_1, \ldots β_{γ-1})$ not including a value 0 is made of a modulated sequence-set which is made by multiplying said M kinds of basic spreading sequences by an original information-set consisting of M components $\{β\}=(β_0, β_1, \ldots β_{M-1})$ including (M−γ) pieces of the value 0, resulting in production of a selected sequence-set consisting of γ selected spreading sequences, means of a modulated synthesized sequence $S_D$ is produced by adding up all of said selected spreading sequences, that a repeated core spreading sequence $s_{DN}$ with a sequence length of NL chips is produced by repeating said modulated synthesized sequences $s_D$ an integer (N) times, that an enveloped sequence $e_D$ is produced as a baseband transmitting data-frame by arranging the rear and the front parts of said repeated core spreading sequence as guard sequences at the front and the rear outsides of said repeated core spreading sequence, and that said data-frame modulates a carrier-wave having k-th orthogonal frequency $f_k$ which is orthogonal to each other on k and the resultant output is transmitted, and means of a similarly enveloped sequence $e_p$ is produced based on a sequence $pg_p$ which is made by multiplying a basic spreading sequence $g_p$ for pilot by a pilot-information p as a baseband transmit-pilot-frame, and that said baseband transmit-pilot-frame is transmitted so as not to interfere with similar data-frames and pilot-frames of other users, and a receiver comprises such a function as to detect the transmitted information of I bits per symbol-frame by providing;

means of a received signal is demodulated into a baseband signal using a local carrier-wave $\hat{f}_0$ of a 0-th orthogonal frequency $f_0$ which the transmitter of a desired user $u_0$ has used, that a synchronously received frame period with the sequence length of NL chips is set at the position which is synchronized with a principal wave of signal components coming from the desired user included in this demodulated output, that the baseband signal component on this period is extracted as a repeated synchronously received data-frame $r^*_{DN}$, and a repeated synchronously received pilot-frame $r^*_{pN}$ is also obtained in the same way, and that by applying an averaging operation to said respective repeated frames, a synchronously received data-frame $r^*_D$ and a synchronously received pilot-frame $r^*_p$ both with reduced length L chips are produced, means of said synchronously received data-frame $r^*_D$ is analyzed using a channel response $\{\mu\}$ which is the demodulated output of said synchronously received pilot-frame, resulting in production of an estimate-set $\{\beta'\}=(\beta'_0, \beta'_1, \ldots \beta'_{M-1})$ corresponding to said original information-set which has been transmitted by a desired station, and means of a detected output-set $\{\hat{\beta}^S\}=\{\hat{\beta}_0{}^S, \hat{\beta}_1{}^S, \ldots \hat{\beta}_{\gamma-1}{}^S\}$ consisting of the information which the desired station has transmitted is obtained by judging said estimate-set.

2. A CDMA communications system using multiple spreading sequences characterized in that, in a direct-sequence spread-spectrum CDMA communications system comprising, a transmitter of a k-th user $u_k$(k=0,1, ... K−1) comprises such a function as to transmit information of I bits per symbol-frame by providing;

means of that a sequence-set consisting of M kinds of basic spreading sequences $g_0, g_1, \ldots g_m, \ldots g_{M-1}$, each sequence having code length L, is prepared, an information-set consisting of γ components, $\{\beta^S\}=(\beta_0, \beta_1, \ldots \beta_{\gamma-1})$ not including a value 0 is made of a modulated sequence-set which is made by multiplying said M respective basic spreading sequences by an original information-set consisting of M components $\{\beta\}=(\beta_0, \beta_1, \ldots \beta_{M-1})$ including (M−γ) pieces of the value 0, resulting in production of a selected sequence-set consisting of γ selected spreading sequences, means of a modulated synthesized sequence $s_D$ is produced by adding up all of said selected spreading sequences, that a repeated core spreading sequence $s_{DN}$ with a sequence length of NL chips is produced by repeating said mosulated synthesized sequences $s_D$ an integer (N) times, that an enveloped sequence $e_D$ is produced as a baseband transmitting data-frame by arranging the rear and the front parts of said repeated core spreading sequence as guard sequences at the front and the rear outsides of the said repeated core spreading sequence, and that said data-frame modulates a carrier-wave having a k-th orthogonal frequency $f_k$ which is orthogonal to each other on k and a resultant output is transmitted, and means of that a similarly enveloped sequence $e_p$ is produced based on a sequence $pg_p$ which is made by multiplying a basic spreading sequence $g_p$ for pilot by a pilot-information p as a baseband transmit-pilot-frame, and that said baseband transmit-pilot-frame is transmitted so as not to interfere with similar data-frames and pilot-frames of other users, and a receiver comprises such a function as to detect the transmitted information of I bits per symbol-frame by providing;

means of that a received signal is demodulated into a baseband signal using a local carrier-wave to $\hat{f}_0$ a 0-th orthogonal frequency $f_0$ which the transmitter of a desired user $u_0$ has used, that a synchronously received frame period with a sequence length of NL chips is set at the position which is synchronized with a principal wave of signal components coming from the desired user included in this demodulated output, that the baseband signal component on this period is extracted as a repeated synchronously received data-frame $r^*_{DN}$, and a repeated synchronously received pilot-frame $r^*_{PN}$ is also obtained in the same way, and that by applying an averaging operation to said respective repeated frames, a synchronously received data-frame $r^*_D$ and a synchronously received pilot-frame $r^*_P$ both with reduced length L chips are produced, means of that M kinds of fabricated pilot-frames $r^*_{pm}$ (m=0,1,2, ... M'−1) each having a length of L chips are produced by using both a channel response (μ) which is the demodulated output of said synchronously received pilot-frame and the original information set consisting of M kinds of basic spreading sequences, resulting in production of a pilot matrix ρ with a size of L×M, and means of that a system of M linear equations in M unknowns is made of said pilot-matrix ρ, a received data-matrix $d'=(d'_0, d'_1, \ldots d'_{L-1})^T$ consisting of the chip-elements of the synchronously received data-frame $r^*_D$, and an unknown matrix $\beta'=(\beta'_0\ \beta'_1 \ldots \beta'_{M-1})^T$, that an estimate-set $\{\beta'\}=(\beta'_0, \beta'_1 \ldots \beta'_{M-1})$ corresponding to the original information-set is produced by solving the said system, and a detected output-set $\{\hat{\beta}^S\}=(\hat{\beta}_0{}^S, \hat{\beta}_1{}^S, \ldots \hat{\beta}_{\gamma-1}{}^S)$ consisting of the information-set which the desired user has transmitted is obtained by judging said estimate-set.

3. A CDMA communications system using multiple spreading sequences characterized in that, in a direct-sequence spread-spectrum CDMA communications system comprising, a transmitter of a k-th user $u_k$(k=0,1, ... K−1) comprises such a function as to transmit information of I bits per symbol-frame by providing;

means of a sequence-set consisting of M' kinds of basic spreading sequences $(g_0{}^k, g_1{}^k \ldots g_m{}^k \ldots g_{M'-1}{}^k)$, each having a sequence length of L chips, is prepared, an information-set consisting of γ components, $\{\beta^{kS}\}=(\beta_0{}^{kS}, \beta_1{}^{kS}, \ldots \beta_{\gamma-1}{}^{kS})$ not including a value 0, is made of a modulated sequence-set which is made by multiplying said M' respective basic spreading sequences by an original information-set consisting of M' components $\{\beta^k\}=(\beta_0{}^k, \beta_1{}^k, \ldots \beta_{M'-1}{}^k)$ including (M'−γ) pieces of the value 0, resulting in production of a selected sequence-set consisting of γ selected spreading sequences $\{\beta^{kS}g^{kS}\}=(\beta_0{}^{kS}g_0{}^{kS}, \beta_1{}^{kS}g_1{}^{kS} \ldots \beta_{\gamma-1}{}^{kS}g_{\gamma-1}{}^{kS})$, means of a modulated synthesized sequence $s_D{}^k$ is produced by adding up all of said selected spreading sequences, that a repeated core spreading sequence $s^{DNk}$ with a sequence length of NL chips is produced by repeating said modulated synthesized sequences $s_D^k$ an integer (N) times, that an enveloped sequence $e_D^k$ is produced as a baseband transmitting data-frame by arranging the rear and the front parts of said repeated core spreading sequence as guard sequences at the front and the rear outsides of the modulated synthesized sequence $s_D^k$, and that said data-frame $e_D^k$ modulates a carrier-wave having a frequency $f_D$ which is a common carrier for data, and resultant output is transmitted, means of a similarly enveloped sequence $e_p^k$ is produced using a sequence $pg_p$ which is made by multiplying a basic spreading sequence $g_p$ for pilot by a pilot-information p as a baseband transmit-pilot-frame, and said baseband transmit-pilot-frame modulates a carrier-wave having an orthogonal frequency $f_k$, and a resultant output is transmitted, and means of all of the frequencies $f_D$ and $f_k$ are set so as to be different from each other by integer times of a frequency $f_G$ corresponding to the reciprocal of synchronously received frame-period with length NL chips, and a receiver comprises such a function as to detect the transmitted information of I bits per symbol-frame by providing;

means of a received signal is demodulated into baseband signals using local carrier-waves $\hat{f}_k$ and $\hat{f}_D$ respectively having the orthogonal frequencies $\hat{f}_k$ and $\hat{f}_D$ which the transmitter has used, that the synchronously received frame-period with a length of NL chips is set so as to satisfy a quasi-synchronous condition, that a repeated synchronously received data-frame $r^*_{DN}$ and a repeated synchronously received pilot-frame $r_{pN}^{k*}$ are produced by extracting the baseband signal components on this period, and that a synchronously received data-frame $r^*_D$ and a synchronously received pilot-frame $r_p^{k*}$ both having a reduced length of L chips are produced by applying an averaging operation to said respective repeated frames, means of M' kinds of fabricated pilot-frames $r_{pm}^{k*}$ (m=0,1,2, ... M'-1) each having a length of L chips are produced by using both a channel response (μ) which is the demodulated output of said synchronously received pilot-frame and the original information set consisting of M' kinds of basic spreading sequences, resulting in production of a pilot-matrix ρ' with a size of L×M using M=KM' pieces of the fabricated pilot-frames, and means of that a system of M linear equations in M unknowns is made of said pilot-matrix ρ', a received data-matrix $d'=(d'_0, d'_1, \ldots d'_{L-1})^T$ consisting of the chip-elements of the above-described synchronously received data-frame $r^*_D$, and an unknown matrix $\beta^{k'}=(\beta_0^{0'}\beta_1^{0'} \ldots \beta_{M'-1}^{0'}, \beta_0^{1'}\beta_1^{1'} \ldots \beta_{M'-1}^{1'}, \beta_0^{K-1'}\beta_1^{K-1'} \ldots \beta_{M'-1}^{K-1'})^T$, that an estimate-set $\{\hat{\beta}^{k'}\}=(\hat{\beta}_0^{k'}\hat{\beta}_1^{k'} \ldots \hat{\beta}_{M'-1}^{k'})$ corresponding to the original information-set which the k-th user has transmitted is produced by solving said system, and that a detected output-set $\{\hat{\beta}^{kS}\}=(\hat{\beta}_0^{kS}, \hat{\beta}_1^{kS}, \ldots \hat{\beta}_{\gamma-1}^{kS})$ consisting of the above-described transmitted information for the k-th user is obtained by judging said estimate-set.

4. A CDMA communications system using multiple spreading sequences characterized in that, in claim 1 or 2, the transmitter of the k-th user $u_k$(k=0,1, ... K-1) comprises;

means of a transmitting pilot-frame $e_p$ which is an enveloped sequence produced based on a basic spreading sequence $g_p$ for pilot frame is transmitted over a carrier-wave with an orthogonal frequency $f_k$, that said orthogonal frequencies $f_k$ and $f_k$(k=0,1,2, ... K-1) used for transmitting the pilot-frames and data-frames respectively are set so as to be different on k from each other by integer times of a frequency $f_G$ which is the reciprocal of a repeated synchronously received frame period $T_G$, resulting in providing of a frequency-division-pilot-frame-transmission-function by setting the sequence length of the guard sequences so that any boundaries of the respective received flock flames $r_{pf}^k$ and $r_{Df}^k$ coming from all the users may not be included in the synchronously received frame period, and the receiver comprises;

means of said synchronously received pilot-frame is demodulated using a local frequency $\hat{f}_0$ corresponding to the orthogonal frequency $f_0$ which the transmitter of desired station $u_0$ has used, and means of an isolated-pilot-response for a desired station without being subjected to interference due to both the data-frame received from the desired station and all interference-waves received from interfering stations is produced.

5. A CDMA communications system using multiple spreading sequences is characterized in that, in claim 1 or 2, the transmitter of the k-th user $u_k$ comprises;

means of a synthesized frame-sequence is produced by providing empty slots in the baseband transmit-data-frame sequence, and inserting pilot-frames in said data-frame sequence in time-division manner, and means of said synthesized frame-sequence is transmitted over the above-described k-th orthogonal carrier wave having the frequency $f_k$, and the receiver comprises;

means of the parts corresponding to the pilot-frames in a frame-sequence made of the synchronously received frames are extracted in a time-division manner and then the extracted parts is demodulated, and an isolated-pilot-response without being subjected to interference due to the interference-waves is produced.

6. A CDMA communications system using multiple spreading sequences characterized in that, in claim 1 or 3, the transmitter of the k-th user $u_k$(k=0,1, ... K-1) comprises;

means of that a transmit-pilot-frame for $u_k$ which is produced by modulating a common carrier-wave for pilot having an orthogonal frequency $f_p$ by the k-th baseband transmitting pilot-frame described above $e^{pk}$ is transmitted over such a transmission timing as to receive in time-division-manner with a similarly received pilot-frame which the k'-th user $u_{k'}$(k'≠k) has transmitted, and the receiver comprises;

means of the baseband transmit-pilot-frame for $u_k$ is extracted in time-division-manner from a pilot-frame-sequence demodulated by a carrier-wave having said orthogonal frequency $f_p$, and the channel-response is produced using the resultant demodulated output.

7. A CDMA communications system using multiple spreading sequences characterized in that, in claim 2, the receiver detects the transmitted information of I bits per symbol-frame by comprising;

means of 0-shift-correlations $p'_{nm}$ between m-th fabricated pilot-frame $r^*_{nm}$ and M data analyzing sequences $y_n$(n=0,1,2, ... M−1) each of which differs from each other are produced, and that a pilot-response-matrix P' with a size of M×M constituted of said correlations is produced, means of that a data-response-matrix $\Phi'=(\Phi'_0, \Phi'_1, \Phi'_2, \ldots \Phi'_{M-1})^T$ is produced by such a method as to obtain 0-shift correlation $\Phi'_n$ between the synchronously received data-frame $r^*_n$ and n-th data analyzing sequence $y_n$, and means of a system of M linear equations in M unknowns are made of the pilot-response-matrix P', the data-response-matrix $\Phi'$ and the unknown matrix $\beta'=(\beta'_0, \beta'_1, \beta'_1, \ldots \beta'_{M-1})^T$ that an estimated set $\beta'=(\beta'_0, \beta'_1, \beta'_1, \ldots \beta'_{M-1})$ corresponding to said original information-set is obtained by solving said system, and that the detected output-set $\{\hat{\beta}^S\}=\{\hat{\beta}_0^S, \hat{\beta}_1^S, \ldots \hat{\beta}_{Y-1}^S\}$ consisting of the transmitted information is obtained by judging said estimate-set.

8. A CDMA communications system using multiple spreading sequences characterized in that, in claim 3, the receiver detects the transmitted information of I bits per symbol-frame which is transmitted by each user by comprising;

means of said M' fabricated pilot-frames $r_{pm}^{k*}$ and M' data analyzing sequences $y_n^k$(n=0,1,2, ... M'−1) corresponding to the k-th user $u_k$(k=0,1,2, ... K−1) are produced, means of that a pilot-response-matrix P' with a size of (M×M) constituted of the 0-shift-correlations $p_{nm}^{k'}$ between said respective fabricated pilot-frames $r_{pm}^{k*}$ and said respective data analyzing sequences $y_n^k$ is produced, and means of that a data-response-matrix $\Phi'=(\Phi_0^{0'}, \Phi_1^{0'}, \ldots \Phi_{M'-1}^{0'}, \Phi_0^1, \Phi_1^1, \ldots \Phi_{M'-1}^1, \ldots \Phi_0^{K-1}, \Phi_1^{K-1}, \ldots \Phi_{M'-1}^{K-1})^T$ is produced using such a method as to obtain 0-shift-correlation $\Phi_n^{k'}$ between the synchronously received data-frame $r^*_D$ and said data analyzing sequence $y_n^k$, that a system of M linear equations in M unknowns is made of said pilot-response-matrix P', said data-response-matrix $\Phi'$ and an unknown matrix $\beta'=(\beta_0^{0'}, \beta_1^{0'}, \ldots \beta_{M'-1}^{0'}, \beta_0^{1'}, \beta_1^{1'}, \ldots \beta_{M'-1}^{1'}, \beta_0^{K-1}, \beta_1^{K-1}, \ldots \beta_{M'-1}^{K-1})^T$, that an estimate-set $\{\hat{\beta}^k\}(\beta_0^{k'}, \beta_1^{k'}, \ldots \beta_{M'-1}^{k'})$ corresponding to the transmitted information-set consisting of M' components for each user is obtained by solving said system, and that the detected output-set $\{\hat{\beta}^{kS}\}(\hat{\beta}_0^{kS}, \hat{\beta}_1^{kS}, \ldots \hat{\beta}_{Y-1}^{kS})$ corresponding to the transmitted information of each user is obtained by judging the estimate-set.

9. A CDMA communications system using multiple spreading sequences characterized in that, in claim 2 or 7, the transmitter of the k-th user $u_k$ comprises;

means of a sequence-set consisting of M kinds of the basic spreading sequences having L chips is prepared, being transmitted, and the receiver detects the transmitted information of I bits per symbol-frame which is transmitted by each user by comprising;

means of double length fabricated pilot-frames $r^*_{pmE}$ and a double length synchronously received data-frame $r^*_{DE}$ both having 2L chips are produced using the real part and the imaginary part of the respective chip-elements of both the fabricated pilot-frames $r^*_{Pm}$(m=0,1,2, ... M−1) and the synchronously received data-frame $r^*_D$, that a system of M linear equations in M unknowns is made of a double length received pilot-matrix $\rho'$ with a size of 2L×M made of the double length fabricated pilot-frames $r^*_{PmE}$, a received data-matrix d' which consists of the chip-elements of the double length synchronously received data-frame $r^*_{DE}$, and an unknown matrix $\beta'$, that an estimate-set $\{\beta'\}$ corresponding to the original information-set is produced by solving said system, and that a detected output-set $\{\hat{\beta}^S\}$ consisting of the information which the desired station has transmitted is obtained by judging said estimate-set.

10. A CDMA communications system using multiple spreading sequences characterized in that, in claim 3 or 8, the transmitter of the k-th user $u_k$ comprises;

means of that a sequence-set consisting of M kinds of M' basic spreading sequences having L chips is prepared, being transmitted, and the receiver detects the transmitted information of I bits per symbol-frame which is transmitted by each user by comprising;

means of double length fabricated pilot-frames $r_{pmE}^{k*}$ and a double length synchronously received data-frame $r^*_{DE}$ both having 2L chips are produced using the real part and the imaginary part of the respective chip-elements of the fabricated pilot-frames $r_{pm}^{k*}$(m=0,1,2, ... M'−1, k=0,1,2, ... K−1) and the synchronously received data-frame $r^*_D$, that a system of M linear equations in M unknowns is made of a double length received pilot-matrix $\rho'$ with a size of 2L×M made of the double length fabricated pilot-frame $r_{pmE}^{k*}$, a received data matrix d' which consists of the chip-elements of the double length synchronously received data-frame, and an unknown matrix $\beta^{k'}$, that an estimate-set $\{\beta^{k'}\}$ corresponding to the original information-set is produced by solving said system, and that a detected output-set $\{\hat{\beta}^{kS}\}$ consisting of the information which the desired station has transmitted is obtained by judging said estimate-set.

11. A CDMA communications system using multiple spreading sequences characterized in that, in claim 1, 2, 3, 7 or 8, a transmitter comprises;

means of transmit-signals are transmitted via one or plural transmit-diversity-antennae $A_{Tv}$(v=0,1,2,...), and the receiver comprises;

means of received signals $r_d$ are received via plural receive-diversity-antennae $A_{RD}$(d=0,1,2, ... ), that baseband demodulated outputs are produced at pilot and data demodulating parts $D_{pd}$ and $D_{Dd}$ for a d-th received signal $r_d$ by using a local carrier-wave corresponding to a carrier-wave which the transmitter of the desired station has used, and thereby a d-th synchronously received pilot- and data-frames $r^*_{pd}$ and $r^*_{Dd}$ are produced, that the d-th channel response $\{\mu\}_d$ is obtained with the d-th pilot-frame $r^*_{pd}$, that a fabricated pilot-frame $r^*_{pmd}$ or $r_{pmd}^{k*}$ corresponding to the d-th received signal is obtained using said channel response $\{\mu\}_d$ and the m-th basic spreading sequence which the desired station has used, that extended fabricated pilot-frames $r^*_{pmE}$ or $r_{pmE}^{k*}$ are produced by using such a method as to increase the frame length by arranging chip-elements of said fabricated pilot-frames which belong to the respective antenna numbers d on a time axis, that an extended synchronously received data-frame $r^*_{DE}$ is produced by arranging said d-th synchronously received data-frame $r^*_{Dd}$ on a time axis in the same way, that an estimate-set $\{\beta'\}=(\beta'_0, \beta'_1, \ldots \beta'_{M-1})$ corresponding to the original information-set is produced by analyzing the said extended synchronously received data-frame $r^*_{DE}$ with said extended fabricated pilot-frames $r^*_{PmE}$ or $r_{PmE}^{k*}$, and that a detected output-set $\{\hat{\beta}^S\}=\{\hat{\beta}_0^S, \hat{\beta}_1^S, \ldots \hat{\beta}_{\gamma-1}^S\}$ consisting of the information which the desired station has transmitted is obtained by judging said estimate-set.

12. A CDMA communications system using multiple spreading sequences characterized in that, in claim 11,
the transmitter comprises;
means of that a sequence-set consisting of $N_v$ basic spreading sequences $\{g_m\}=(g_{m0}, g_{m1}, \ldots g_{mv}, \ldots g_{m,Nv-1})$ per one transmit-information $\beta_m$ is prepared, that the v-th basic spreading sequence $g_{mv}$ is modulated by the same information $\beta_m$ to produce a core-sequence for data and then an enveloped sequence for data based on this modulated output, that an enveloped sequence for pilot is produced in the same way, that both said enveloped sequences are lead to the v-th transmit-diversity-antenna $A_{Tv}$ to transmit, and
a receiver comprises;
means of the components which the v-th transmit-diversity-antenna $A_{Tv}$ has transmitted are demodulated using an input received via the d-th received-diversity-antenna $A_{Rd}$, resulting in production of both a d-th synchronously received data-frames $r^*_{Dvd}$ and the d-th synchronously received pilot-frames $r^*_{pvd}$, that a channel response $\{\mu\}_{vd}$ from the v-th transmit-antenna to the d-th received-antenna is produced using said synchronously received pilot-frame, that the d-th fabricated pilot-frames $r^*_{pmvd}$ or $r_{pmvd}^{k*}$ are produced using the channel response, that an extended fabricated pilot-frame $r^*_{pmE}$ or $r_{pmE}^{k*}$ is produced by such a method as to increase the frame length by arranging chip-elements of fabricated pilot-frames which belong to the respective pairs of transmit- and receive-antenna numbers v and d (mutually different)* on a time axis, that an extended received frame $r^*_{DE}$ is produced by arranging said synchronously received frame $r^*_{Dvd}$ in the same way, and that said extended synchronously received frame $r^*_{DE}$ is analyzed with said extended fabricated pilot-frames $r^*_{pmE}$ or $r_{pmE}^{k*}$.

13. A CDMA communications system using multiple spreading sequences characterized in that, in claim 12, such a function is added that, when the chip-elements of the fabricated pilot-frames and synchronously received data-frames which belong to respective transmit- and receive-antenna ordinal numbers are arranged on a time axis, and thereby said extended fabricated pilot-frames and extended synchronously received data-frames are produced, a real amplitude component and an imaginary amplitude component of a chip-element are arranged so as to take individual time positions to constitute each frame.

14. A CDMA communications system using multiple spreading sequences characterized in that, in claims 2, 3, 7 or 8,
a receiver comprises such a function as to detect the transmitted information of I bits per symbol-frame which is transmitted by each user by providing;
means of that instead of solving a system of M linear equations in M unknowns, an optional number $M_R$ which is smaller than M, and equal to $\gamma$ or larger than $\gamma$ is chosen to produce a reduced size system of $M_R$ linear equations in $M_R$ unknowns, and $N_R$ sets of the reduced size systems are produced, that $N_R$ estimate-sets of the spreading sequence-set $\{\beta'\}=(\beta'_0, \beta'_1, \ldots \beta'_{MR-1})$ or $\{\beta^{k'}\}=(\beta^{k'}_0, \beta_1^{k'}, \ldots \beta_{MR-1}^{k'})$ are obtained as solutions of said respective equations, and that an evaluation function $\Delta\beta$ which shows deviations between said respective estimate-sets and the original information-set $\{\beta\}$ or $\{\beta^k\}$ is obtained, and
means of an estimate-set $\{\beta'\}$ or $\{\beta^{k'}\}$ corresponding to the original information-set based on a set with which $\Delta\beta$ takes the minimum is obtained, and that a detected information-set $\{\hat{\beta}^S\}$ or $\{\hat{\beta}^{kS}\}$ consisting of the above-described transmitted information is obtained by judging said estimate-set.

15. A CDMA communications system using multiple spreading sequences characterized in that, in claim 2, 7, or 8,
the receiver comprises such a function as to detect the transmitted information of I bits per symbol-frame which is transmitted by each user by providing;
means of that instead of solving a system of M linear equations in M unknowns, combination-sets $U_s$(s=0, 1, ... $N_\gamma$–1) which consists of $\gamma$ frames taken out of the fabricated pilot-frames $r_{pm}$(m–0,1,2, ... M–1) is made, that a sum of the frames which is made by multiplying the elements of plural virtual sequences $C_h(c_0, c_1, \ldots c_{\gamma-1})$ by the respective frames of a said combination-set $U_s$ is produced as a fabricated transmitted frame $F_{sh}$, and that correlations between respective fabricated transmitted frames and the synchronously received data-frame $r^*_D$ are obtained, and
means of that the maximum likelihood fabricated transmitted frame is obtained based on said correlations, and that a detected information-set $\{\hat{\beta}^S\}$ consisting of the transmitted information is obtained by judging said estimate-set $\{\beta'\}$ using the constituent elements $U_s$ and $C_h$ of the maximum likelihood fabricated transmitted frame.

16. A CDMA communications system using multiple spreading sequences characterized in that, in claim 3 or 8,
the receiver comprises such a function as to detect the transmitted information of I bits per symbol-frame which is transmitted by the k-th user $u_k$ by providing;
means of instead of solving a system of M linear equations in M unknowns, combination-sets $U_s^k$ (s=0,1,2, ... $N_\gamma$–1) which consists of K$\gamma$ frames taken out of the fabricated pilot-frames $r_{Pm}^{k*}$(m=0, 1,2, ... M'–1) for the k-th user $u_k$(k=0,1,2, ... K) is made, that a sum of the frames which is made by multiplying the elements of plural virtual sequences $C_h(c_0, c_1, \ldots c_{K\gamma-1})$ by the respective frames of said set $U_s^k$ is produced as a fabricated transmitted frame $F_{sh}^k$, and that correlations between respective fabricated transmitted frames $F_{sh}^k$ and the synchronously received data-frame $r^*_D$ is obtained, and
means of the maximum likelihood fabricated transmitted frame is obtained based on said correlations, and that a detected information-set consisting of the transmitted information is obtained by judging an estimate-set corresponding to the original information-set using the constituent elements $U_s^k$ and $C_h$ of the maximum likelihood fabricated transmitted frame.

17. A CDMA communications system using multiple spreading sequences characterized in that, in claims 2 or 3, a receiver comprises such a function as to detect the transmitted information of I bits per symbol-frame by providing;

means of that the above-described fabricated pilot-frames $r^*_{pm}$ or $r_{pm}{}^{k*}$ (m=0,1,2, ... M−1, k=0,1,2, ... K−1) are generated, and such analyzing sequences $w_m$ that the 0-shift-correlations with fabricated pilot-frames $r^*_{pm}$ and $r^*_{pm}$(m'≠m) may take 1 and 0, respectively, are produced, means of plural estimate-sets set $\{\beta'\}=(\beta'_0, \beta'_1, \ldots \beta'_{M-1})$ corresponding to the original information-set are produced based on the 0-shift correlations between the synchronously received data-frame $r^*_D$ and analyzing sequences $w_m$, that by judging the maximum likelihood set taken out of these estimate-sets a detected information-set $\{\hat{\beta}^S\}=\{\hat{\beta}_0{}^S, \hat{\beta}_1{}^S, \ldots \hat{\beta}_{\gamma-1}{}^S\}$ consisting of the transmitted information is obtained, or means of that plural analyzing sequences $w_m{}^k$ such that 0-shift-correlations with fabricated pilot-frames $r^{pmk*}$ and $r_{pm'}{}^{K'*}$(m'≠m, k'≠k; m'=m, k'≠k; m'≠m, k'=k) may take 1 and 0, respectively, are produced, means of plural estimate-sets $\{\beta^{k'}\}=(\beta_0{}^{k'}, \beta_1{}^{k'}, \ldots \beta_{M-1}{}^{k'})$ corresponding to the original information-set are produced based on the 0-shift-correlations between the synchronously received data-frame $r^*_D$ and the analyzing sequences $w_m{}^k$, and means of by judging the maximum likelihood set taken out of these sets a detected information-set $\{\hat{\beta}^{kS}\}$ consisting of the transmitted information is obtained.

18. A CDMA communications system using multiple spreading sequences characterized in that, in claims 1, 2, 3, 7 or 8, a transmitter comprises;

means of that a binary to multi-level conversion is carried out by using such a method as to correspond a transmit-information of I bits to a case-number obtained by synthesizing the first selection where an optional number γ is selected out of the numbers of spreading sequences, ranging from one to $\gamma_m$, and the second selection where γ spreading sequences are selected out of the sequence-set consisting of M or M' kinds of basic spreading sequences as the sequence kinds, and means of that a selected sequence-set consisting of γ selected spreading sequences is produced from the original information-set $\{\beta\}$ or $\{\beta^k\}$ to produce a transmitting frame, and the receiver comprises such a function as to detect the transmitted information of I bits per symbol-frame by providing;

means of that fabricated pilot-frames are obtained based on the channel response $\{\mu\}$, and an estimate-set $\{\beta'\}$ or $\{\beta^{k'}\}$ corresponding to the original information-set is obtained by analyzing the synchronously received data-frame $r^*_D$ with said channel response and said estimate-set, means of while a detected value $\hat{\gamma}$ for the transmitted spreading sequence number is obtained using said estimate-set, and means of a detected information-set $\{\hat{\beta}^S\}$ or $\{\hat{\beta}^{kS}\}$ consisting of γ selected information components is obtained per user.

19. A CDMA communications system using multiple spreading sequences characterized in that, in claim 7, the receiver comprises;

means of in solving the system of M linear equations in M unknowns, assumed that frames produced by multiplying dummy-information-components $\{\beta^D\}= (\beta_M{}^D, \beta_{M+1}{}^D, \ldots \beta_{M+h-1}{}^D)$ by h(≧1) dummy spreading sequences which are not included in the basic spreading sequence-set provided in a transmitter may be included in the synchronously received data-frame, means of that M pieces of said fabricated pilot-frames $r^*_{pm}$(m=0,1,2, ... M−1) and the (M+h) pieces of said data analyzing sequences $y_n$(n=0,1,2, ... M−h−1) are produced and an extended pilot-response-matrix $P'_+$ is produced by adding h additional row vectors A to M row vectors each having (M+h) elements which are produced from the 0-shift-correlations between the fabricated pilot-frames $r^*_{pm}$ and said data analyzing sequences $y_n$, means of that a corrected data-response-matrix $\Phi_+''=(\Phi_0'', \Phi_1'', \ldots \Phi_{M+h-1}'')^T$ is produced using a method of adding correcting terms to the 0-shift-correlations between the synchronously received data-frame $r^*_D$ and the data analyzing sequences $y_n$, means of a system of (M+h) linear equations in (M+h) unknowns which is made of said enlarged pilot-response matrix $P'_+$, the corrected data-response-matrix $\Phi''_+$ and an extended unknown matrix $\beta'_+=(\beta', \beta^D)^T=(\beta'_0, \beta'_1, \ldots \beta'_{M-1}, \beta_M{}^D, \beta_{M+1}{}^D, \ldots \beta_{M+h-1}{}^D)^T$ is produced, and means of after said additional row vector A is selected so as to increase the determinant or normalized singular value of said enlarged pilot-response-matrix $P'_+$ to enhance the regularity, an estimated set $\{\beta'\}$ or $\{\beta^{k'}\}$ corresponding to the original information-set is obtained by solving said system of (M+h) linear equations in (M+h) unknowns.

20. A CDMA communications system using multiple spreading sequences characterized in that, in claim 2, the receiver comprises;

means of in solving the system of M linear equations in M unknowns, an enlarged pilot-matrix $P'_+$ is produced so as to enhance the regularity of said enlarge matrix using the fabricated pilot-frames $r^*_{pm}$, h additional row vectors A, and h additional column vectors C which are random sequences, means of an extended unknown matrix $\beta'_+$ is made by adding h additional dummy-information $\{\beta^D\}$ to an unknown set $\{\beta'\}$ consisting of M unknowns, means of a corrected synchronously received data-frame $r^*_{D+}$ is made by adding correcting terms to the synchronously received data-frame $r^*_D$, means of that a solution set $\{\beta'_+\}$ is obtained by solving a system of (M+h) linear equations in (M+h) unknowns which is composed of said enlarged pilot-matrix $\rho'_+$, the extended unknown matrix $\beta'_+$, and the corrected received data-matrix $d'_+$ consisting of the chip-elements of the corrected synchronously received data-frame $r^*_{D+}$, and plural solution sets $\{\beta^*_+\}$ are resultantly obtained corresponding to said additional column vectors C by solving said systems, and means of that the maximum likelihood solution taken out of the solution sets is set to an estimate-set $\{\beta'\}$ corresponding to the original information-set.

21. A CDMA communications system using multiple spreading sequences characterized in that, in claims 1, 2, 3, an identical sequence-set consisting of M kinds of basic spreading sequence is allocated to some cells, and a scrambling sequence inherent to each cell is allocated to a cell, and the transmitter of the cell comprises;

means of that a scrambled sequence-set is produced by multiplying respective sequences of the spreading sequence-set by the scrambling sequence inherent to the cell to produce a transmit-frame, and a receiver comprises;

means of pilot and data analyzing sequences are produced based on the scrambled sequence-set to analyze the synchronously received data-frame.

22. A CDMA communications system using multiple spreading sequences characterized in that, in claim 1, the transmitter of the k-th user $u_k$ comprises;

means of a sequence-set consisting of M=M'=N kinds of basic spreading sequences ($g_0, g_1, g_2, \ldots g_{M-1}$) is produced by multiplying code words ($h_0, h_1, \ldots h_{N-1}$) consisting of rows of an hadmarl matrix with a size of N×N by a random sequence-set consisting of M' kinds of spreading sequences ($g_0^0, g_1^0, \ldots g_{M'-1}^0$).

23. A CDMA communications system using multiple spreading sequences characterized in that, in claims 1 or 2, the transmitter comprises;

means of that a sequence-set consisting of M=M'L kinds of cyclically shifted sequences is prepared as a basic spreading sequence-set by producing the s=(0, 1,2, ... L−1)-shift-sequences of respective spreading sequences which constitutes a sequence-set consisting of M' kinds of spreading sequences ($g_0, g_1, \ldots g_{M'}$) with L chips in sequence length, means of transmit-information of I bits is converted into an information-set consisting of γ components $\{\beta^S\}$ selected out of the basic spreading sequence-set, and means of a transmit-frame is produced and transmitted by using a selected sequence-set $\{\beta^S g^S\}$ corresponding to said information-set, and the receiver detects the transmitted information of I bits per symbol-frame by producing a detected output-set { $\hat{\beta}^S\}=\{\hat{\beta}_0^S, \hat{\beta}_1^S, \ldots \hat{\beta}_{\gamma-1}^S\}$ consisting of the information which the desired station has transmitted by the method stated in claim 2.

* * * * *